United States Patent
Yuasa

(10) Patent No.: US 10,135,287 B2
(45) Date of Patent: Nov. 20, 2018

(54) VEHICLE WIRELESS POWER TRANSFER USING METAL MEMBER WITH HIGH PERMEABILITY TO IMPROVE CHARGING EFFICIENCY

(71) Applicant: TOYOTA JIDOSHA KABUSHIKI KAISHA, Toyota-shi, Aichi-ken (JP)

(72) Inventor: Hiroaki Yuasa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 128 days.

(21) Appl. No.: 15/224,007

(22) Filed: Jul. 29, 2016

(65) Prior Publication Data

US 2017/0040832 A1    Feb. 9, 2017

(30) Foreign Application Priority Data

Aug. 4, 2015    (JP) .................. 2015-154616

(51) Int. Cl.

| | |
|---|---|
| *H02J 7/02* | (2016.01) |
| *H02J 5/00* | (2016.01) |
| *B60L 11/18* | (2006.01) |
| *B60R 16/02* | (2006.01) |
| *H01F 38/14* | (2006.01) |

(52) U.S. Cl.
CPC ............ *H02J 7/025* (2013.01); *B60L 11/182* (2013.01); *B60R 16/02* (2013.01); *H01F 38/14* (2013.01); *Y02T 10/7005* (2013.01); *Y02T 10/7072* (2013.01); *Y02T 90/122* (2013.01); *Y02T 90/14* (2013.01)

(58) Field of Classification Search
CPC ........................................ H02J 7/025
USPC ....................................... 320/108
See application file for complete search history.

(56) References Cited

U.S. PATENT DOCUMENTS

| | | |
|---|---|---|
| 7,741,734 B2 | 6/2010 | Joannopoulos et al. |
| 2007/0222542 A1 | 9/2007 | Joannopoulos et al. |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |

(Continued)

FOREIGN PATENT DOCUMENTS

| | | |
|---|---|---|
| AU | 2006269374 B2 | 1/2007 |
| AU | 2007349874 A2 | 10/2008 |

(Continued)

*Primary Examiner* — Edward Tso
*Assistant Examiner* — Ahmed Omar
(74) *Attorney, Agent, or Firm* — Oliff PLC

(57) ABSTRACT

A bottom portion of a vehicle includes a metal member formed of a metal having a higher magnetic permeability than aluminum, and a power reception coil including a low-turn-count portion with a smaller number of turns and a high-turn-count portion with a larger number of turns than the low-turn-count portion. In plan view as seen from below the metal member and the power reception coil, the low-turn-count-portion is located in at least a part of a facing portion of the power reception coil, the facing portion facing the metal member.

7 Claims, 41 Drawing Sheets

(56) References Cited

U.S. PATENT DOCUMENTS

| | | |
|---|---|---|
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2013/0057208 A1* | 3/2013 | Takada ............... B60L 11/182 320/108 |
| 2013/0127409 A1 | 5/2013 | Ichikawa |
| 2013/0193749 A1* | 8/2013 | Nakamura ............... B60L 3/00 307/9.1 |
| 2014/0305722 A1 | 10/2014 | Ichikawa et al. |
| 2015/0008877 A1 | 1/2015 | Ichikawa et al. |
| 2015/0061590 A1 | 3/2015 | Widmer et al. |

FOREIGN PATENT DOCUMENTS

| | | |
|---|---|---|
| AU | 2010200044 A1 | 1/2010 |
| AU | 2006269374 C1 | 3/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | 2009-501510 A | 1/2009 |
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| JP | 2015-84642 A | 4/2015 |
| KR | 2008-0031398 A | 4/2008 |
| KR | 2010-0015954 A | 2/2010 |
| WO | 2007/008646 A2 | 1/2007 |
| WO | 2008/118178 A1 | 10/2008 |
| WO | 2013/076870 A1 | 5/2013 |
| WO | 2014/166967 A1 | 10/2014 |

* cited by examiner

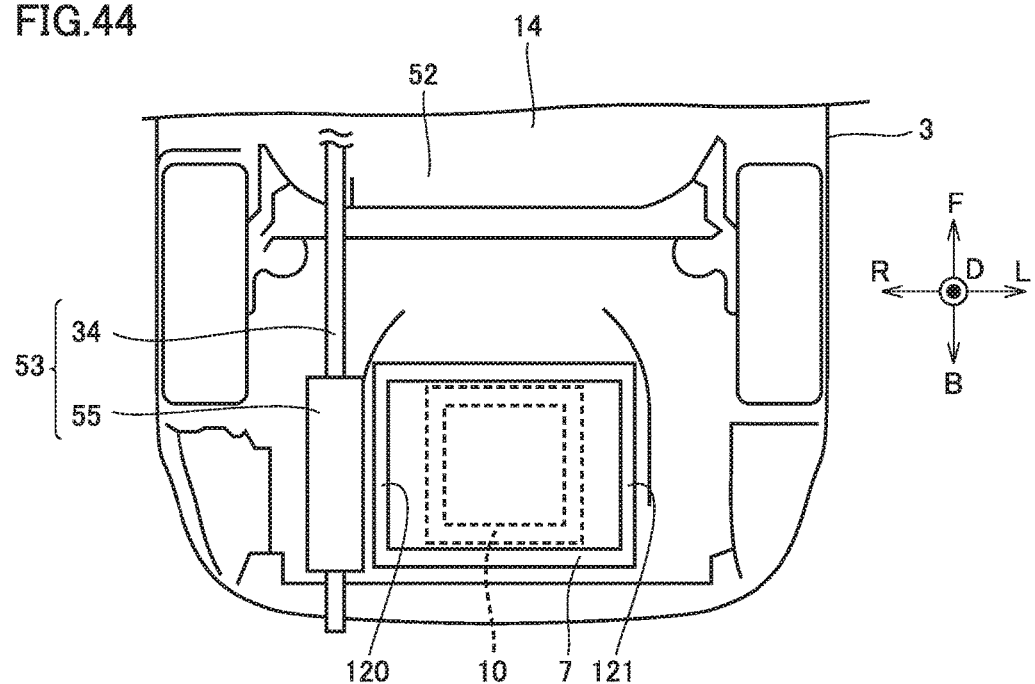
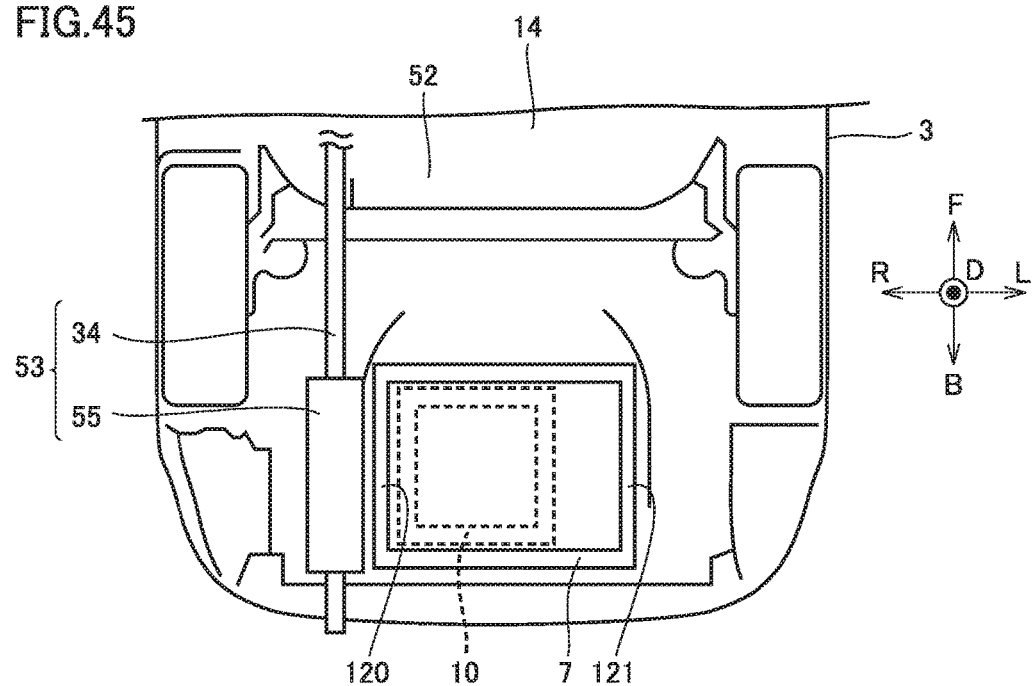

VEHICLE WIRELESS POWER TRANSFER USING METAL MEMBER WITH HIGH PERMEABILITY TO IMPROVE CHARGING EFFICIENCY

This nonprovisional application is based on Japanese Patent Application No. 2015-154616 filed on Aug. 4, 2015 with the Japan Patent Office, the entire contents of which are hereby incorporated by reference.

BACKGROUND

Technical Field

The present disclosure relates to a vehicle including a wireless power reception apparatus.

Description of the Background Art

A wireless power transfer system wirelessly transmitting electric power from a power transmission apparatus to a power reception apparatus has been known (Japanese Patent Laying-Open Nos. 2013-154815, 2013-146154, 2013-146148, 2013-110822, 2013-126327). The power transmission apparatus includes a power transmission coil and the power reception apparatus includes a power reception coil.

A vehicle disclosed in WO2013/076870 includes a power reception apparatus provided on the bottom surface of the vehicle, and a muffler provided on the bottom surface of the vehicle and located at a position adjacent to the power reception apparatus. A power transmission apparatus includes an inverter for adjusting the voltage and the frequency of electric power supplied from a power supply. The muffler includes a metal cover.

SUMMARY

When the vehicle disclosed in WO2013/076870 is to receive electric power from the power transmission apparatus, the vehicle is stopped at a position where the power reception apparatus faces the power transmission apparatus in the vertical direction. Then, electric power is supplied to a power transmission coil of the power transmission apparatus to form magnetic flux around the power transmission coil. The magnetic flux formed around the power transmission coil passes through a power reception coil, and the power reception coil thus receives electric power.

The present inventor studied the influence of the metal cover on the coupling coefficient between the power transmission coil and the power reception coil, in the case where the metal cover of the muffler is provided on the right side of the power reception coil.

The inventor found that, in a system where a muffler made of iron or stainless steel is provided in the vicinity of the power reception apparatus, a part of the magnetic flux emitted from the power transmission coil is guided by the metal cover to the power reception coil, when electric power is transmitted from the power transmission coil to the power reception coil in the state where the power transmission coil and the power reception coil are positionally aligned accurately.

The inventor then conducted a study on different types of metal covers, and found that more magnetic flux is guided to the power reception coil in the case where the metal cover is formed of a metal having a higher magnetic permeability such as iron and stainless steel. Meanwhile, the inventor found that in the case where the metal cover is formed of a metal having a lower magnetic permeability such as aluminum, the magnetic flux from the power transmission coil is reflected by the metal cover.

Based on the newly found phenomenon as described above, the inventor then conducted a study on variation of the coupling coefficient between the power transmission coil and the power reception coil under conditions that the power transmission coil is positionally displaced from the power reception coil in different manners.

Consequently, the inventor found that in the case where the metal cover is disposed in the vicinity of the power reception coil, a large difference arises between the coupling coefficient when the power transmission coil is positionally displaced toward the metal cover and the coupling coefficient when the power transmission coil is positionally displaced in the direction away from the metal cover.

The inventor further found that the manner of variation of the coupling coefficient varies depending, for example, on the type of the metal forming the metal cover.

Variation of the coupling coefficient causes variation of the voltage received by the power reception apparatus. Moreover, if the power transmission apparatus performs constant-power control, the current flowing in the power transmission apparatus is also varied considerably.

As a result, there arises the necessity of a higher breakdown voltage of the power reception apparatus, or a higher current-carrying capacity of the power transmission apparatus.

The inventor found that the above-described problems arise not only in the case where the metal cover of the muffler is provided but also in the case where a metal member is provided in the vicinity of the power reception coil.

The embodiments have been made in view of the above-described problems, and an object of the embodiments is to provide a vehicle which can reduce variation of the coupling coefficient between a power transmission coil and a power reception coil, even when a metal member is provided in the vicinity of the power reception coil and the power transmission coil is positionally displaced from the power reception coil.

A vehicle according to one aspect of the present disclosure includes: a power reception apparatus including a power reception coil configured to wirelessly receive electric power from a power transmission coil, the power reception apparatus being provided at a bottom surface of the vehicle; and at least one metal member provided at a position horizontally adjacent to the power reception apparatus in plan view as seen from below the bottom surface of the vehicle. The at least one metal member is formed of a metal having a higher magnetic permeability than a magnetic permeability of aluminum. The power reception coil includes a low-turn-count portion with a smaller number of turns, and a high-turn-count portion with a larger number of turns than the low-turn-count portion. The low-turn-count portion is located in at least a part of a facing portion of the power reception coil, the facing portion facing the at least one metal member in plan view as seen from below the at least one metal member and the power reception coil.

When the power reception apparatus of the vehicle receives electric power transmitted from the power transmission apparatus, a part of magnetic flux from the power transmission apparatus enters the metal member. Since the metal member is formed of a metal having a higher magnetic permeability than aluminum, the magnetic flux passes into the metal member. The magnetic flux entering the metal member passes through the metal member and is emitted to the outside of the metal member. A part of the magnetic flux emitted from the metal member passes through the power reception coil.

In some cases, positional displacement of the power transmission coil from the power reception coil may increase the amount of magnetic flux entering the metal member. As the amount of the magnetic flux entering the metal member increases, the amount of magnetic flux guided by the metal member to the power reception coil increases.

In the facing portion of the power reception coil, the low-turn-count portion is located, and the number of turns of the facing portion is small. Therefore, even when the amount of magnetic flux passing through the facing portion increases, the influence on the coupling coefficient between the power reception coil and the power transmission coil is small.

As a result, even when the power transmission coil is positionally displaced, variation of the coupling coefficient between the power reception coil and the power transmission coil can be reduced.

Preferably, the at least one metal member includes a first metal member and a second metal member provided at a position closer to the ground beneath the vehicle than a position where the first metal member is provided. In plan view as seen from below the first metal member, the second metal member, and the power reception coil, the power reception coil includes a first facing portion facing the first metal member and a second facing portion facing the second metal member. The number of turns of the second facing portion is smaller than the number of turns of the first facing portion.

During power transfer, the amount of magnetic flux entering the second metal member is larger than the amount of magnetic flux entering the first metal member, because the magnetic field strength of magnetic flux formed around the power transmission coil is higher as the position is closer to the power transmission coil.

Therefore, during power transfer, the amount of magnetic flux guided by the second metal member to the power reception coil is larger than the amount of magnetic flux guided by the first metal member to the power reception coil.

The magnetic flux guided by the second metal member enters the second facing portion of the power reception coil, and the magnetic flux guided by the first metal member enters the first facing portion of the power reception coil.

The number of turns of the second facing portion is smaller than the number of turns of the first facing portion. Therefore, the influence which is exerted on the coupling coefficient by the magnetic flux passing through the second facing portion can be made small.

Accordingly, even when the power transmission coil is positionally displaced from the power reception coil, variation of the coupling coefficient between the power reception coil and the power transmission coil can be reduced.

A vehicle according to another aspect of the present disclosure includes: a power reception apparatus including a power reception coil configured to wirelessly receive electric power from a power transmission coil, the power reception apparatus being provided at a bottom surface of the vehicle; and at least one metal member provided at a position horizontally adjacent to the power reception apparatus in plan view as seen from below the bottom surface. The at least one metal member has a magnetic permeability equal to or less than a magnetic permeability of aluminum. The power reception coil includes a low-turn-count portion with a smaller number of turns, and a high-turn-count portion with a larger number of turns than the low-turn-count portion. The high-turn-count portion is located in at least a part of a facing portion of the power reception coil, the facing portion facing the at least one metal member in plan view as seen from below the at least one metal member and the power reception coil.

In the power reception apparatus, the magnetic permeability of the metal member is equal to or less than that of aluminum. Therefore, magnetic flux is hindered from passing through the metal member, and consequently is converted to eddy current, and likely to generate heat.

As a large amount of eddy current flows inside the surface of the metal member, the eddy current creates a magnetic field. The magnetic field is distributed in a direction of reducing the entering magnetic flux. Consequently, magnetic flux which is to enter the metal member is reflected. The magnetic flux reflected by the metal member hinders progress of the magnetic flux flowing from the power transmission coil toward the power reception coil. As a result, there is a decrease in the amount of magnetic flux that passes through the facing portion which is a part of the power reception coil and which faces the metal member.

Depending on the direction of the positional displacement of the power transmission coil, the distance between the power transmission coil and a metal-side portion of the power reception coil located relatively closer to the metal member may decrease while the distance between the power transmission coil and the other portion of the power reception coil may increase. As the distance between the power transmission coil and the metal-side portion of the power reception coil decreases, the amount of magnetic flux directed toward the metal-side portion of the power reception coil increases. Accordingly, the amount of magnetic flux entering the metal member increases and eddy current formed in the metal member also increases.

As the eddy current generated in the metal member increases, the amount of magnetic flux reflected by the eddy current also increases. The reflected magnetic flux hinders progress of magnetic flux flowing from the power transmission coil toward the power reception coil.

Due to this, regardless of the fact that the distance between the power transmission coil and the metal-side portion of the power reception coil decreases when the positional displacement occurs as described above, the amount of magnetic flux flowing through the facing portion of the power reception coil increases merely slightly, relative to the amount of magnetic flux flowing through the facing portion when the power reception coil and the power transmission coil are positionally aligned with each other.

Meanwhile, the number of turns of the facing portion of the power reception coil is larger than that of the other portion. Therefore, the slight increase of the amount of magnetic flux flowing through the facing portion causes an increase of an electromotive voltage induced at the facing portion to a certain extent.

Thus, even when the power transmission coil is positionally displaced, variation of the coupling coefficient between the power reception coil and the power transmission coil can be reduced.

Preferably, the at least one metal member includes a first metal member and a second metal member which is provided at a position closer to the ground beneath the vehicle than a position where the first metal member is provided. In plan view of the first metal member, the second metal member, and the power reception coil as seen from below the first metal member, the second metal member, and the power reception coil, the power reception coil includes a first facing portion facing the first metal member and a second facing portion facing the second metal member. The number of turns of the second facing portion is larger than the number of turns of the first facing portion.

Regarding the power reception apparatus, depending on the direction of positional displacement of the power transmission coil, the distance between the power transmission coil and a portion of the power reception coil located relatively closer to the first metal member may decrease, or the distance between the power transmission coil and a portion of the power reception coil located relatively closer to the second metal member may decrease.

When the distance between the power transmission coil and the portion of the power reception coil located relatively closer to the first metal member decreases, the amount of magnetic flux entering the first metal member increases and eddy current formed in the surface of the first metal member also increases. Accordingly, even when the distance between the power transmission coil and the portion of the power reception coil located relatively closer to the first metal member decreases, the amount of magnetic flux passing through the first facing portion of the power reception coil increases merely slightly.

Moreover, as the distance between the power transmission coil and the portion of the power reception coil located relatively closer to the second metal member decreases, the amount of magnetic flux entering the second metal member increases and eddy current formed inside the surface of the second metal member also increases. Thus, the amount of magnetic flux entering the second facing portion of the power reception coil decreases. Accordingly, even when the distance between the power transmission coil and the portion of the power reception coil located relatively closer to the second metal member decreases, the amount of magnetic flux passing through the second facing portion of the power reception coil increases merely slightly.

A comparison is made between the increase of the amount of magnetic flux passing through the first facing portion when the aforementioned positional displacement occurs and the increase of the amount of magnetic flux passing through the second facing portion when the aforementioned positional displacement occurs. As a result, the increase of the amount of magnetic flux passing through the second facing portion is smaller.

The reason is that because the second metal member is closer to the ground than the first metal member, the amount of magnetic flux entering the second metal member is larger and the amount of eddy current formed in the surface of the second metal member is larger, when the positional displacement occurs.

In view of the above, the number of turns of the second facing portion of the power reception coil is made larger than the number of turns of the first facing portion to suppress occurrence of a difference in coupling coefficient between the power reception coil and the power transmission coil, even when the above-described positional displacement occurs.

The foregoing and other objects, features, aspects and advantages of the present disclosure will become more apparent from the following detailed description when taken in conjunction with the accompanying drawings.

BRIEF DESCRIPTION OF THE DRAWINGS

FIG. 44 is a plan view showing a modification of wireless charging system 1.

FIG. 45 is a plan view showing a state where a power transmission coil 10 is positionally displaced to be closer to a muffler 55.

DESCRIPTION OF PREFERRED EMBODIMENTS

First Embodiment

Figure 1:
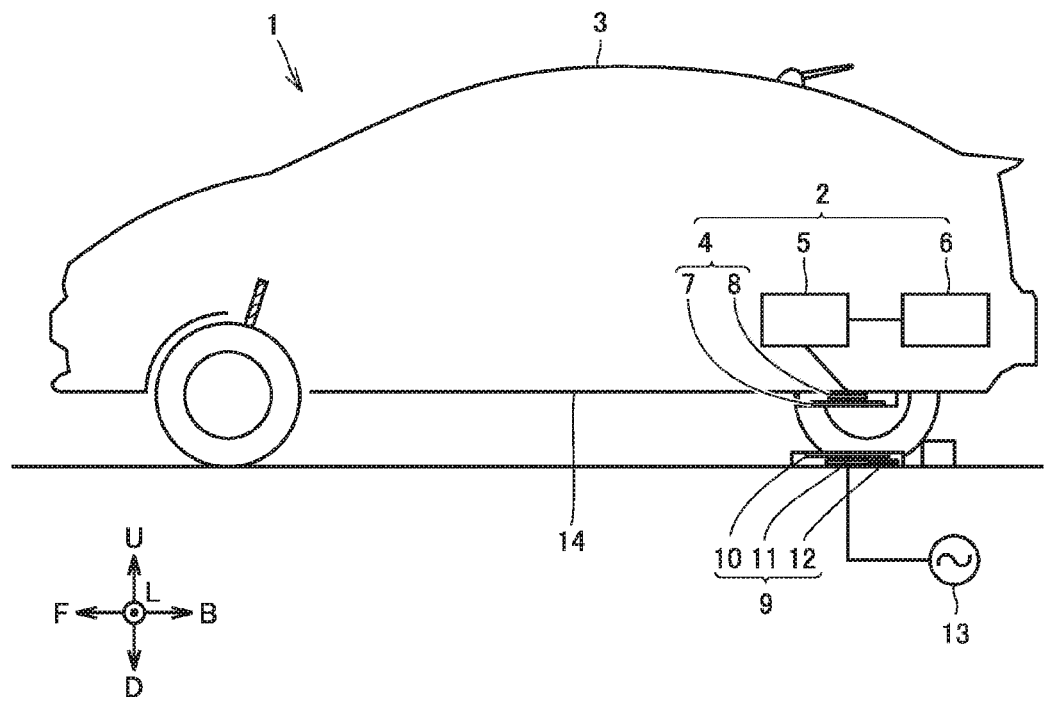
FIG. 1 a schematic diagram showing a wireless charging system 1.

FIG. 1 is a schematic diagram showing a wireless charging system 1. As shown in FIG. 1, wireless charging system 1 includes a power transmission apparatus 9 and a vehicle 3 having a power reception unit 2.

Power reception unit 2 includes a power reception apparatus 4 provided at a bottom surface 14 of vehicle 3, a rectifier 5 converting AC power received by power reception apparatus 4 to DC power, and a battery 6 storing the DC power from rectifier 5. Power reception apparatus 4 includes a power reception coil 7 and a capacitor 8. Power transmission apparatus 9 includes a power transmission coil 10, a capacitor 11, and a frequency converter 12, and power transmission apparatus 9 is connected to a power supply 13.

Figure 2:
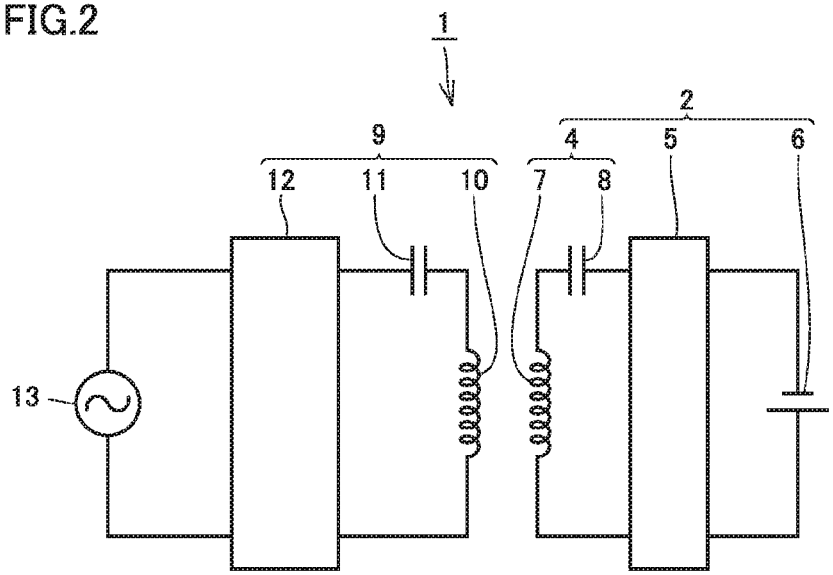
FIG. 2 is a circuit diagram schematically showing a circuit of wireless charging system 1.

FIG. 2 is a circuit diagram schematically showing a circuit of wireless charging system 1. As shown in FIG. 2, capacitor 8 is connected in series to power reception coil 7, and power reception coil 7 and capacitor 8 form a series LC resonant circuit. Capacitor 11 is connected in series to power transmission coil 10, and power transmission coil 10 and capacitor 11 form a series LC resonant circuit.

The resonant circuit formed by power transmission coil 10 and capacitor 11 and the resonant circuit formed by power reception coil 7 and capacitor 8 are configured to have respective resonant frequencies which are equal or substantially equal to each other.

Moreover, the resonant circuit formed by power transmission coil 10 and capacitor 11 and the resonant circuit formed by power reception coil 7 and capacitor 8 are configured to have respective Q factors which are both 100 or more.

In this way, the transmitter's resonant circuit and the receiver's resonant circuit are configured to enable electric power to be transferred at high efficiency even when the distance between power reception apparatus 4 and power transmission apparatus 9 is large.

Figure 3:
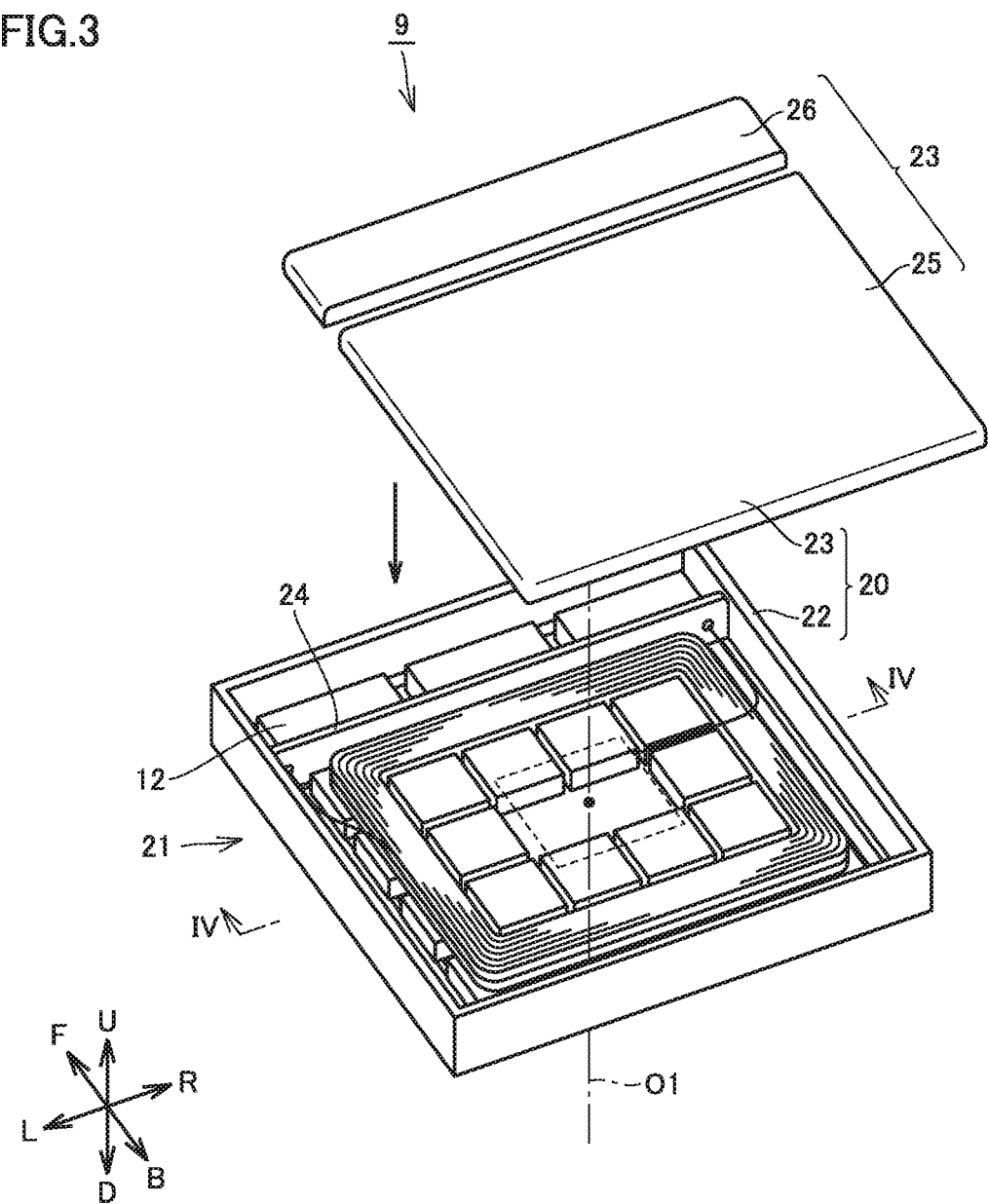
FIG. 3 is an exploded perspective view showing a power transmission apparatus 9.

FIG. 3 is an exploded perspective view showing power transmission apparatus 9. As shown in FIG. 3, power transmission apparatus 9 includes a housing 20, a coil unit 21 housed in housing 20, and a frequency converter 12. Housing 20 includes a case body 22 having an opening formed to open upward, and a lid 23 provided to close the opening of case body 22.

Case body 22 includes a partition member 24 that separates a space housing coil unit 21 and a space housing frequency converter 12 from each other. Case body 22 is formed of a metal material.

Lid 23 includes a resin lid 25 closing the space housing coil unit 21, and a metal lid 26 closing the space housing frequency converter 12.

Figure 4:
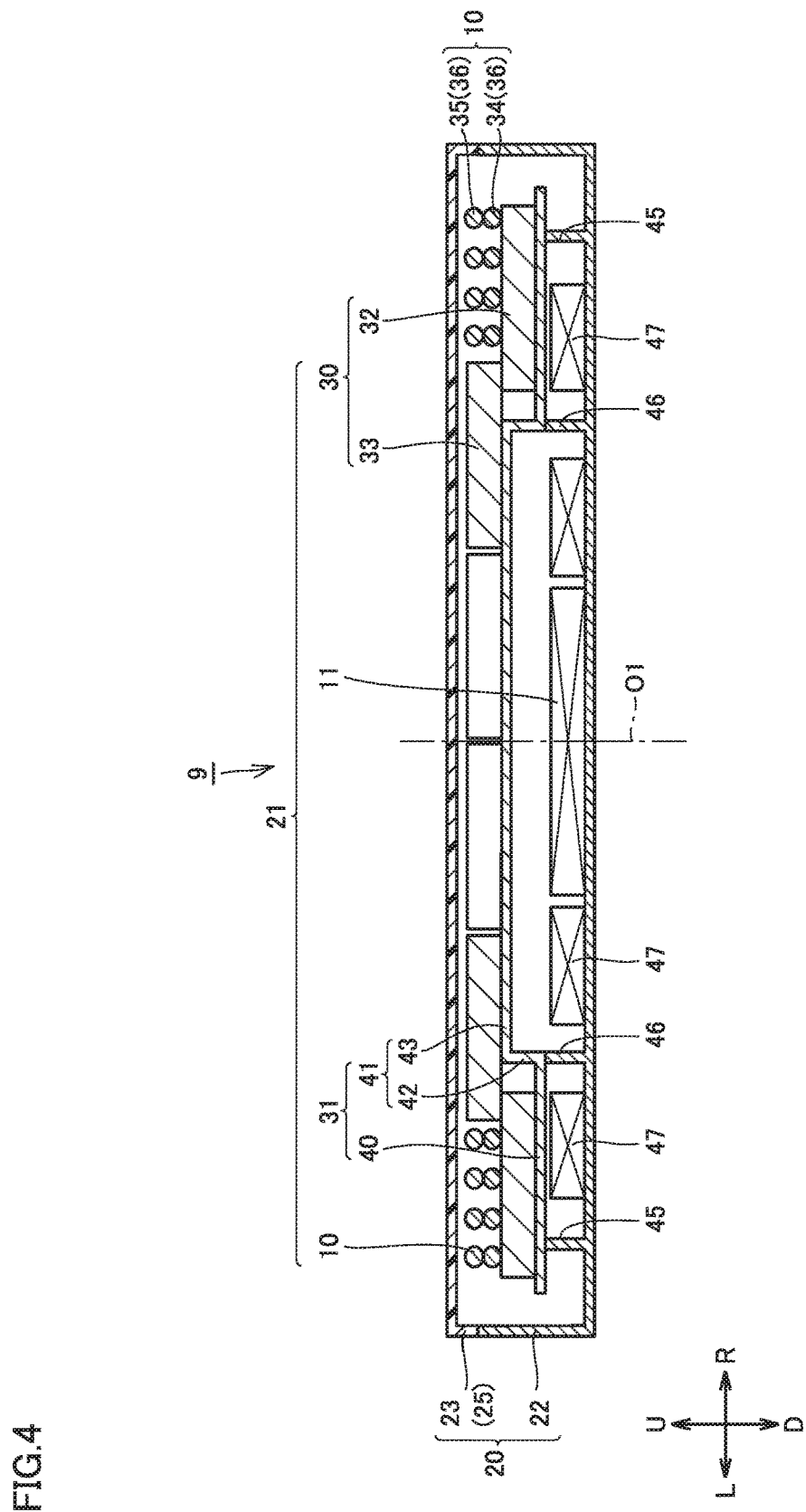
FIG. 4 is a cross-sectional view along a line IV-IV in FIG. 3.

FIG. 4 is a cross-sectional view along a line IV-IV in FIG. 3. As shown in FIG. 4, coil unit 21 includes power transmission coil 10, a ferrite core 30 having an upper surface on which power transmission coil 10 is disposed, a metal support plate 31 provided on the lower surface of ferrite core 30, and capacitor 11 provided at the lower surface of metal support plate 31 and connected to power transmission coil 10.

Ferrite core 30 includes an annular core 32 having an upper surface on which power transmission coil 10 is disposed, and a central core 33 disposed to overlap the inner peripheral edge of annular core 32.

Figure 5:
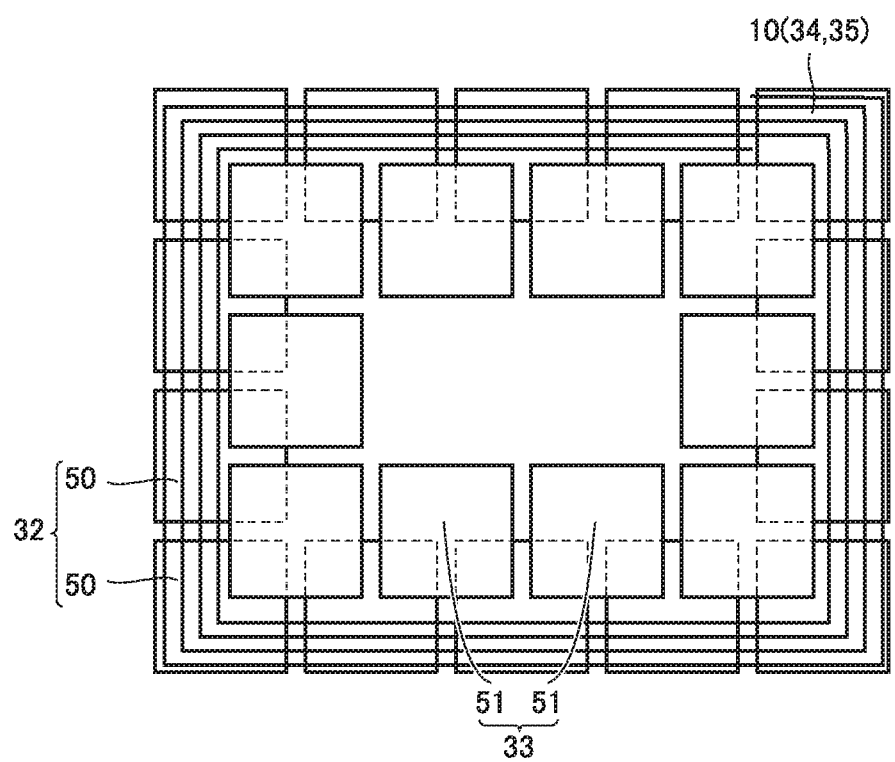
FIG. 5 is a plan view as seen from above a power transmission coil 10 and a ferrite core 30.

FIG. 5 is a plan view as seen from above power transmission coil 10 and ferrite core 30. As shown in FIG. 5, annular core 32 includes a plurality of division core members 50 arranged annularly and spaced apart from one another. Central core 33 includes a plurality of division core members 51 arranged annularly and spaced apart from one another.

As shown in FIG. 4, power transmission coil 10 includes a lower coil 34 disposed on the upper surface of annular core 32, and an upper coil 35 disposed on lower coil 34.

Lower coil 34 is formed of a coil wire 36 wound to surround a winding axis O1, and upper coil 35 is also formed of coil wire 36 wound to surround winding axis O1. Lower coil 34 and upper coil 35 are formed to surround central core 33.

Metal support plate 31 includes: a flat portion 40 formed in an annular shape and having an upper surface on which annular core 32 is disposed; and a protruding portion 41 formed in a central region inside flat portion 40 and having an upper surface on which central core 33 is disposed. Protruding portion 41 includes an annular peripheral wall portion 42 extending upward from the inner peripheral edge of flat portion 40, and a ceiling portion 43 formed on the upper end of peripheral wall portion 42. On the upper surface of ceiling portion 43, central core 33 is disposed.

On the bottom surface of case body 22, a plurality of wall portions 45 and a plurality of wall portions 46 are formed, and the lower surface of flat portion 40 is supported by wall portions 45 and wall portions 46.

Between the lower surface of metal support plate 31 and the bottom surface of case body 22, capacitor 11 and a plurality of electrical devices 47 are disposed.

Figure 6:
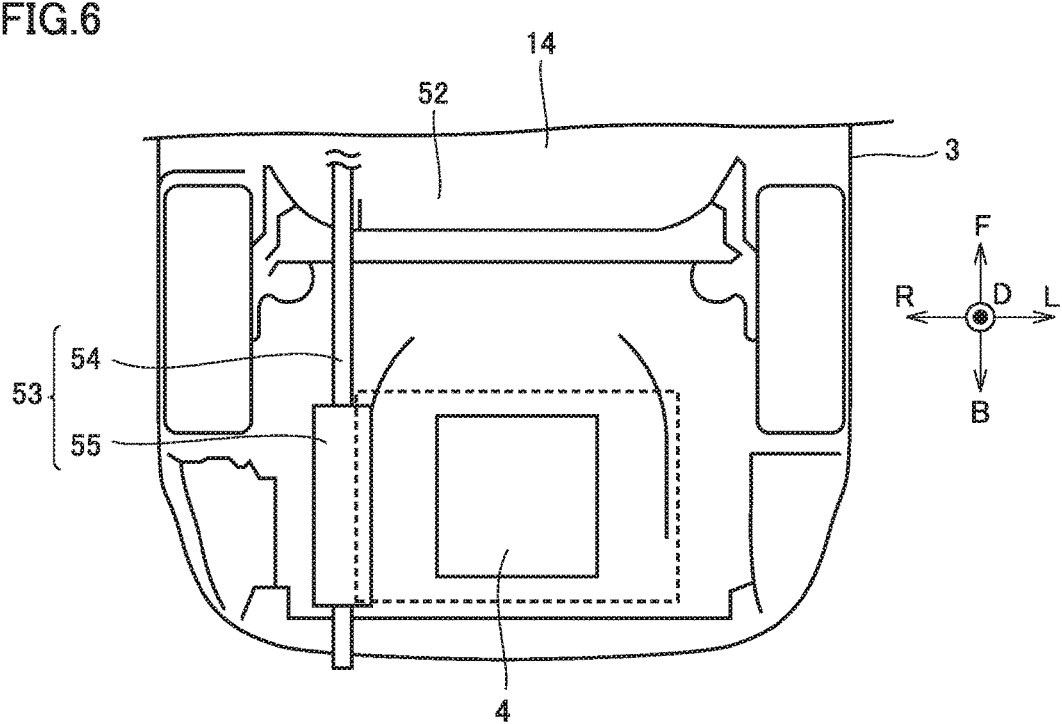
FIG. 6 is a plan view of a bottom surface 14 as seen from below bottom surface 14.

FIG. 6 is a plan view of bottom surface 14 as seen from below bottom surface 14. As shown in FIG. 6, vehicle 3 includes a floor panel 52 which forms the bottom surface of vehicle 3, and an exhaust unit 53 disposed at the lower surface of floor panel 52. Exhaust unit 53 includes an exhaust pipe 54 connected to an engine (not shown), and a muffler 55 to which exhaust pipe 54 is connected. Muffler 55 is disposed in a back region of vehicle 3.

In the example shown in FIG. 6, muffler 55 is disposed at a position which is horizontally adjacent to power reception apparatus 4 in plan view as seen from below bottom surface 14. Specifically, muffler 55 is disposed on the right R side of power reception apparatus 4.

Figure 7:
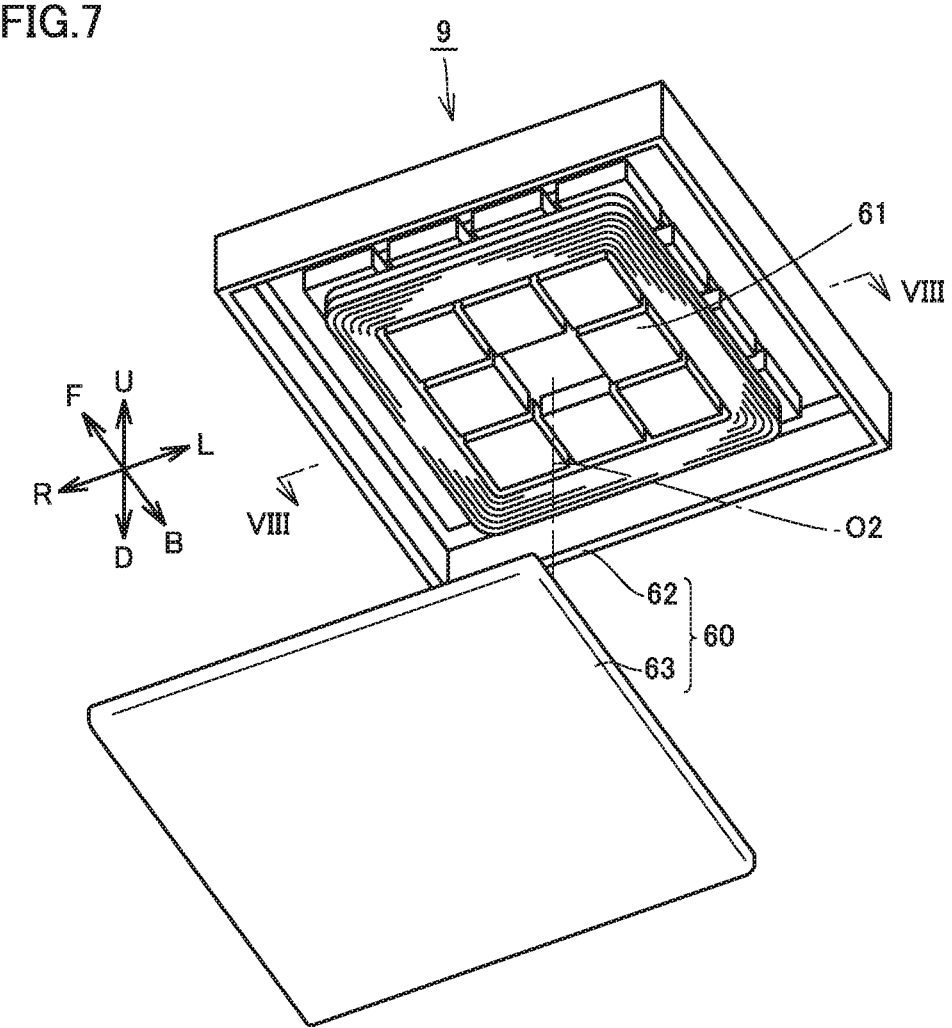
FIG. 7 is an exploded perspective view showing a power reception apparatus 4.

FIG. 7 is an exploded perspective view showing power reception apparatus 4. As shown in FIG. 7, power reception apparatus 4 includes a housing 60 and a power reception coil unit 61 housed in housing 60.

Figure 8:
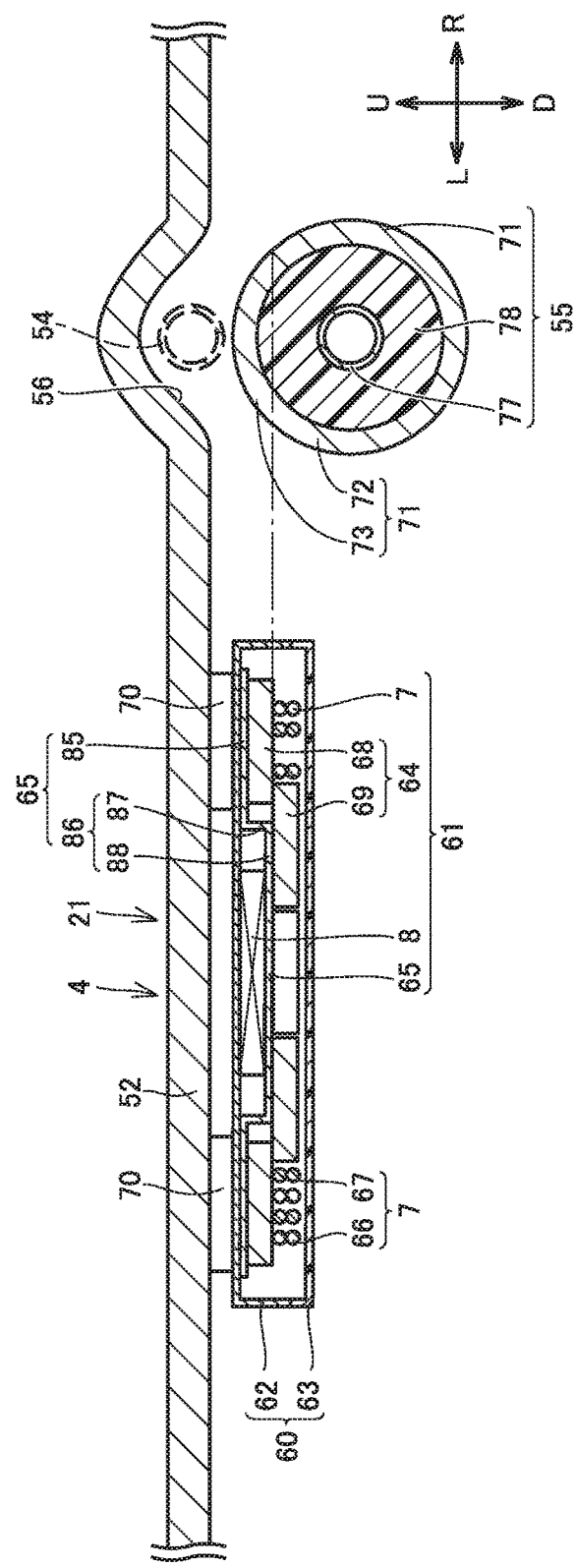
FIG. 8 is a cross-sectional view along a line VIII-VIII shown in FIG. 7.

Housing 60 includes a case body 62 having an opening formed to open downward, and a lid 63 provided to close the opening. Case body 62 is formed of a metal material. Lid 63 is formed of a material which can transmit magnetic flux therethrough. For example, the lid is formed of resin. FIG. 8 is a cross-sectional view along a line VIII-VIII shown in FIG. 7. As shown in FIG. 8, power reception coil unit 61 includes power reception coil 7, a ferrite core 64 having a lower surface on which power reception coil 7 is disposed, a metal support member 65 having a lower surface on which ferrite core 64 is provided, and capacitor 8 disposed at the upper surface of metal support member 65.

Power reception coil 7 includes a lower coil 66 and an upper coil 67 disposed at the upper surface of lower coil 66.

Ferrite core 64 includes an annular core 68 formed in an annular shape, and a central core 69 disposed at the lower surface of annular core 68. Central core 69 is disposed to contact the inner peripheral edge of annular core 68. On the upper surface of power reception apparatus 4, a fixture member 70 is provided. Fixture member 70 fixes power reception apparatus 4 to the lower surface of floor panel 52. It should be noted that "power reception apparatus 4 is disposed at the bottom surface" encompasses both the case where "power reception apparatus 4 is directly fixed to floor panel 52" and the case where "power reception apparatus 4 is disposed below floor panel 52 and located at a distance from floor panel 52" as shown in FIG. 8.

Metal support member 65 includes an annular flat portion 85 having a lower surface on which annular core 68 is disposed, and a protruding portion 86 having a lower surface on which central core 69 is disposed. Protruding portion 86 includes a peripheral wall portion 87 extending downward from the inner peripheral edge of flat portion 85, and a bottom portion 88 formed on the lower end of peripheral wall portion 87.

Muffler 55 is fixed at the lower surface of floor panel 52 by means of a fixture member (not shown). Muffler 55 includes an inner pipe 77, a silencing material 78 provided to surround the periphery of inner pipe 77, and a metal cover 71 which covers inner pipe 77 and silencing material 78. Metal cover 71 is formed for example of a metal material containing at least one of iron and stainless steel as a main component, and the magnetic permeability of the metal material of metal cover 71 is higher than the magnetic permeability of aluminum.

Specifically, when a main component of the metal material of metal cover 71 is iron, the metal material may be any of 99.95% pure iron, 99.8% pure iron, iron-cobalt alloy, Permalloy (registered trademark) (Fe—Ni alloy), silicon steel (alloy containing iron and a small amount of silicon), and the like. Alternatively, when a main component of the metal material of metal cover 71 is stainless steel, the metal material may be any of ferrite-based stainless steel and martensite-based stainless steel.

Aluminum has a magnetic permeability of $1.256 \times 10^{-6}$ [H/m]. Iron (99.95% pure iron) has a magnetic permeability of $2.5 \times 10^{-1}$ [H/m], and iron (99.8% pure iron) has a magnetic permeability of $6.3 \times 10^{-3}$ [H/m]. Iron-cobalt alloy has a magnetic permeability of $2.3 \times 10^{-2}$ [H/m], and Permalloy (Fe—Ni alloy) has a magnetic permeability of $1.0 \times 10^{-2}$ [H/m]. Silicon steel (alloy containing iron and a small amount of silicon) has a magnetic permeability of $5.0 \times 10^{-3}$ [H/m].

Ferrite-based stainless steel has a magnetic permeability on the order of $1.26 \times 10^{-3}$ [H/m] to $2.26 \times 10^{-3}$ [H/m]. Martensite-based stainless steel has a magnetic permeability on the order of $9.42 \times 10^{-4}$ [H/m] to $1.19 \times 10^{-3}$ [H/m].

Thus, the metal material containing at least one of iron and stainless steel as a main component has a higher magnetic permeability than aluminum, and allows magnetic flux to more easily pass through the inside than aluminum.

As shown in FIG. 8, metal cover 71 includes a lower portion 72 and an upper portion 73. Lower portion 72 is located at the same level as power reception coil 7 or located lower than power reception coil 7. Upper portion 73 is located higher than power reception coil 7.

Floor panel 52 has a groove 56 formed thereon. A part of exhaust pipe 54 is located within groove 56, and exhaust pipe 54 is located higher than power reception coil 7. Exhaust pipe 54 is also formed of a metal material similar to the metal material for metal cover 71.

Figure 9:
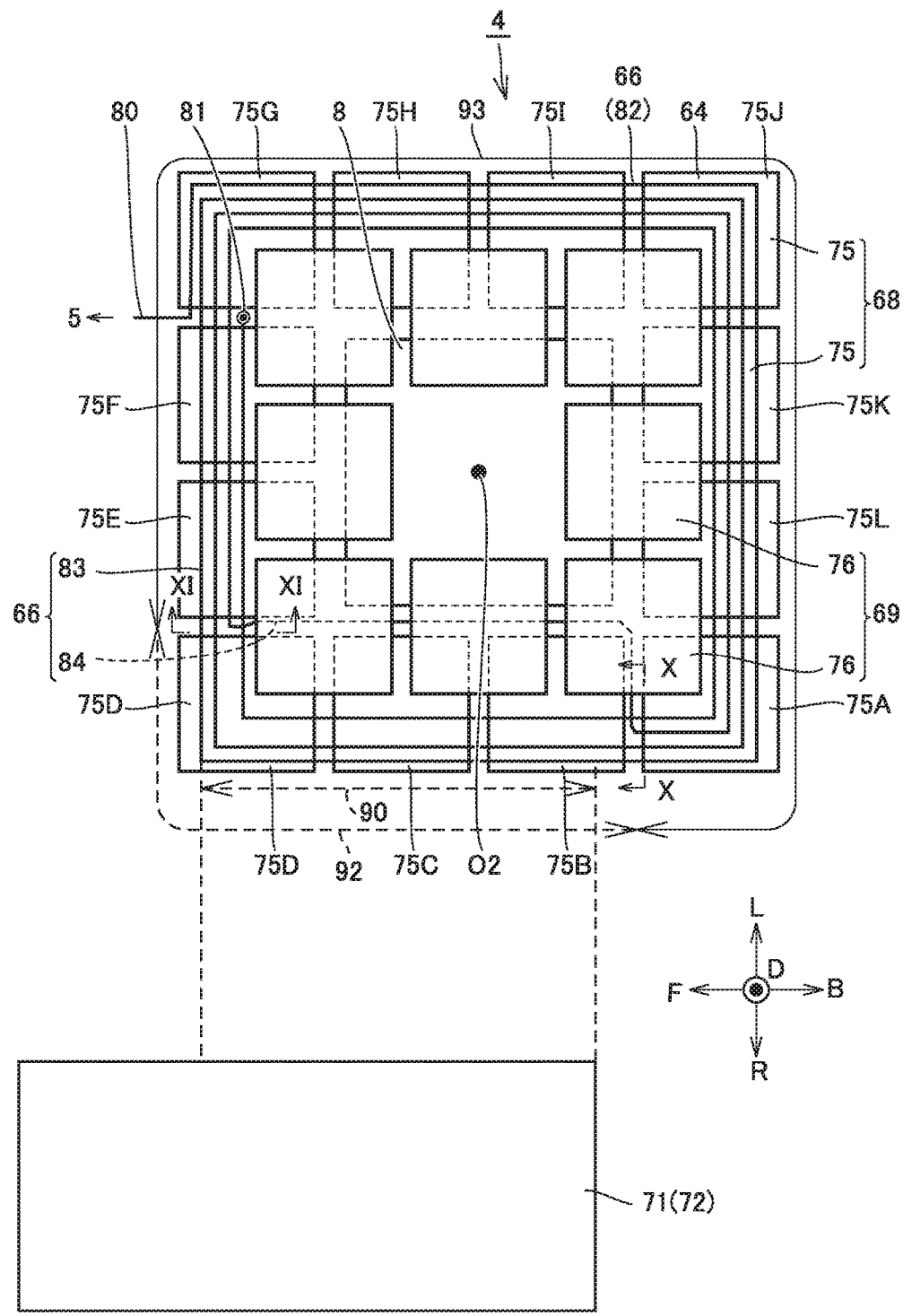
FIG. 9 is a plan view showing components such as a lower coil 66 and a ferrite core 64.

FIG. 9 is a plan view showing components such as lower coil 66 and ferrite core 64. In FIG. 9, components such as upper coil 67 are not shown. As shown in FIG. 9, annular core 68 includes a plurality of division core members 75 arranged annularly and spaced apart from one another, and central core 69 includes a plurality of division core members 76 disposed annularly and spaced apart from one another.

Specifically, annular core 68 includes division core members 75A to 75L. Along the right R side of annular core 68, division core members 75A to 75D are aligned in order from the back to the front of the vehicle.

Along the front F side of annular core 68, division core members 75D to 75G are aligned in order from the right to the left of the vehicle.

Along the left L side of annular core 68, division core members 75G to 75J are aligned in order from the front to the back of the vehicle.

Along the back B side of annular core 68, division core members 75J to 75A are aligned in order from the left to the right of the vehicle.

Lower coil 66 includes an end 80 connected to rectifier 5 and an end 81 connected to upper coil 67.

Lower coil 66 includes a coil body 83 and a crossover wire 84, and coil body 83 forms most of lower coil 66.

Coil body 83 is formed of a coil wire 82 wound to surround a winding axis O2, and the distance from winding axis O2 increases as the wire extends from end 81 toward end 80.

Figure 10:
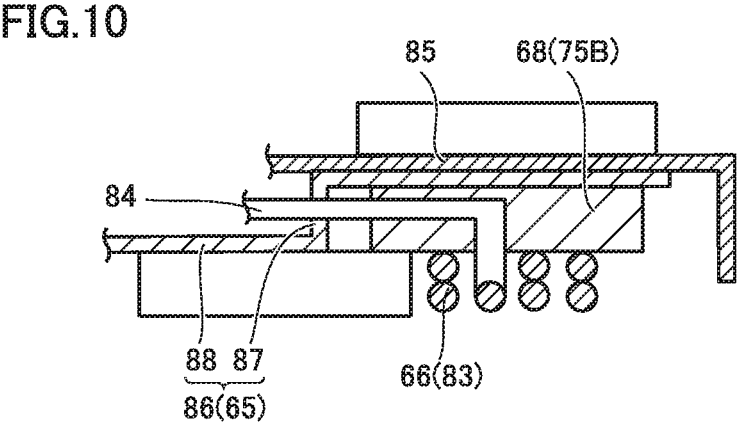
FIG. 10 is a cross-sectional view along a line X-X shown in FIG. 9, illustrating one end of a crossover wire 84 and its surroundings.
Figure 11:
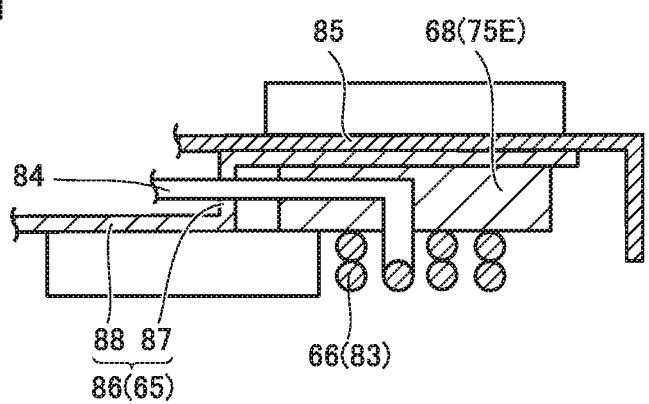
FIG. 11 is a cross-sectional view along a line XI-XI shown in FIG. 9, illustrating the other end of crossover wire 84 and its surroundings.

FIG. 10 is a cross-sectional view along a line X-X shown in FIG. 9, illustrating one end of a crossover wire 84 and its surroundings. As shown in FIGS. 9 and 10, crossover wire 84 extends through a gap between division core member 75A and division core member 75B, penetrates a hole formed in peripheral wall portion 87, and enters the inside of protruding portion 86. FIG. 11 is a cross-sectional view along a line XI-XI shown in FIG. 9, illustrating the other end of crossover wire 84 and its surroundings. As shown in FIGS. 9 and 11, crossover wire 84 penetrates a hole formed in peripheral wall portion 87 and is drawn from inside protruding portion 86. Then, crossover wire 84 extends through the gap between division core member 75D and division core member 75E and is connected to coil body 83.

Thus, crossover wire 84 extends in metal support member 65, and therefore, as shown in FIG. 9, coil body 83 of lower coil 66 includes a low-turn-count portion 92 with a smaller number of turns and a high-turn-count portion 93 with a larger number of turns than low-turn-count portion 92. Of lower coil 66, the portion located on the lower surface of division core members 75B, 75C, 75D is low-turn-count portion 92. Of lower coil 66, the portion located at the lower surface of division core members 75E to 75A is high-turn-count portion 93.

Here, as shown in FIG. 9, in plan view as seen from below lower coil 66 and muffler 55, a portion of coil body 83 of lower coil 66 that faces lower portion 72 of metal cover 71 is defined as a facing portion 90. Specifically, in FIGS. 8 and 9, it is supposed that lower portion 72 is projected in the left direction L. Then, the portion that overlaps lower coil 66 corresponds to facing portion 90. Namely, the portion where lower portion 72 and lower coil 66 are adjacent to each other is facing portion 90.

In the example shown in FIG. 9, low-turn-count portion 92 is located in facing portion 90. Specifically, low-turn-count portion 92 is disposed so that facing portion 90 is located in a part of low-turn-count portion 92. Low-turn-count portion 92 may be located in a part of facing portion 90.

Figure 12:
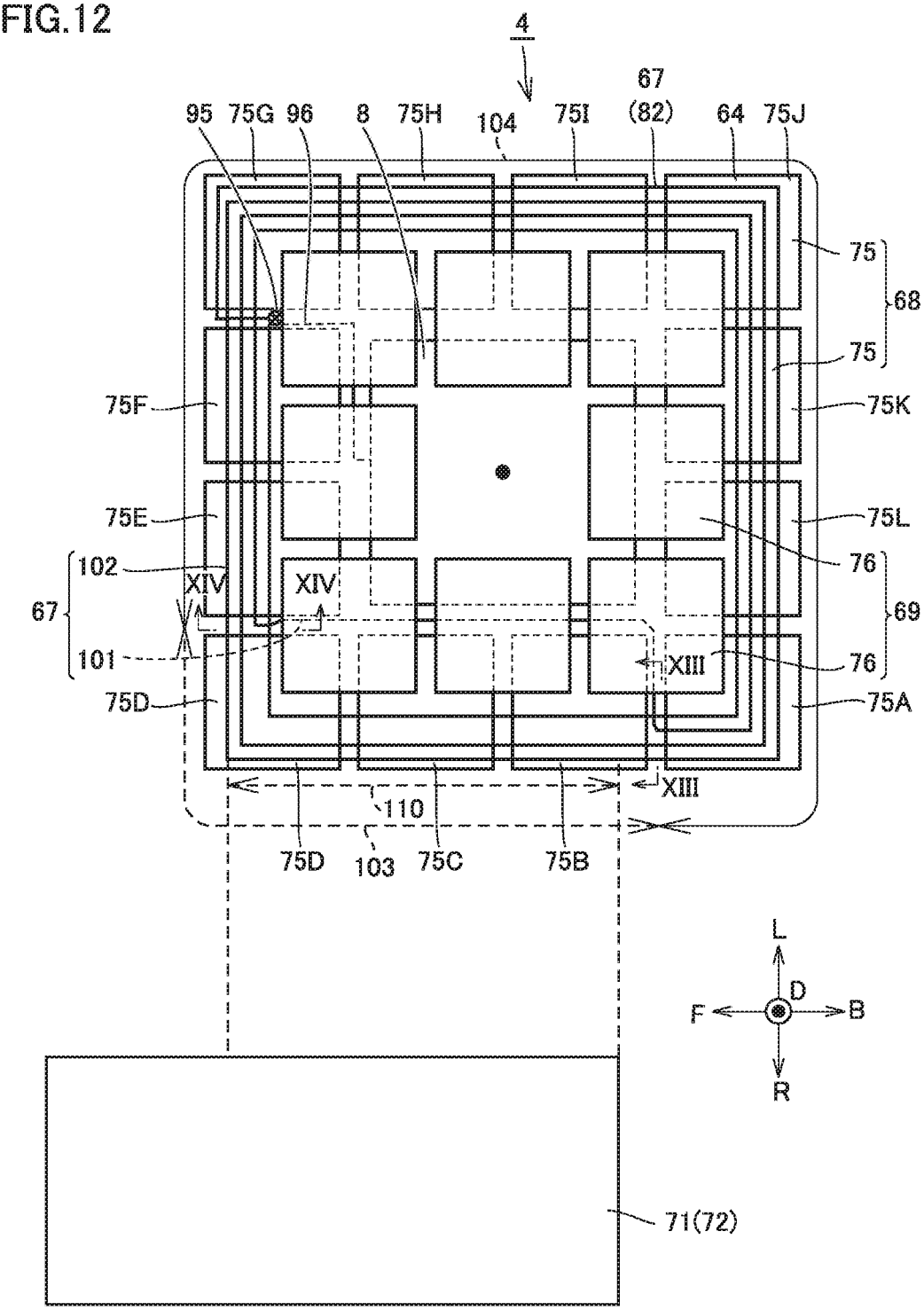
FIG. 12 is a plan view of components such as an upper coil 67 and a ferrite core 64 as seen from below upper coil 67 and ferrite core 64.

FIG. 12 is a plan view of components such as upper coil 67 and ferrite core 64 as seen from below upper coil 67 and ferrite core 64. In FIG. 12, components such as lower coil 66 are not shown.

As shown in FIG. 12, upper coil 67 includes an end 95 connected to end 81 of lower coil 66, an end 96 connected to capacitor 8, a coil body 102, and a crossover wire 101. Coil body 102 forms most of upper coil 67.

Coil body 102 is formed of coil wire 82 wound to surround winding axis O2, and the distance from winding axis O2 decreases as the wire extends from end 95 toward end 96.

Figure 13:
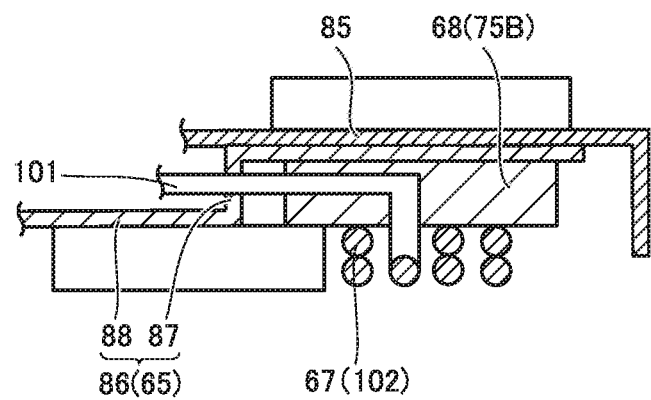
FIG. 13 is a cross-sectional view along a line XIII-XIII shown in FIG. 12.

FIG. 13 is a cross-sectional view along a line XIII-XIII shown in FIG. 12. As shown in FIGS. 12 and 13, one end of crossover wire 101 extends through a gap between division core members 75, penetrates a hole formed in peripheral wall portion 87, and is drawn to the inside of protruding portion 86. Specifically, from the gap between division core member 75A and division core member 75B, crossover wire 101 is drawn to the inside of metal support member 65.

Figure 14:
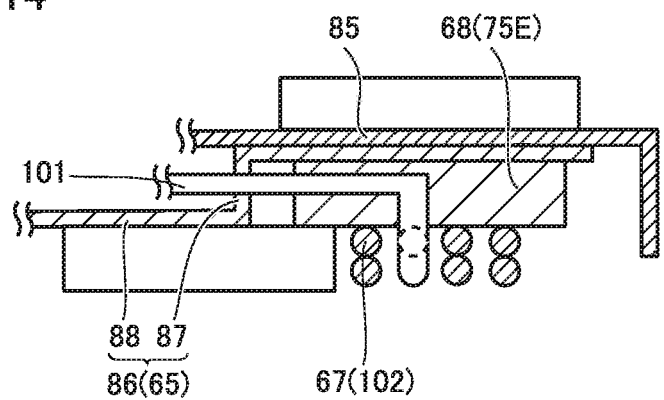
FIG. 14 is a cross-sectional view along a line XIV-XIV shown in FIG. 12.

FIG. 14 is a cross-sectional view along a line XIV-XIV shown in FIG. 12. In FIG. 14, the other end of crossover wire 101 also penetrates a hole formed in peripheral wall portion 87, extends through the gap between division core members 75, and is connected to coil body 102. Specifically, crossover wire 101 is drawn out from the gap between division core member 75D and division core member 75E.

Thus, crossover wire 101 extends in metal support member 65, and therefore, as shown in FIG. 12, coil body 102 of upper coil 67 includes a low-turn-count portion 103 with a smaller number of turns and a high-turn-count portion 104 with a larger number of turns than low-turn-count portion 103.

Low-turn-count portion 103 is located at the lower surface of division core members 75B, 75C, 75D, and high-turn-count portion 104 is located at the lower surface of division core members 75E, 75F, 75G, 75H, 75I, 75J, 75K, 75L, 75A.

Therefore, low-turn-count portion 92 of lower coil 66 and low-turn-count portion 103 of upper coil 67 are aligned in the vertical direction. Further, high-turn-count portion 93 of lower coil 66 and high-turn-count portion 104 of upper coil 67 are aligned in the vertical direction.

Here, as shown in FIG. 12, in plan view of upper coil 67 and muffler 55 as seen from below upper coil 67 and muffler 55, a portion of coil body 102 of upper coil 67 facing lower portion 72 of metal cover 71 (supposing that metal cover 71 is projected in the left direction L on upper coil 67, the portion of metal cover 71 that is projected on upper coil 67) is defined as a facing portion 110.

In the example shown in FIG. 12, low-turn-count portion 103 is located in facing portion 110. Specifically, low-turn-count portion 103 is disposed so that facing portion 110 is located in a part of low-turn-count portion 103. Low-turn-count portion 103 may be located in a part of facing portion 110.

Figure 15:
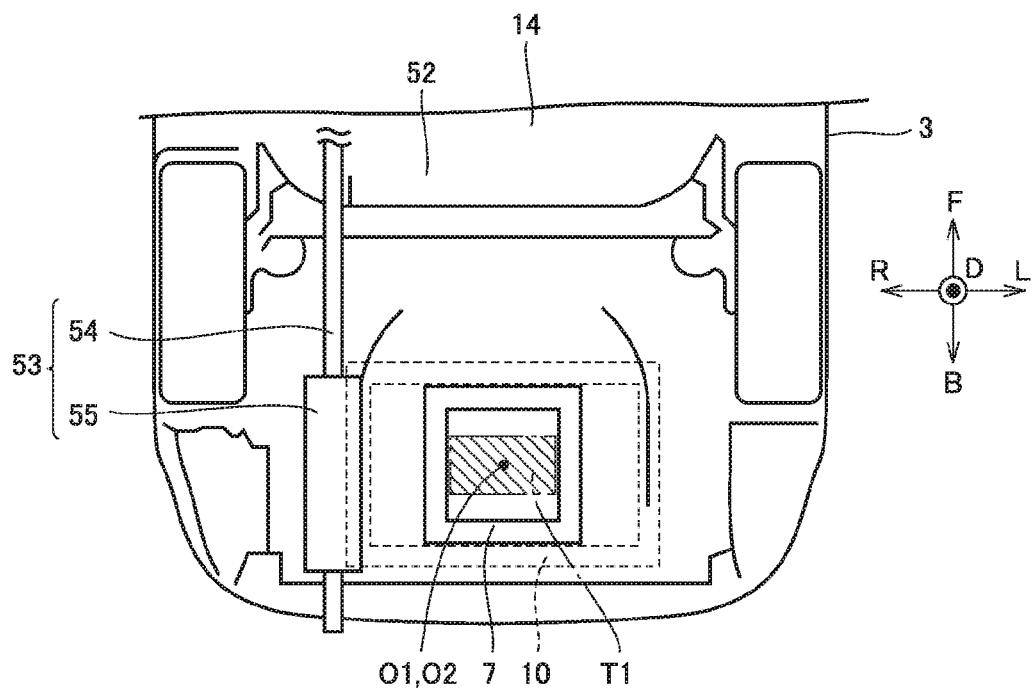
FIG. 15 is a plan view as seen from below a power reception coil 7 and a power transmission coil 10.

FIG. 15 is a plan view as seen from below power reception coil 7 and power transmission coil 10. In FIG. 15, a tolerable range T1 represents a tolerable range of positional displacement of winding axis O1 of power transmission coil 10, from winding axis O2 of power reception coil 7.

When electric power is transmitted from power transmission coil 10 to power reception coil 7 in the state where winding axis O1 of power transmission coil 10 is located in tolerable range T1, the power transmission efficiency of power transmission coil 10 is a predetermined value or more. When electric power is transmitted in the state where winding axis O1 of power transmission coil 10 is located outside tolerable range T1, the power transmission efficiency is smaller than the predetermined value.

In the present embodiment, power transmission from power transmission coil 10 is stopped when the power transmission efficiency of power transmission coil 10 is smaller than the predetermined value.

When winding axis O1 is moved along the outer peripheral edge of tolerable range T1, power reception coil 7 is located in power transmission coil 10. Namely, in plan view of power transmission coil 10 and power reception coil 7 as seen from below power reception coil 7 and power transmission coil 10, power reception coil 7 receives electric power from power transmission coil 10 in the state where power reception coil 7 is located in power transmission coil 10.

Further, when winding axis O1 is moved along the outer peripheral edge of tolerable range T1, at least a part of muffler 55 is located in the outer peripheral edge of the trajectory formed by the outer peripheral edge of power transmission coil 10. In other words, in the present embodiment, a metal member to be provided is a metal member which is at least partially located in the outer peripheral edge of the trajectory of the outer peripheral edge of power transmission coil 10 when power transmission coil 10 is moved along the outer peripheral edge of tolerable range T1. This is because a metal member provided at a position further away from power transmission coil 10 or power reception coil 7 has a small influence on the electric power transfer.

As to electric power transfer by means of power reception apparatus 4 and power transmission apparatus 9 configured in the above-described manner, a description will be given using FIG. 16 for example.

Figure 16:
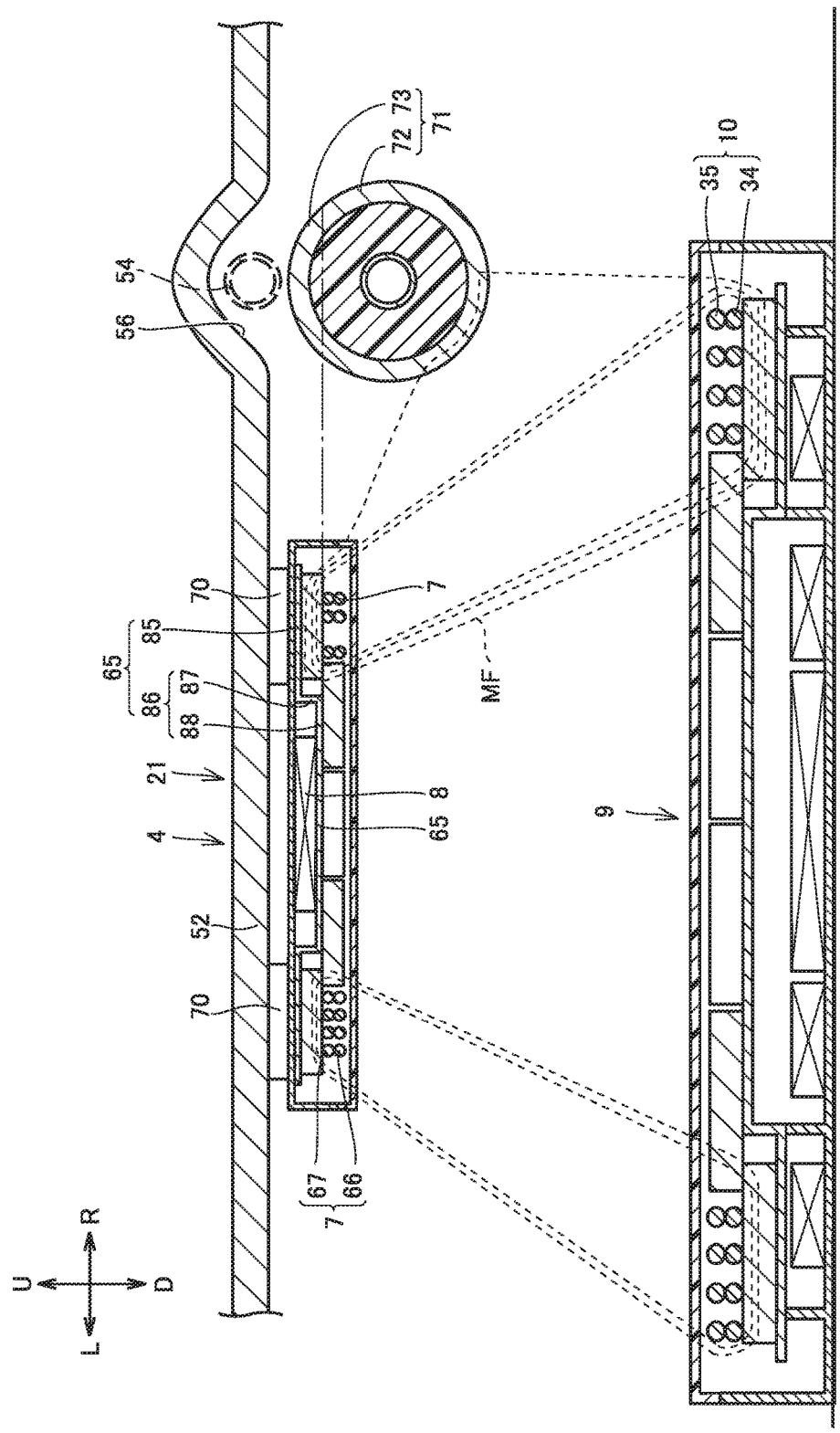
FIG. 16 is a cross-sectional view showing a state where electric power is transmitted from power transmission apparatus 9 to power reception apparatus 4 with a winding axis O1 coinciding with a winding axis O2.

FIG. 16 is a cross-sectional view showing a state where electric power is transmitted from power transmission apparatus 9 to power reception apparatus 4 with winding axis O1 coinciding with winding axis O2. As shown in FIG. 16, in the state where power transmission apparatus 9 and power reception apparatus 4 are positionally aligned (the state where winding axis O1 coincides with winding axis O2 in plan view of power reception coil 7 and power transmission coil 10), the distance between the right side portion of power reception coil 7 and the right side portion of power transmission coil 10 is identical to the distance between the left side portion of power reception coil 7 and the left side portion of power transmission coil 10.

Moreover, the distance between the front side portion of power reception coil 7 and the front side portion of power transmission coil 10 is also identical to the distance between the back side portion of power reception coil 7 and the back side portion of power transmission coil 10.

The amount of magnetic flux MF emitted from power transmission coil 10 and passing through power reception coil 7 is basically inversely proportional to the distance between power transmission coil 10 and power reception coil 7. Therefore, in the case where muffler 55 is absent, the amount of magnetic flux passing through the right side portion of power reception coil 7 is identical to the amount of magnetic flux passing through the left side portion of power reception coil 7.

In contrast, in the case where muffler 55 is disposed in the vicinity of power reception coil 7 like the present embodiment, a change occurs to the distribution of magnetic flux passing through power reception coil 7.

As shown in FIG. 16, a part of magnetic flux MF emitted from power transmission coil 10 enters metal cover 71 of muffler 55. As described above, metal cover 71 is formed of a metal having a high magnetic permeability. Therefore, magnetic flux MF entering metal cover 71 flows well in metal cover 71.

Then, after flowing in metal cover 71, magnetic flux MF is emitted from the surface of metal cover 71 to the outside. Here, in the horizontal direction, lower portion 72 of metal cover 71 is located at the same position as or lower than power reception coil 7. Thus, a part of magnetic flux MF entering lower portion 72 is emitted from lower portion 72 toward power reception coil 7 and passes through power reception coil 7.

Here, magnetic flux MF which is to enter metal cover 71 would hardly pass through power reception coil 7 if metal cover 71 is absent. As metal cover 71 is present, a part of the magnetic flux is guided toward power reception coil 7.

In particular, iron has an electrical resistance of $1.00 \times 10^{-7}$ ($\Omega$m) and stainless steel has an electrical resistance of $7.2 \times 10^{-7}$ ($\Omega$m). The electrical resistance of a metal containing iron or stainless steel as a main component is higher than the electrical resistance ($2.65 \times 10^{-8}$ ($\Omega$m)) of aluminum.

Therefore, when magnetic flux enters metal cover 71, eddy current is less prone to flow in the surface of metal cover 71. Because eddy current is less prone to flow, the strength of magnetic field generated by the eddy current is weak and the magnetic flux reaching metal cover 71 is less prone to be reflected.

Thus, magnetic flux MF from power transmission coil 10 is prone to enter metal cover 71. Since metal cover 71 has a high magnetic permeability, magnetic flux MF entering metal cover 71 flows well in metal cover 71 and more magnetic flux MF is guided to power reception coil 7.

Therefore, in a part of power reception coil 7 that is located in the vicinity of metal cover 71, more magnetic flux MF passes as compared with the remaining part.

Because upper portion 73 is located higher than power reception coil 7, magnetic flux MF entering metal cover 71 and thereafter emitted from upper portion 73 hardly passes through power reception coil 7.

Exhaust pipe 54 is also formed of a metal material similar to that for metal cover 71. Magnetic flux MF entering exhaust pipe 54 flows well in exhaust pipe 54. In contrast, exhaust pipe 54 is located higher than power reception coil 7, and it hardly occurs that magnetic flux MF flowing through exhaust pipe 54 is emitted toward power reception coil 7.

Thus, metal cover 71 includes lower portion 72 which is located lower than power reception coil 7. Therefore, in a part of power reception coil 7 that is adjacent to lower portion 72, more magnetic flux passes.

Figure 17:
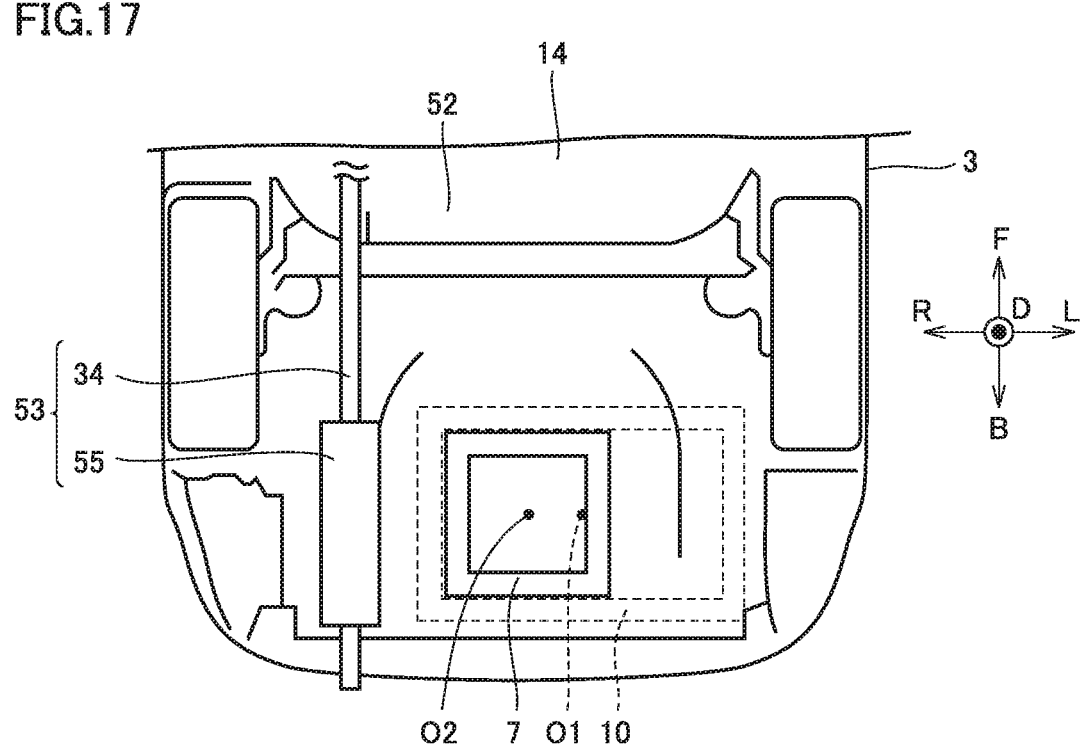
FIG. 17 is a plan view as seen from below power transmission coil 10 and power reception coil 7, illustrating a state where power transmission coil 10 is positionally displaced in the left direction L from power reception coil 7.
Figure 18:
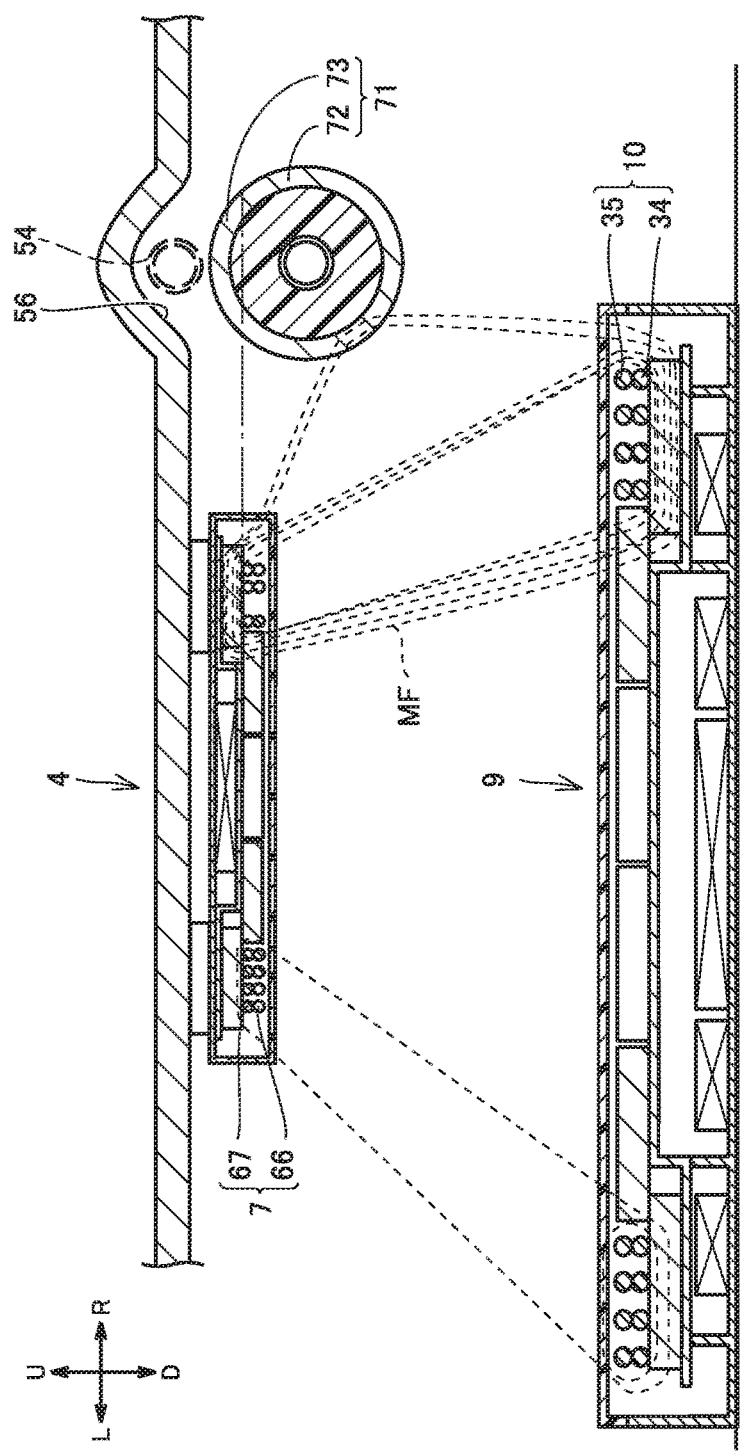
FIG. 18 is a cross-sectional view showing a state where power transmission coil 10 is positionally displaced in the left direction L from power reception coil 7, relative to the state where power reception coil 7 and power transmission coil 10 are positionally aligned with each other.

FIG. 17 is a plan view as seen from below power transmission coil 10 and power reception coil 7, illustrating a state where power transmission coil 10 is positionally displaced in the left direction L from power reception coil 7. FIG. 18 is a cross-sectional view showing a state where power transmission coil 10 is positionally displaced in the left direction L from power reception coil 7, relative to the state where power reception coil 7 and power transmission coil 10 are positionally aligned with each other.

As shown in FIG. 18, when power transmission coil 10 is positionally displaced in the left direction L, the distance between the right side portion of power transmission coil 10 and the right side portion of power reception coil 7 decreases. Meanwhile, the distance between the left side portion of power transmission coil 10 and the left side portion of power reception coil 7 increases.

As a result, while more magnetic flux MF flows through the right side portion of power transmission coil 10 and the right side portion of power reception coil 7, less magnetic flux MF flows through the left side portion of power transmission coil 10 and the left side portion of power reception coil 7. Most of magnetic flux MF emitted from the left side portion of power transmission coil 10 does not flow toward power reception coil 7, but flows to surround the left side portion of power transmission coil 10 and thus form a self-closing loop of magnetic flux.

Thus, as the amount of magnetic flux flowing through the right side portion of power transmission coil 10 and the right side portion of power reception coil 7 increases, magnetic flux MF entering metal cover 71 increases. Consequently, magnetic flux MF guided by metal cover 71 to power reception coil 7 also increases. Consequently, more magnetic flux MF passes through the right side portion of power reception coil 7.

In FIGS. 9 and 12, the magnetic flux guided by lower portion 72 to lower coil 66 and upper coil 67 flows through facing portion 90 of lower coil 66 and facing portion 110 of upper coil 67.

Meanwhile, low-turn-count portion 92 is located in facing portion 90 and low-turn-count portion 103 is located in facing portion 110.

Therefore, even when the magnetic flux is guided by lower portion 72 of metal cover 71, an electromotive voltage induced at facing portions 90 and 110 can be made small, since the number of turns of the coil wire of facing portions 90 and 110 is small.

As a result, even when power transmission coil 10 is positionally displaced in the left direction L from power reception coil 7, it can be suppressed that the coupling coefficient between power transmission coil 10 and power reception coil 7 varies largely from the coupling coefficient in the state where power transmission coil 10 and power reception coil 7 are positionally aligned to each other.

Figure 19:
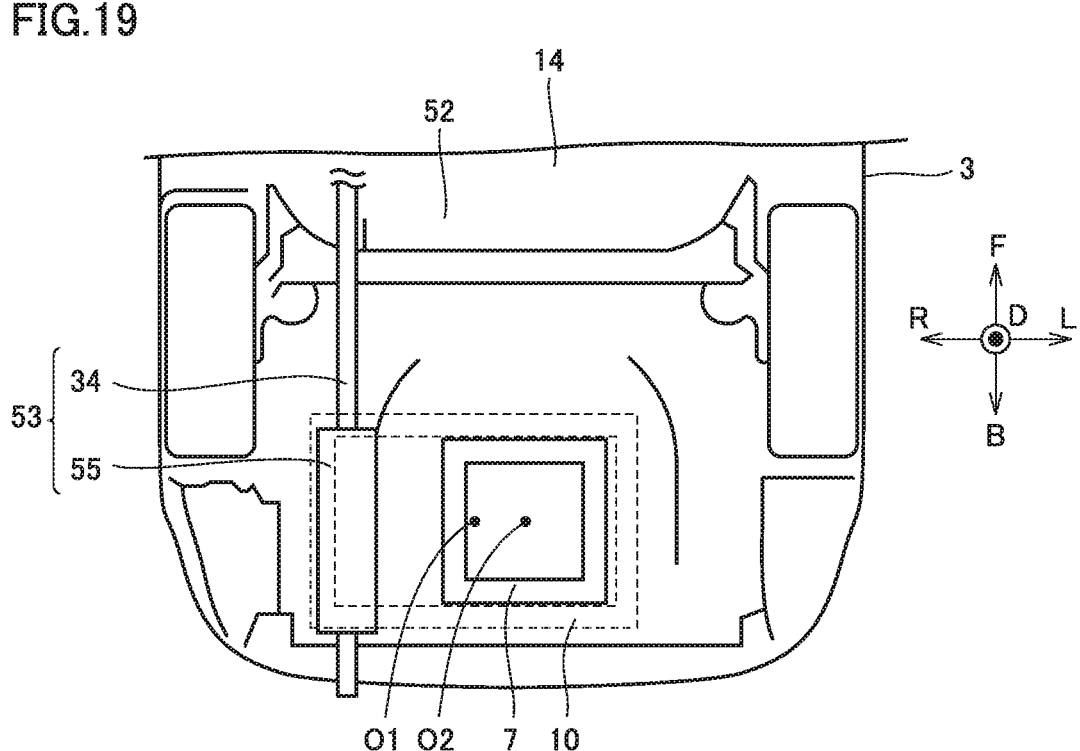
FIG. 19 is a plan view as seen from below power transmission coil 10 and power reception coil 7, illustrating a state where power transmission coil 10 is positionally displaced in the right direction R from power reception coil 7.
Figure 20:
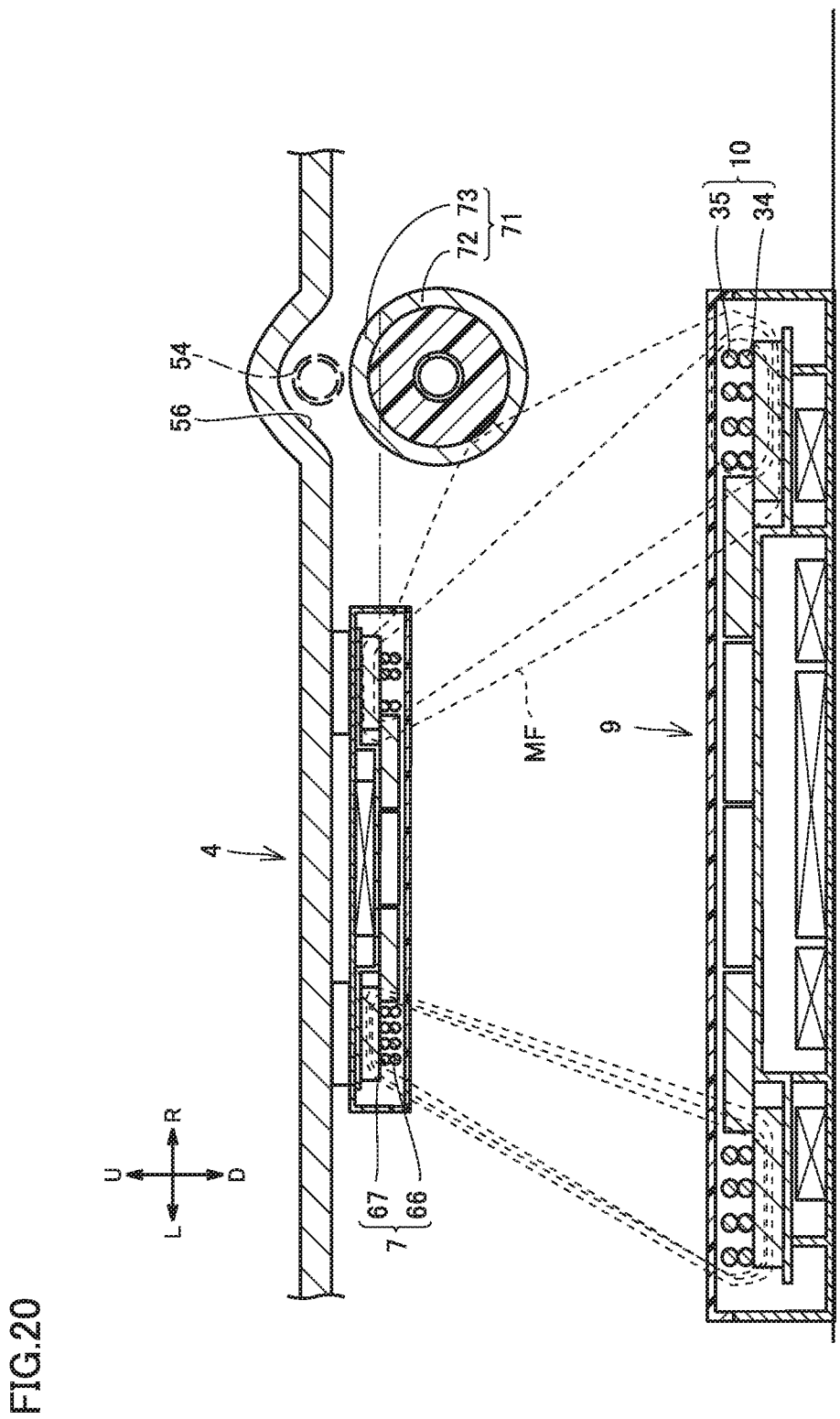
FIG. 20 is a cross-sectional view of a state where power transmission coil 10 is positionally displaced in the right direction R from power reception coil 7.

FIG. 19 is a plan view as seen from below power transmission coil 10 and power reception coil 7, illustrating a state where power transmission coil 10 is positionally displaced in the right direction R from power reception coil 7. FIG. 20 is a cross-sectional view of a state where power transmission coil 10 is positionally displaced in the right direction R from power reception coil 7.

As shown in FIG. 20, as power transmission coil 10 is positionally displaced in the right direction R from power reception coil 7, the distance between the left side portion of power transmission coil 10 and the left side portion of power reception coil 7 decreases. Meanwhile, the distance between the right side portion of power transmission coil 10 and the right side portion of power reception coil 7 increases.

Due to this, the amount of magnetic flux flowing between the right side portion of power transmission coil 10 and the right side portion of power reception coil 7 is smaller than the amount of magnetic flux flowing between the left side portion of power transmission coil 10 and the left side portion of power reception coil 7.

At this time, magnetic flux MF formed in the right side portion of power transmission coil 10 does not flow toward power reception coil 7 but flows to surround the right side portion of power transmission coil 10 and thus forms a self-closing loop of magnetic flux. Accordingly, the amount of magnetic flux entering metal cover 71 decreases and the amount of magnetic flux guided by metal cover 71 to power reception coil 7 also decreases.

Since the amount of magnetic flux guided from metal cover 71 decreases, the amount of magnetic flux passing through power reception coil 7 when power transmission coil 10 is positionally displaced in the left direction L from power reception coil 7 is larger than the amount of magnetic flux passing through power reception coil 7 when power transmission coil 10 is positionally displaced in the right direction R from power reception coil 7.

Meanwhile, in the left side portion of power reception coil 7, high-turn-count portions 93, 104 are located, and the amount of magnetic flux flowing through these portions increase. Consequently, the difference between the coupling coefficient when power transmission coil 10 is positionally displaced in the right direction R from power reception coil 7 and the coupling coefficient when power transmission coil 10 is positionally displaced in the left direction L from power reception coil 7 decreases.

Thus, even when power transmission coil 10 is positionally displaced in the left direction L and the amount of magnetic flux guided by metal cover 71 increases, the number of turns of the coil wire of facing portions 90, 110 of power reception coil 7 can be reduced to thereby suppress increase of an electromotive voltage induced at power reception coil 7, and suppress variation of the coupling coefficient when power transmission coil 10 is positionally displaced in the left direction L or right direction R.

In the case where power transmission coil 10 is positionally displaced in the frontward direction F or backward direction B, the amount of magnetic flux flowing through the left side portion and the right side portion of power reception coil 7 is almost the same as the amount of magnetic flux flowing through the right side portion and the left side portion of power reception coil 7 when power transmission coil 10 and power reception coil 7 are positionally aligned with each other.

In the case where power transmission coil 10 is positionally displaced in the frontward direction F, the distance between the back side portion of power reception coil 7 and the back side portion of power transmission coil 10 decreases. Meanwhile, the distance between the front side portion of power reception coil 7 and the front side portion of power transmission coil 10 increases.

Therefore, the amount of magnetic flux flowing through the back side portion of power transmission coil 10 and the back side portion of power reception coil 7 increases, while the amount of magnetic flux flowing through the front side portion of power transmission coil 10 and the front side portion of power reception coil 7 decreases.

Thus, it is suppressed that the coupling coefficient when power transmission coil 10 is positionally displaced in the frontward direction F from power reception coil 7 varies largely from the coupling coefficient in the state where power transmission coil 10 is positionally aligned with power reception coil 7.

It should be noted that the magnetic flux distribution and the coupling coefficient in the case where power transmission coil 10 is positionally displaced in the backward direction B from power reception coil 7 are substantially identical to those in the case where power transmission coil 10 is positionally displaced in the frontward direction F.

In this way, variation of the coupling coefficient depending on the direction of positional displacement can be suppressed. Therefore, when constant-power transmission is done from power transmission coil 10 to power reception coil 7, variation of the amount of current flowing through power transmission coil 10 depending on the direction of positional displacement can be reduced.

According to the above description of the examples shown in FIGS. 1 to 20, metal cover 71 of muffler 55 is provided as a metal member adjacent to power reception apparatus 4, by way of example. However, the metal member adjacent to power reception apparatus 4 is not limited to metal cover 71 of muffler 55. For example, it may be a part of floor panel 52.

Figure 21:
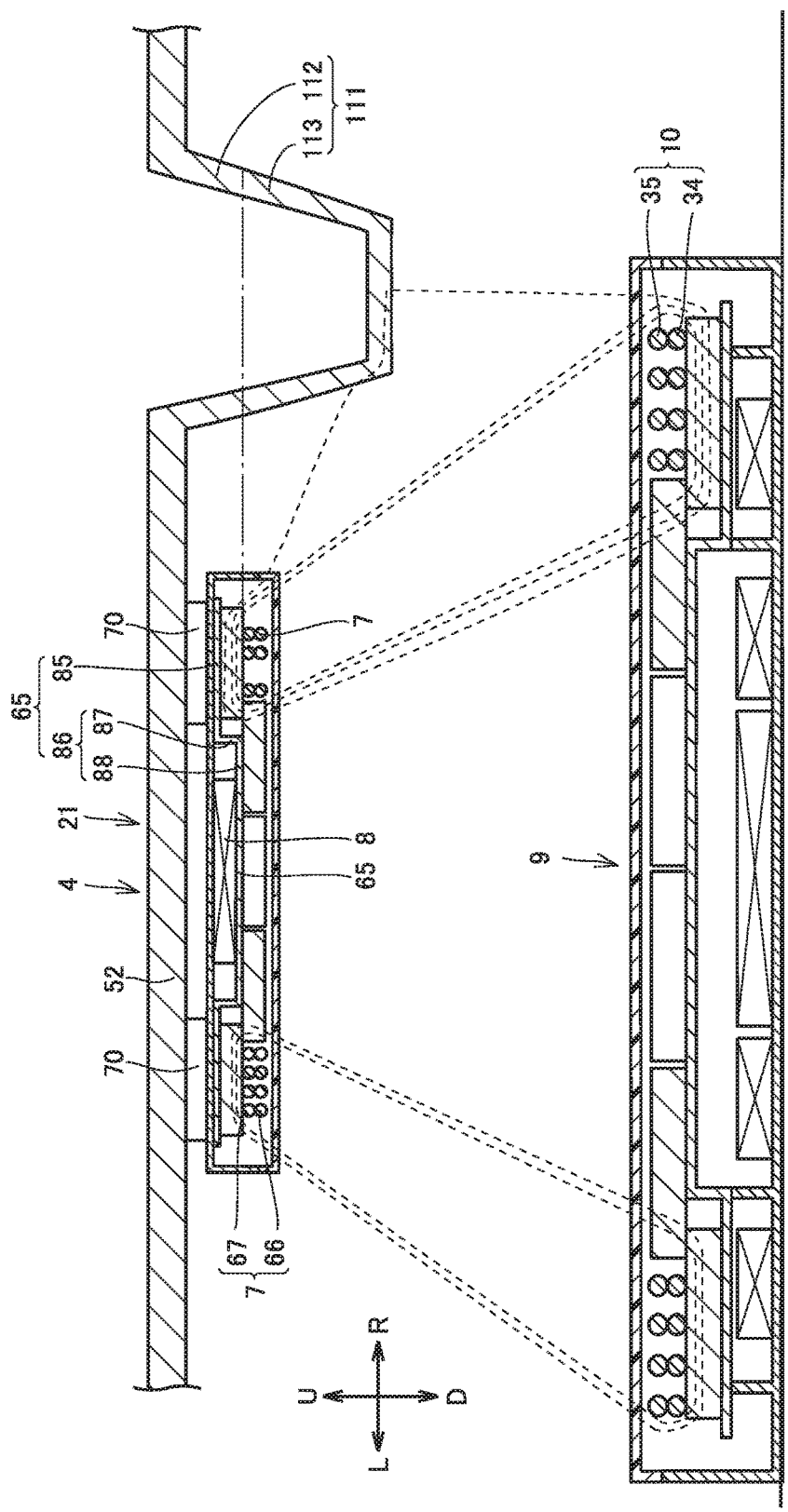
FIG. 21 is a cross-sectional view illustrating a modification of a vehicle on which a power reception apparatus is mounted according to a first embodiment.

FIG. 21 is a cross-sectional view illustrating a modification of the vehicle on which the power reception apparatus is mounted according to the first embodiment. In the example shown in FIG. 21, floor panel 52 has a protruding portion 111 formed to protrude downward. Protruding portion 111 includes an upper portion 112 located higher than power reception coil 7, and a lower portion 113 which is horizontally at the same position as power reception coil 7 or located lower than power reception coil 7. Floor panel 52 and protruding portion 111 are each made of a metal material containing iron or stainless steel as a main component.

Such a protruding portion 111 also induces magnetic flux MF, like the above-described metal cover 71. The present disclosure is also applicable to the case where power reception apparatus 4 is mounted on a vehicle in which such protruding portion 111 is formed.

Second Embodiment

Regarding the first embodiment, the description is given above of the example where one metal member is provided in the vicinity of power reception apparatus 4. In the following, a description will be given, by means of FIG. 22 for example, of an example where two (a plurality of) metal members are arranged in the vicinity of power reception apparatus 4. Any feature identical or substantially identical to the corresponding one shown in FIGS. 1 to 21 is denoted by the same reference character, and the description thereof may not be repeated in some cases.

Figure 22:
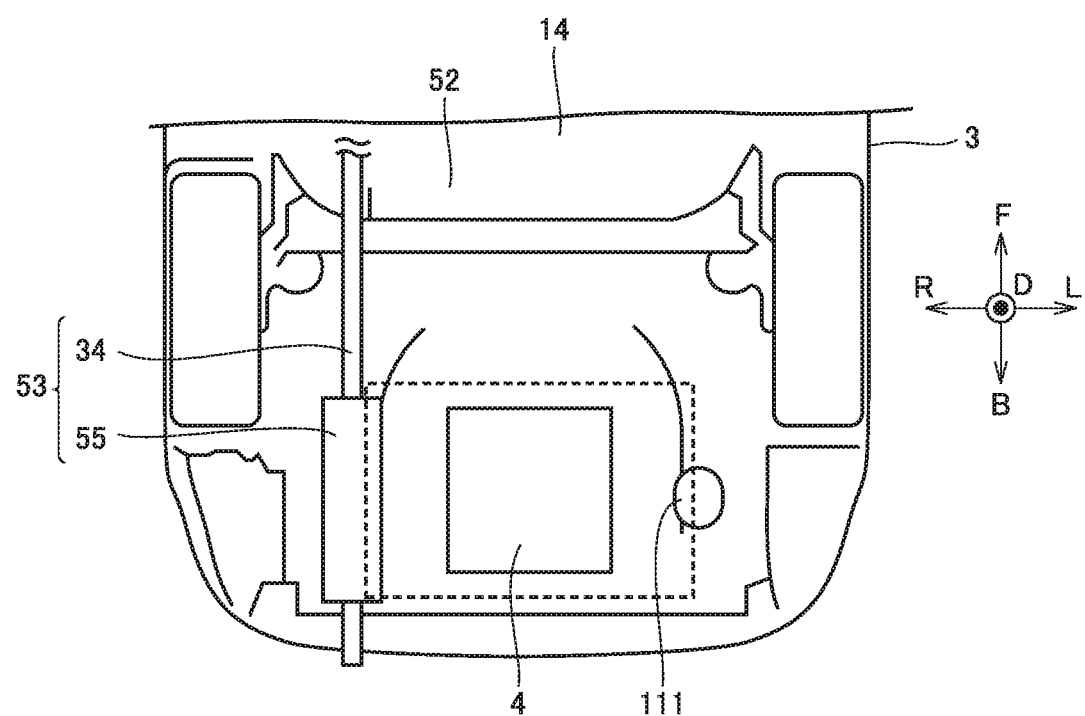
FIG. 22 is a plan view showing a bottom surface 14 of a vehicle.

FIG. 22 is a plan view showing a bottom surface 14 of a vehicle 3. As shown in FIG. 22, a muffler 55 is disposed on the right R side of power reception apparatus 4. On the left L side of power reception apparatus 4, a protruding portion 111 of floor panel 52 is formed.

Figure 23:
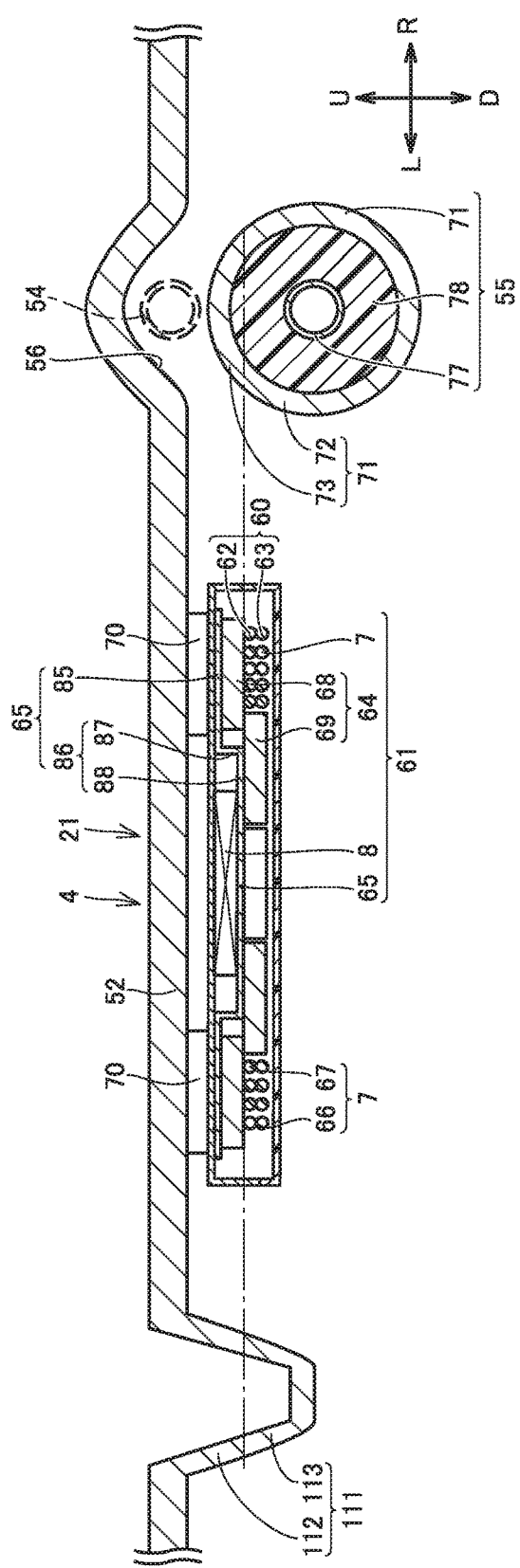
FIG. 23 is a cross-sectional view showing a power reception apparatus 4, a muffler 55, and a protruding portion 111.

FIG. 23 is a cross-sectional view showing power reception apparatus 4, muffler 55, and protruding portion 111. As shown in FIG. 23, the lower end of metal cover 71 is located lower than the lower end of protruding portion 111.

Protruding portion 111 includes an upper portion 112 located higher than power reception coil 7 and a lower portion 113 located lower than upper portion 112.

Figure 24:
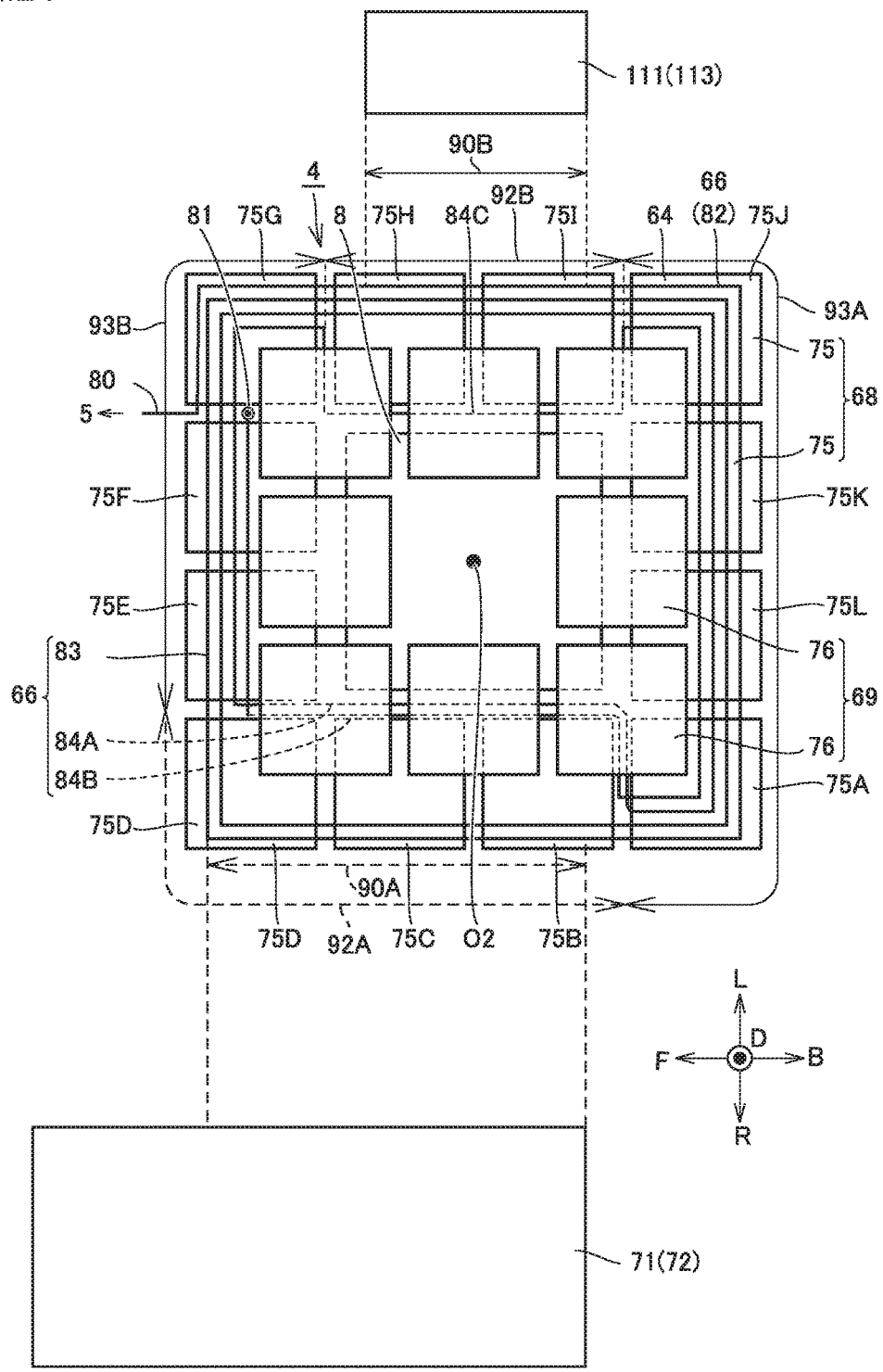
FIG. 24 is a plan view showing a lower coil 66 and a ferrite core 64, where un upper coil 67 is not shown.

FIG. 24 is a plan view showing a lower coil 66 and a ferrite core 64, where un upper coil 67 is not shown. As shown in FIG. 24, a coil wire 82 is wound in such a manner that the distance from winding axis O2 decreases as the wire extends from an end 80 toward an end 81.

Coil wire 82 passes on the lower surface of division core members 75B, 75C, 75D in the direction from division core member 75B to division core member 75D. After passing multiple times on the lower surface of division core members 75B, 75C, 75D, coil wire 82 is drawn from the gap between division core member 75A and division core member 75B to the inside of a metal support member 65. Then, coil wire 82 is drawn out from the gap between division core member 75D and division core member 75E. Thus, a crossover wire 84A passing inside metal support member 65 is formed.

Subsequently to the drawn-out crossover wire 84A, coil wire 82 passes on the lower surface of division core members 75E to 75G from division core member 75E to division core member 75G. Then, from the gap between division core member 75G and division core member 75H, coil wire 82 is drawn to the inside of metal support member 65. Then, coil wire 82 is drawn out of metal support member 65 from the gap between division core member 75I and division core member 75J. Thus, a crossover wire 84C is formed.

Subsequently to the drawn-out crossover wire 84C, coil wire 82 passes on the lower surface of division core members 75J to 75A from division core member 75J to division core member 75A. Then, coil wire 82 is drawn to the inside of metal support member 65 from the gap between division core member 75A and division core member 75B. After this, coil wire 82 is drawn out from the gap between division core member 75D and division core member 75E. Thus, a crossover wire 84B is formed. Then, coil wire 82 passes on the lower surface of division core member 75E and division core member 75F to reach end 81.

In this way, coil wire 82 is wound so that the number of turns of the portion located on the lower surface of division core member 75B, division core member 75C, and division core member 75D and the number of turns of the portion located on the lower surface of division core member 75H and division core member 75I are smaller.

Namely, a portion of lower coil 66 located on the lower surface of division core member 75B, division core member 75C, and division core member 75D is formed as a low-turn-count portion 92A. A portion of lower coil 66 located on the lower surface of division core member 75H and division core member 75I is also formed as a low-turn-count portion 92B.

In the example shown in FIG. 24, the number of turns of low-turn-count portion 92A is smaller than the number of turns of low-turn-count portion 92B.

Here, in FIG. 24, a portion of lower coil 66 facing lower portion 72 of metal cover 71 is defined as a facing portion 90A and a portion of lower coil 66 facing lower portion 113 of protruding portion 111 is defined as a facing portion 90B.

In facing portion 90A, low-turn-count portion 92A is located. In facing portion 90B, low-turn-count portion 92B is located. Low-turn-count portion 92A may be located in a part of facing portion 90A, and low-turn-count portion 92B may be located in a part of facing portion 90B.

Figure 25:
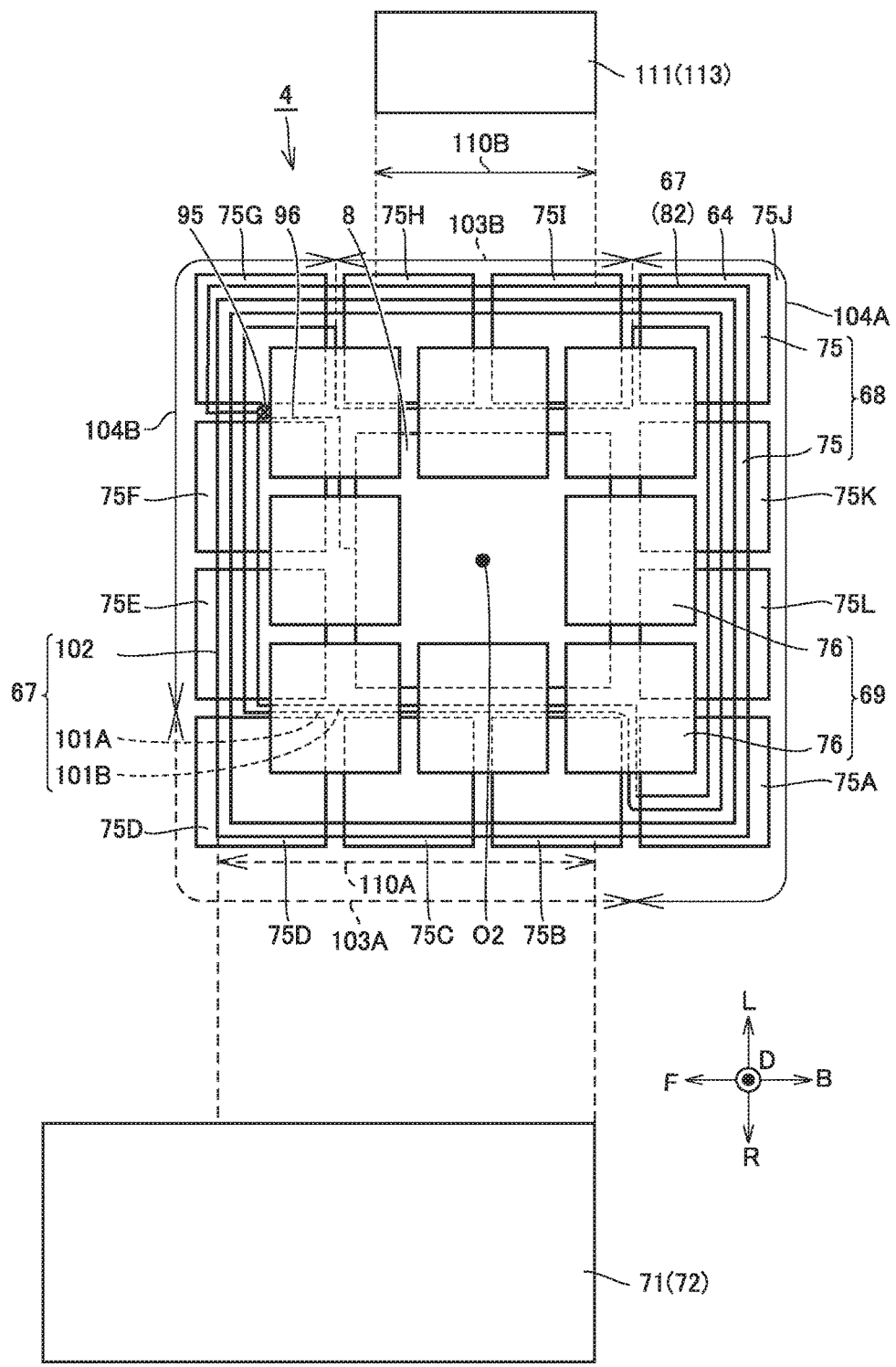
FIG. 25 is a plan view showing an upper coil 67 and ferrite core 64.

FIG. 25 is a plan view showing an upper coil 67 and ferrite core 64. In FIG. 25, coil wire 82 is formed in such a manner that the distance from winding axis O2 decreases as the wire extends from an end 95 toward an end 96.

Coil wire 82 passes on the lower surface of division core members 75B, 75C, 75D in the direction from division core member 75B to division core member 75D. After passing multiple times on the lower surface of division core members 75B, 75C, 75D, coil wire 82 is drawn from the gap between division core member 75A and division core member 75B to the inside of metal support member 65. Then, coil wire 82 is drawn out from the gap between division core member 75D and division core member 75E. Thus, a crossover wire 101A passing inside metal support member 65 is formed.

Subsequently to the drawn-out crossover wire 101A, coil wire 82 passes on the lower surface of division core members 75E to 75G from division core member 75E to division core member 75G. Then, coil wire 82 is drawn to the inside of metal support member 65 from the gap between division core member 75G and division core member 75H. Then, coil wire 82 is drawn out from the gap between division core member 75I and division core member 75J. Thus, a crossover wire 101C is formed.

Subsequently to the drawn-out crossover wire 101C, coil wire 82 passes on the lower surface of division core members 75J to 75A from division core member 75J to division core member 75A. Then, coil wire 82 is drawn to the inside of metal support member 65 from the gap between division core member 75A and division core member 75B. After this, coil wire 82 is drawn out from the gap between division core member 75D and division core member 75E. Thus, a crossover wire 101B is formed. Then, coil wire 82 passes on the lower surface of division core member 75E and division core member 75F to reach end 96.

In this way, coil wire 82 is wound so that the number of turns of the portion located on the lower surface of division core member 75B, division core member 75C, and division core member 75D and the number of turns of the portion located on the lower surface of division core member 75H and division core member 75I are smaller.

Namely, a portion of upper coil 67 located on the lower surface of division core member 75B, division core member 75C, and division core member 75D is formed as a low-turn-count portion 103A. A portion of upper coil 67 located on the lower surface of division core member 75H and division core member 75I is also formed as a low-turn-count portion 103B.

In the example shown in FIG. 25, the number of turns of low-turn-count portion 103A is smaller than the number of turns of low-turn-count portion 103B.

Here, in FIG. 25, a portion of upper coil 67 facing lower portion 72 of metal cover 71 is defined as a facing portion 110A. Low-turn-count portion 103A is located in facing portion 110A. Specifically, facing portion 110A is located in a part of low-turn-count portion 103A. Low-turn-count portion 103A may be located in a part of facing portion 110A.

A portion of upper coil 67 facing lower portion 113 of protruding portion 111 is defined as a facing portion 110B. Low-turn-count portion 103B is located in facing portion 110B. Low-turn-count portion 103B may be located in a part of facing portion 110B.

Figure 26:
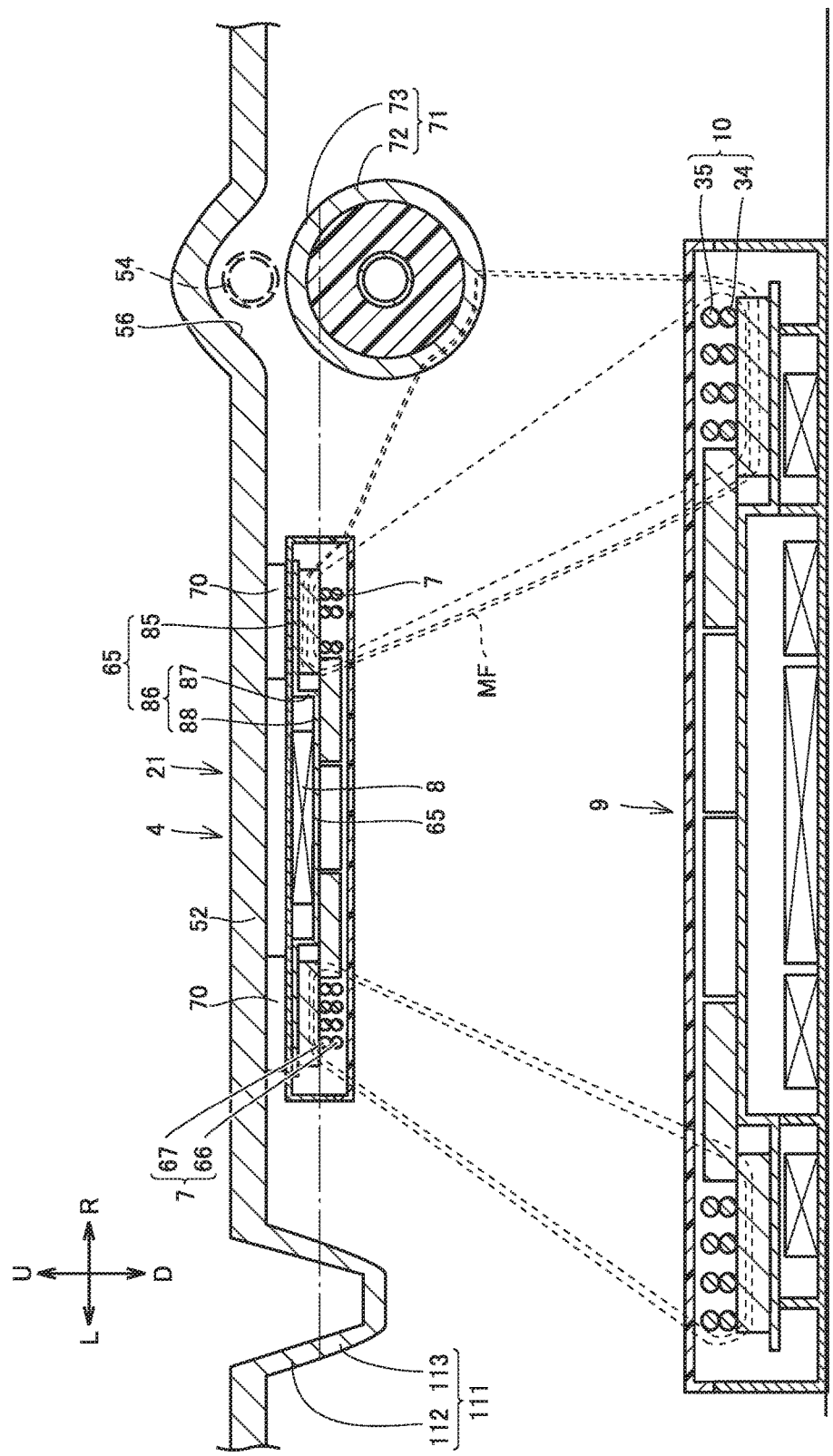
FIG. 26 is a cross-sectional view illustrating power transfer in a state where power reception apparatus 4 and power transmission apparatus 9 are positionally aligned accurately.

FIG. 26 is a cross-sectional view illustrating power transfer in a state where power reception apparatus 4 and power transmission apparatus 9 are positionally aligned accurately.

As shown in FIG. 26, a part of magnetic flux MF from power transmission coil 10 enters metal cover 71. Then, a part of magnetic flux MF entering lower portion 72 of metal cover 71 is guided toward power reception coil 7.

Meanwhile, a part of magnetic flux MF from power transmission coil 10 enters lower portion 113 of protruding portion 111. Magnetic flux MF entering lower portion 113 flows in lower portion 113. Then, a part of magnetic flux MF entering lower portion 113 is emitted toward power reception coil 7.

Here, metal cover 71 is located closer to the ground than protruding portion 111. Therefore, the amount of magnetic flux entering metal cover 71 is larger than the amount of magnetic flux entering protruding portion 111. This is because the strength of the magnetic field formed around power transmission coil 10 is higher as closer to power transmission coil 10. Namely, since metal cover 71 is located closer to the ground than protruding portion 111, the strength of the magnetic field to which the lower end of metal cover 71 is exposed is higher than the strength of the magnetic field to which the lower end of protruding portion 111 is exposed.

Figure 27:
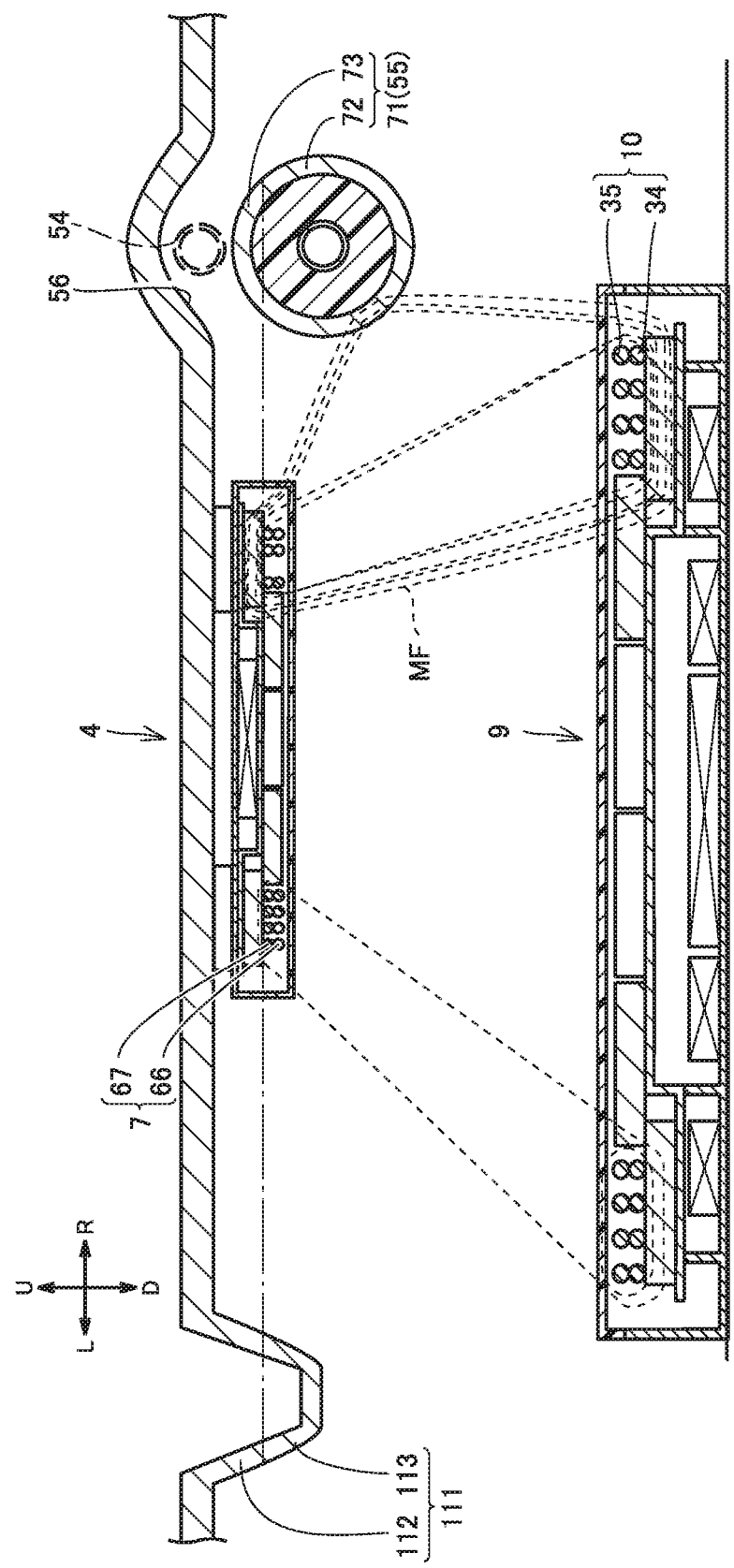
FIG. 27 is a cross-sectional view illustrating power transfer in a state where power transmission apparatus 9 is positionally displaced in the left direction L.

FIG. 27 is a cross-sectional view illustrating power transfer in a state where power transmission apparatus 9 is positionally displaced in the left direction L.

As shown in FIG. 27, as power transmission coil 10 is thus positionally displaced, the distance between the right side portion of power reception coil 7 and the right side portion of power transmission coil 10 decreases. Accordingly, magnetic flux MF flowing between the right side portion of power reception coil 7 and the right side portion of power transmission coil 10 increases.

Therefore, more magnetic flux MF enters metal cover 71 and the amount of magnetic flux guided from metal cover 71 to power reception coil 7 increases. Meanwhile, the distance between the left side portion of power reception coil 7 and the left side portion of power transmission coil 10 increases.

Therefore, less magnetic flux MF flows through the left side portion of power reception coil 7 and the left side portion of power transmission coil 10, and less magnetic flux MF enters protruding portion 111. Thus, almost no magnetic flux MF enters protruding portion 111.

Even when the amount of magnetic flux guided by lower portion 72 increases, low-turn-count portions 92A and 103A are located respectively in facing portions 90A and 110A that are respective portions of lower coil 66 and upper coil 67 and that are adjacent to lower portion 72, as shown in FIGS. 24 and 25.

Therefore, a counter-electromotive force generated at facing portions 90A and 110A of lower coil 66 and upper coil 67 can be reduced. Accordingly, the difference between the coupling coefficient in the state where power transmission coil 10 and power reception coil 7 are positionally aligned with each other and the coupling coefficient when power transmission coil 10 is positionally displaced in the left direction L from power reception coil 7 can be made small.

Figure 28:
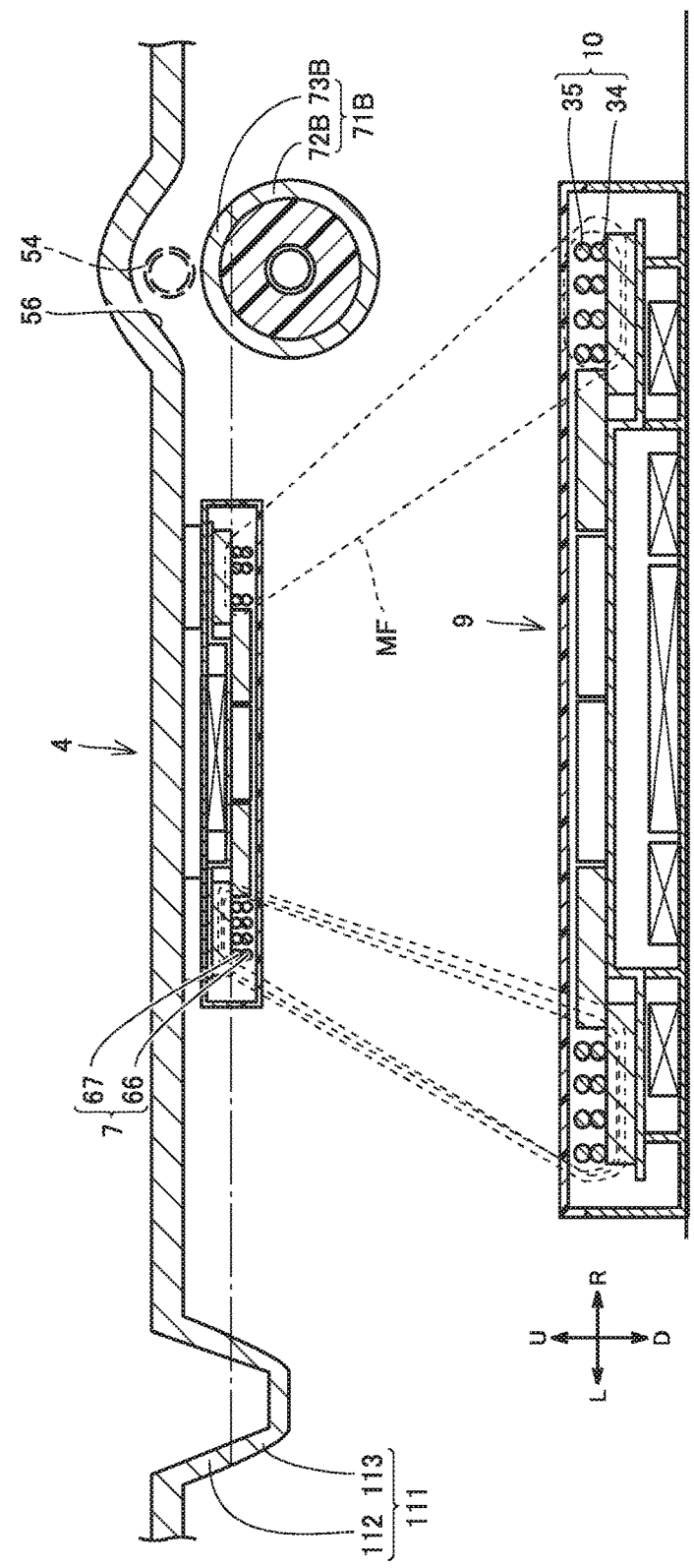
FIG. 28 is a cross-sectional view illustrating a state where power transmission coil 10 is positionally displaced in the right direction R from power reception coil 7.

FIG. 28 is a cross-sectional view illustrating a state where power transmission coil 10 is positionally displaced in the right direction R from power reception coil 7. It should be noted that the amount of positional displacement of power transmission coil 10 in FIG. 28 is identical to the amount of positional displacement of power transmission coil 10 in FIG. 27.

As shown in FIG. 28, the distance between the right side portion of power transmission coil 10 and the right side portion of power reception coil 7 increases, while the distance between the left side portion of power transmission coil 10 and the left side portion of power reception coil 7 decreases.

Therefore, the amount of magnetic flux flowing through the left side portion of power reception coil 7 is larger than the amount of magnetic flux flowing through the right side portion of power reception coil 7. Because of this, the amount of magnetic flux guided by protruding portion 111 to power reception coil 7 is larger than the amount of magnetic flux guided by protruding portion 111 to power reception coil 7 in the state where power transmission coil 10 and power reception coil 7 are positionally aligned.

In FIGS. 24 and 25, low-turn-count portions 92B and 103B are located in facing portions 90B and 110B of lower coil 66 and upper coil 67. Therefore, increase of a counter-electromotive force generated at facing portions 90B and 110B is suppressed.

Accordingly, occurrence of a large difference between the coupling coefficient in the state where power transmission coil 10 is positionally displaced in the right direction R and the coupling coefficient in the state where power transmission coil 10 and power reception coil 7 are positionally aligned can be suppressed.

The amount of magnetic flux guided by protruding portion 111 to power reception coil 7 in the case where power transmission coil 10 is positionally displaced in the right direction R is smaller than the amount of magnetic flux guided by lower portion 72 to power reception coil 7 in the case where power transmission coil 10 is positionally displaced in the left direction L.

As shown in FIGS. 24 and 25, the number of turns of facing portions 90B, 110B is larger than the number of turns of facing portions 90A, 110A.

Therefore, the counter-electromotive force generated at facing portions 90B, 110B when power transmission coil 10 is positionally displaced in the right direction R is identical to or almost identical to the counter-electromotive force generated at facing portions 90A, 110A when power transmission coil 10 is positionally displaced in the left direction L.

Accordingly, the coupling coefficient when power transmission coil 10 is positionally displaced in the left direction L from power reception coil 7 is identical to or almost identical to the coupling coefficient when power transmission coil 10 is positionally displaced in the right direction R from power reception coil 7.

Thus, in the case where metal members located at different heights are disposed with power reception coil 7 interposed therebetween, the number of turns of a portion of power reception coil 7 adjacent to one metal member which is relatively closer to the ground is made smaller than the number of turns of a portion thereof that is adjacent to the other metal member which is relatively further from the ground. Accordingly, even when power transmission coil 10 is positionally displaced toward any one of the metal members, occurrence of a difference in coupling coefficient between power reception coil 7 and power transmission coil 10 can be suppressed.

Third Embodiment

Regarding the first and second embodiments, the description is given above of the example where the metal member (metal cover 71) disposed in the vicinity of power reception coil 7 is formed of a metal containing iron or stainless steel as a main component. A description will be given next of a third embodiment in which the metal member is formed of a material having a low magnetic permeability like aluminum.

Any feature identical or substantially identical to the corresponding one in FIGS. 1 to 27 is denoted by the same reference character, and the description thereof may not be repeated in some cases.

Figure 29:
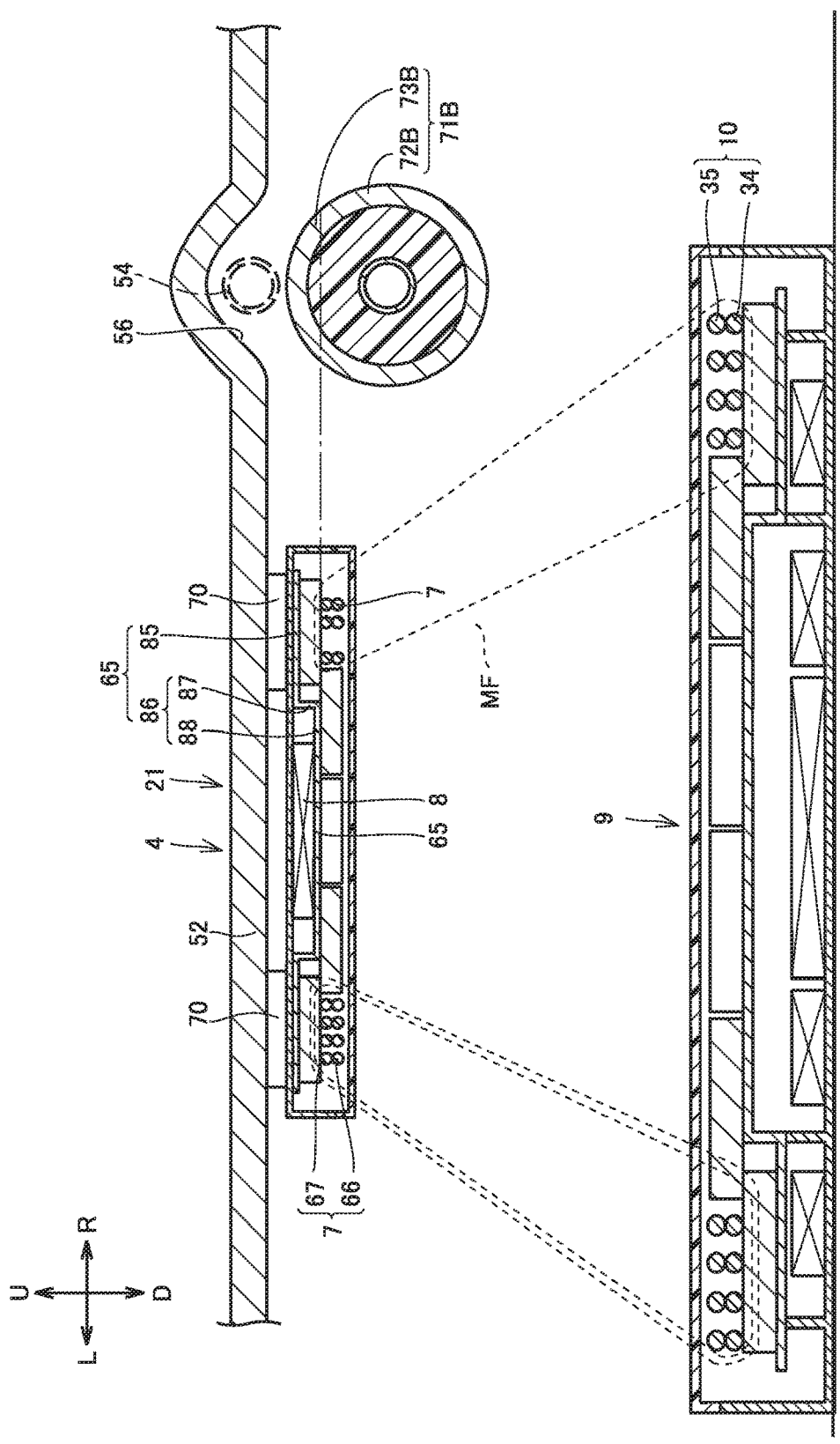
FIG. 29 is a cross-sectional view showing a power reception apparatus and a muffler 55 according to a third embodiment, in a state where a power reception coil 7 and a power transmission coil 10 are positionally aligned.

FIG. 29 is a cross-sectional view showing a power reception apparatus and a muffler 55 according to the third embodiment, illustrating a state where a power reception coil 7 and a power transmission coil 10 are positionally aligned. The magnetic permeability of a metal material which forms a metal cover 71B is equal to or higher than the magnetic permeability of aluminum. As the metal material forming metal cover 71B, aluminum or copper for example may be used.

The magnetic permeability of aluminum is $1.256 \times 10^{-6}$ [H/m] and the magnetic permeability of copper is $1.256629 \times 10^{-6}$ [H/m]. The electrical conductivity of aluminum is $2.65 \times 10^{-8}$ [($\Omega$m)] and the electrical conductivity of copper is $1.68 \times 10^{-8}$ [($\Omega$m)] which are higher than respective electrical conductivities of stainless steel and iron.

Metal cover 71B also includes an upper portion 73B located higher than power reception coil 7 and a lower portion 72B located at the same level or lower than power reception coil 7 in the vertical direction.

Figure 30:
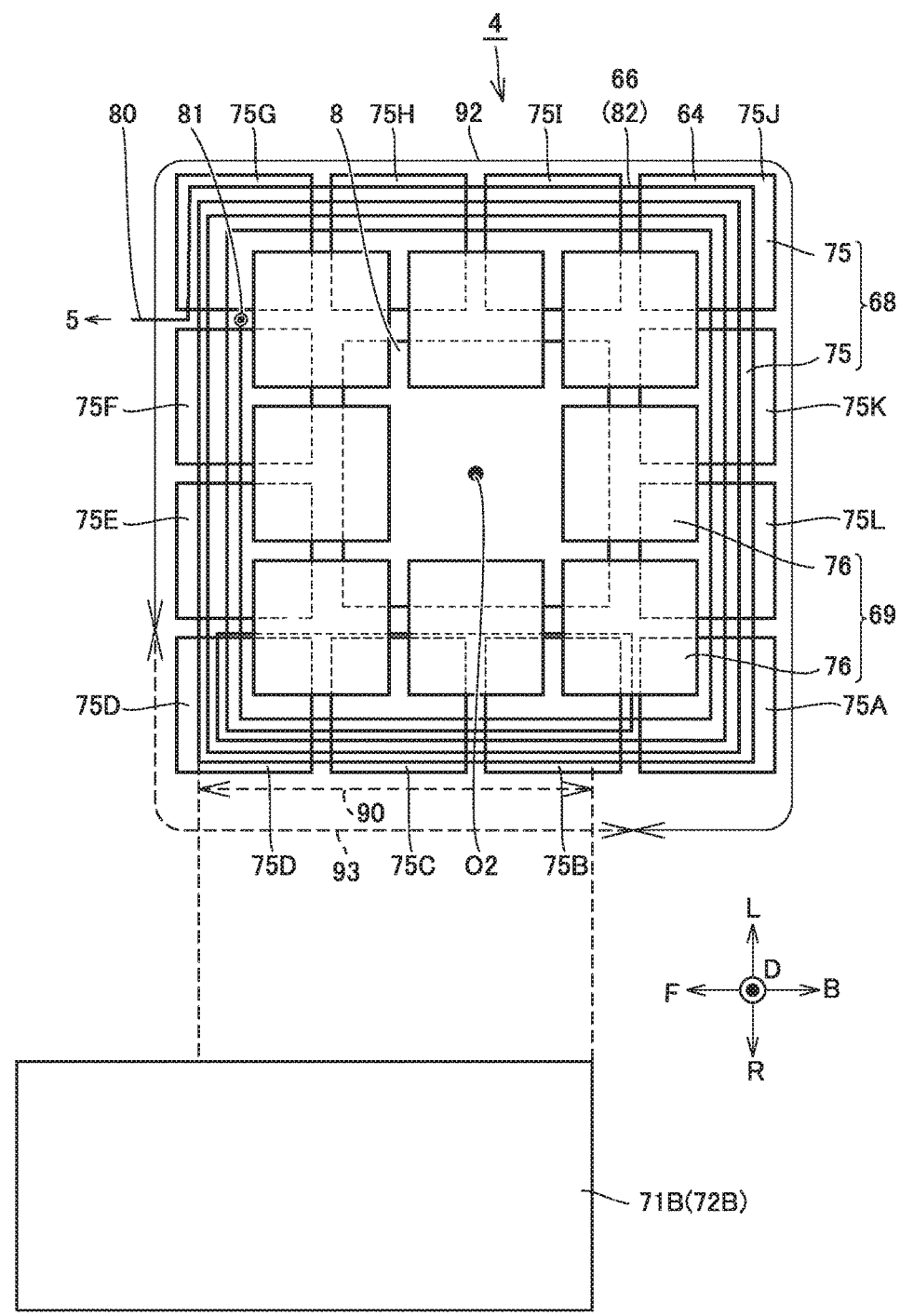
FIG. 30 is a plan view of a power reception apparatus 4 according to a third embodiment, illustrating a lower coil 66 and a ferrite core 64.

FIG. 30 is a plan view of power reception apparatus 4 according to the third embodiment, illustrating a lower coil 66 and a ferrite core 64.

As shown in FIG. 30, a coil wire 82 is wound in such a manner that the distance from a winding axis O2 decreases as the wire extends from an end 80 toward an end 81.

Coil wire 82 extends on the lower surface of division core members 75B, 75C, 75D from division core member 75B to division core member 75D.

After passing several times on the lower surface of division core members 75B to 75D, coil wire 82 is drawn from the gap between division core member 75D and division core member 75E to the inside of a metal support member 65. Then, coil wire 82 is drawn out from the gap between division core member 75A and division core member 75B and passes again on the lower surface of division core members 75B, 75C, 75D.

Thus, the number of turns of coil wire 82 is larger than that of the remaining portion on the lower surface of division core members 75B to 75D.

Namely, a high-turn-count portion 93 is formed in a portion located on the lower surface of division core member 75B to division core member 75D, while a low-turn-count portion 92 is formed in a portion located on the lower surface of division core members 75E to 75A.

Here, a portion of lower coil 66 facing lower portion 72B of metal cover 71B is defined as a facing portion 90. High-turn-count portion 93 is located in facing portion 90. Specifically, facing portion 90 is located in a part of high-turn-count portion 93. Arrangement may be done so that a part of facing portion 90 is located in high-turn-count portion 93.

Figure 31:
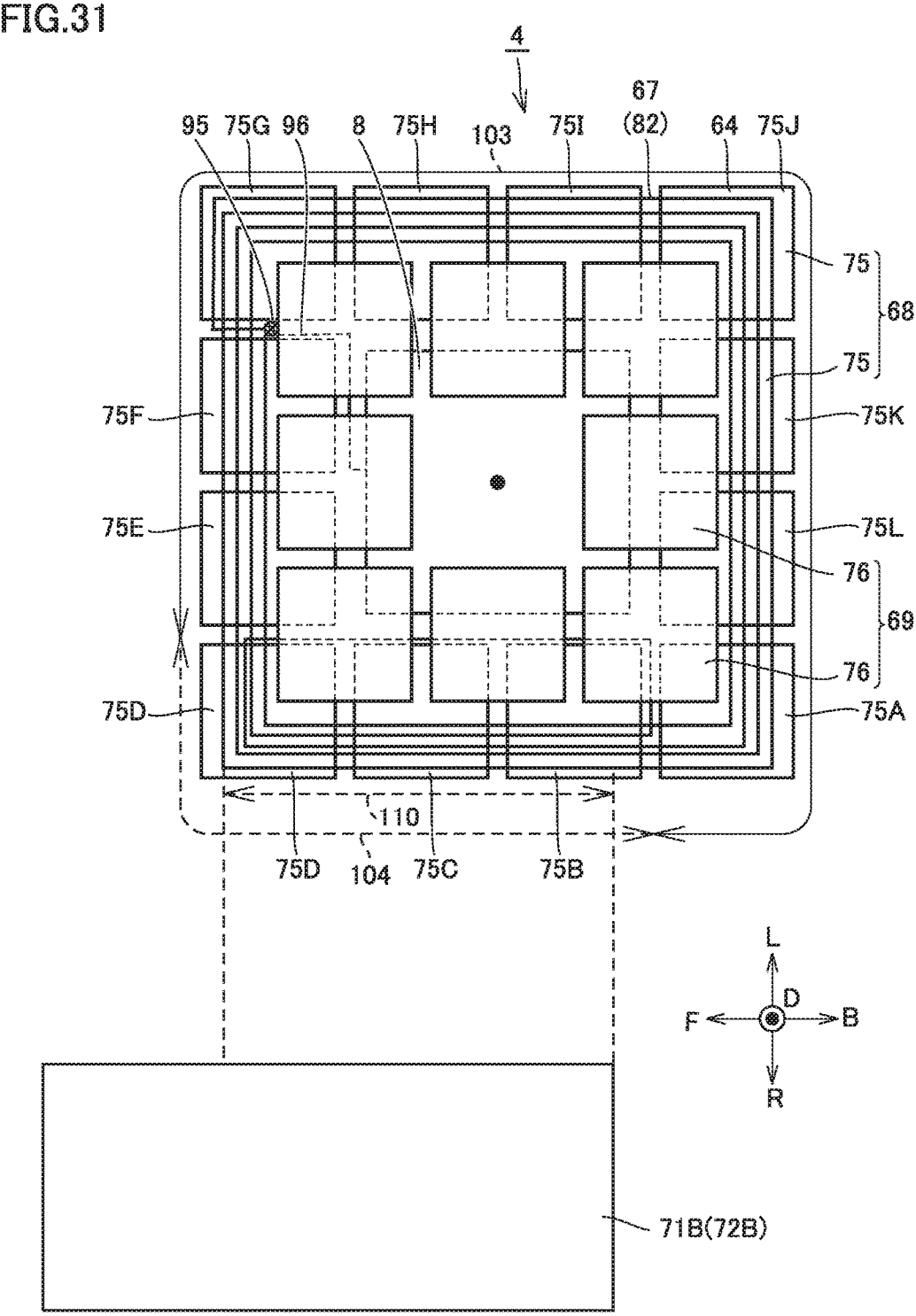
FIG. 31 is a plan view showing an upper coil 67 and ferrite core 64.

FIG. 31 is a plan view showing an upper coil 67 and ferrite core 64. As shown in FIG. 31, upper coil 67 is wound in such a manner that the distance from winding axis O2 decreases as the wire extends from an end 95 toward an end 96.

Coil wire 82 extends on the lower surface of division core members 75B, 75C, 75D from division core member 75B to division core member 75D.

After passing several times on the lower surface of division core members 75B to 75D, coil wire 82 is drawn from the gap between division core member 75D and division core member 75E to the inside of metal support member 65. Then, coil wire 82 is drawn out from the gap between division core member 75A and division core member 75B and passes again on the lower surface of division core members 75B, 75C, 75D.

Thus, the number of turns of coil wire 82 is larger than that of the remaining portion on the lower surface of division core members 75B to 75D.

Namely, a high-turn-count portion 104 is formed in a portion located on the lower surface of division core member 75B to division core member 75D, while a low-turn-count portion 103 is formed in a portion located on the lower surface of division core members 75E, 75F, 75G, 75H, 75I, 75J, 75K, 75L, and 75A.

Thus, as shown in FIGS. 30 and 31, high-turn-count portion 93 is located in a portion located in facing portion 90 of lower coil 66, and high-turn-count portion 104 is located in a portion located in facing portion 110 of upper coil 67.

In FIG. 29, a part of magnetic flux MF emitted from the right side portion of power transmission coil 10 enters lower portion 72B of metal cover 71B. Since the magnetic permeability of the metal forming metal cover 71B is low, the entering magnetic flux is hindered from flowing in metal cover 71B. Most of the entering magnetic flux becomes eddy current and is thereafter converted to heat. Therefore, a large amount of eddy current flows in metal cover 71B. In particular, since the electrical conductivity of aluminum or copper which forms metal cover 71B is higher than the electrical conductivity of stainless steel or iron, particularly a large amount of eddy current flows.

As the amount of eddy current formed in the surface of metal cover 71B increases, the strength of a magnetic field formed by the eddy current also increases. The magnetic field formed by the eddy current is formed in the direction of reducing the amount of the entering magnetic flux, the magnetic flux incident on metal cover 71B is reflected.

Thus, the magnetic flux reflected by metal cover 71B hinders the magnetic flux from flowing from power transmission coil 10 toward power reception coil 7.

Consequently, the amount of magnetic flux flowing through the right side portion of power transmission coil 10 and the right side portion of power reception coil 7 is smaller than that in the case where metal cover 71B is not provided.

Figure 32:
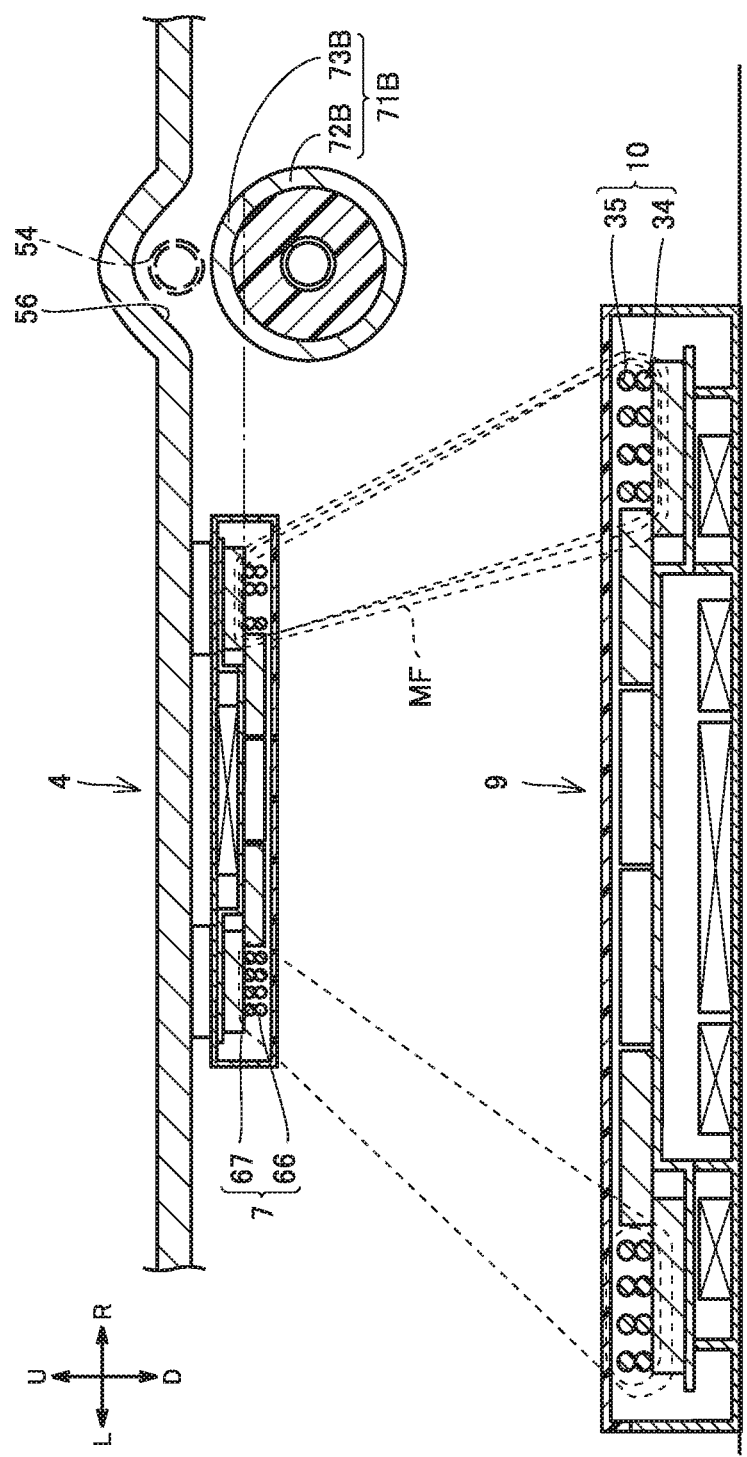
FIG. 32 is a cross-sectional view showing a state where power transmission coil 10 is positionally displaced in the left direction L from power reception coil 7.

FIG. 32 is a cross-sectional view showing a state where power transmission coil 10 is positionally displaced in the left direction L from power reception coil 7. As shown in FIG. 32, as power transmission coil 10 is positionally displaced in the left direction L, the distance between the right side portion of power transmission coil 10 and the right side portion of power reception coil 7 decreases.

Therefore, the amount of magnetic flux flowing from the right side portion of power transmission coil 10 toward the right side portion of power reception coil 7 is to increase. Accordingly, the amount of magnetic flux flowing toward metal cover 71B also increases and the amount of magnetic flux reflected by metal cover 71B also increases. The magnetic flux reflected by metal cover 71B hinders flow of the magnetic flux from power transmission coil 10 toward power reception coil 7.

As a result, while the amount of magnetic flux flowing through the right side portion of power reception coil 7 in the state where power transmission coil 10 is positionally displaced in the left direction L is slightly larger than that in the state where power transmission coil 10 and power reception coil 7 are positionally aligned, the difference between these amounts of magnetic flux is small.

Meanwhile, the distance between the left side portion of power reception coil 7 and the left side portion of power transmission coil 10 increases. Therefore, the amount of magnetic flux flowing through the left side portion of power reception coil 7 in the state where power transmission coil 10 is positionally displaced in the left direction L is smaller than that in the state where power transmission coil 10 and power reception coil 7 are positionally aligned.

As a result, the amount of magnetic flux flowing through power reception coil 7 in the state where power transmission coil 10 is positionally displaced in the left direction L is smaller than that in the state where power transmission coil 10 and power reception coil 7 are positionally aligned.

Meanwhile, as shown in FIGS. 30 and 31, the number of turns of facing portions 90, 110 is large. Therefore, even when power transmission coil 10 is positionally displaced in the left direction L to cause decrease of the amount of magnetic flux passing through the left side portion of power reception coil 7, the amount of magnetic flux passing through facing portions 90, 110 slightly increases to thereby suppress occurrence of a difference in counter-electromotive force generated at power reception coil 7.

Namely, the difference of the coupling coefficient is small between the state where power transmission coil 10 and power reception coil 7 are positionally aligned and the state where power transmission coil 10 is positionally displaced.

Figure 33:
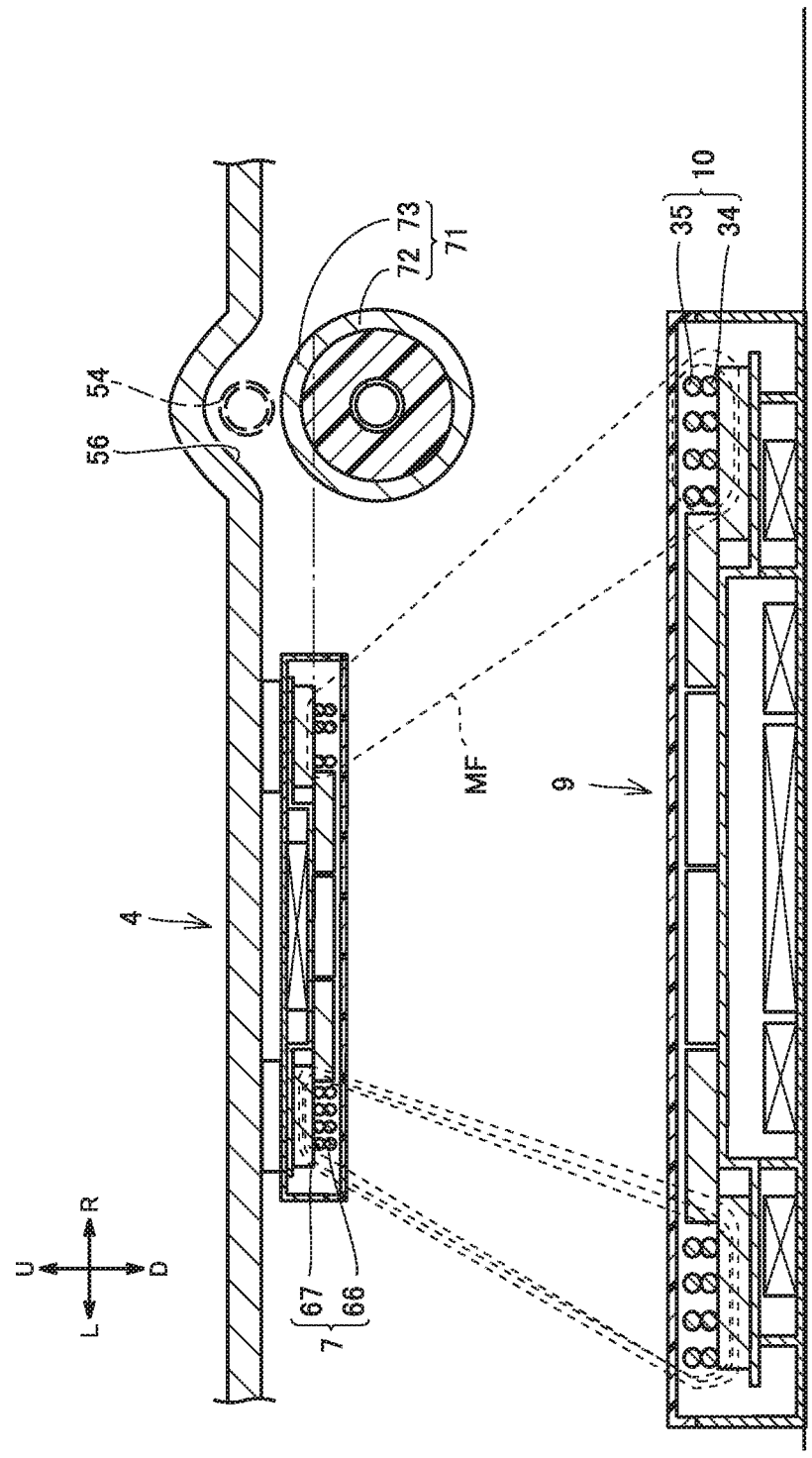
FIG. 33 is a cross-sectional view showing a state where power transmission coil 10 is positionally displaced in the right direction R from power reception coil 7.

FIG. 33 is a cross-sectional view showing a state where power transmission coil 10 is positionally displaced in the right direction R from power reception coil 7. As shown in FIG. 33, as power transmission coil 10 is positionally displaced in the right direction R, the distance between the right side portion of power transmission coil 10 and the right side portion of power reception coil 7 increases. Therefore, the amount of magnetic flux flowing through the right side portion of power reception coil 7 decreases.

Meanwhile, the distance between the left side portion of power transmission coil 10 and the left side portion of power reception coil 7 decreases and thus the amount of magnetic flux flowing through the left side portion of power reception coil 7 increases.

Therefore, the difference of the coupling coefficient is small between the case where power transmission coil 10 is positionally displaced in the right direction R and the case where power transmission coil 10 and power reception coil 7 are positionally aligned.

As seen from the above, even when power transmission coil 10 is positionally displaced, variation of the coupling coefficient can be reduced in the third embodiment as well.

Fourth Embodiment

Regarding the third embodiment, the description is given above of the example where metal cover 71 is provided as a metal member. The disclosure is also applicable to an example where a plurality of metal members are provided.

Any feature identical or substantially identical to the corresponding one shown in FIGS. 1 to 33 is denoted by the same reference character, and the description thereof may not be repeated in some cases.

Figure 34:
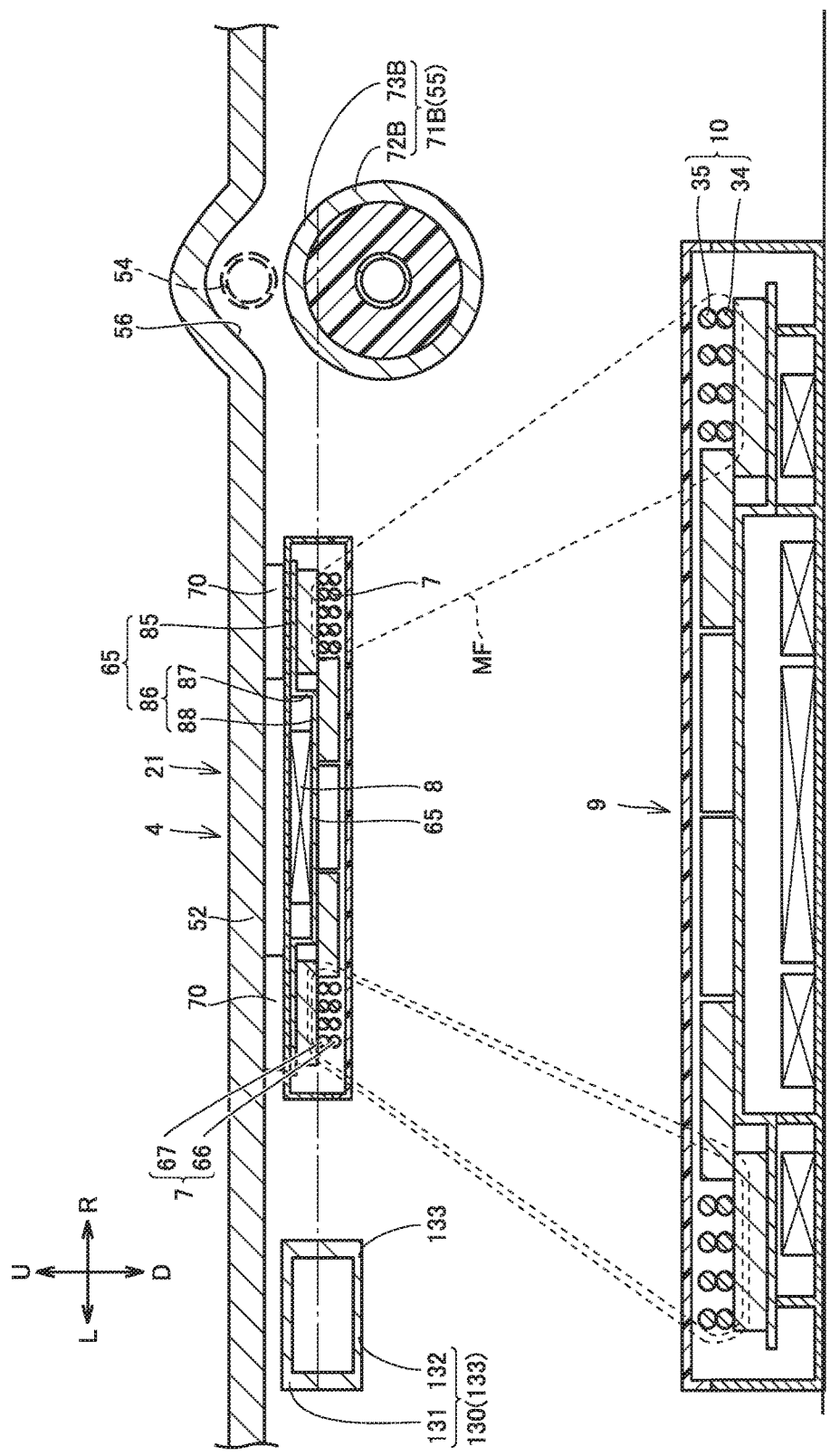
FIG. 34 is a cross-sectional view showing a power reception apparatus 4, a power transmission apparatus 9, and its surroundings.

FIG. 34 is a cross-sectional view showing a power reception apparatus 4, a power transmission apparatus 9, and its surroundings. In the example shown in FIG. 34, an on-board device 130 is located along a portion of a floor panel 52 that is on the left L side of power reception apparatus 4. A muffler 55 is also provided along a portion of floor panel 52 that is on the right R side of power reception apparatus 4.

On-board device 130 includes a metal cover 133, and metal cover 133 includes an upper portion 131 located higher than a power reception coil 7 and a lower portion 132 located lower than upper portion 131.

Both metal cover 133 of on-board device 130 and a metal cover 71B are each formed of a metal containing at least one of aluminum and copper as a main component.

Here, metal cover 71B of muffler 55 is located lower than metal cover 133 of on-board device 130.

Figure 35:
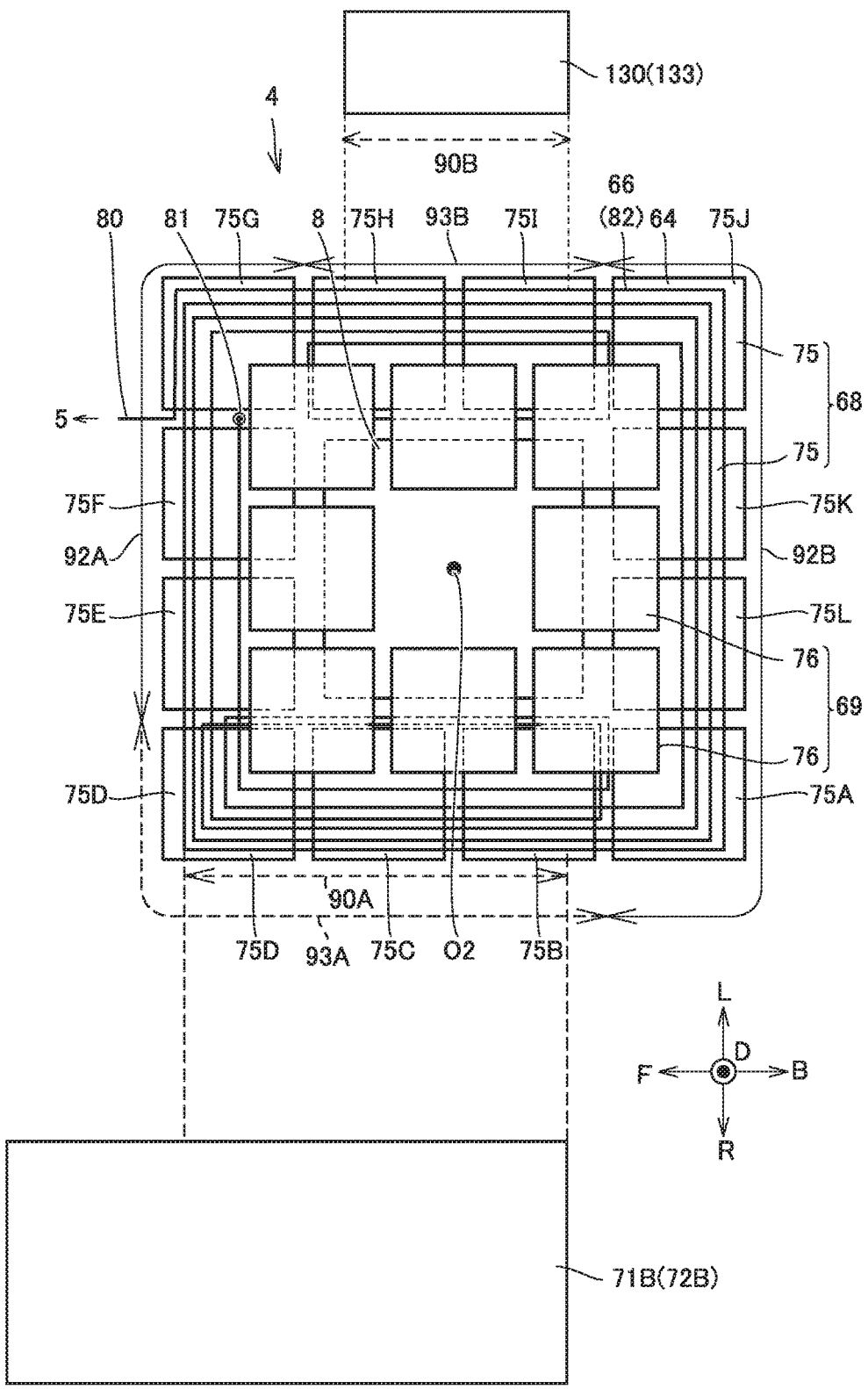
FIG. 35 is a plan view showing a part of power reception apparatus 4.

FIG. 35 is a plan view showing a part of power reception apparatus 4. In FIG. 35, an upper coil 67 is not shown.

Here, a coil wire 82 forming a lower coil 66 is wound so that the distance from winding axis O2 decreases as the wire extends from an end 80 toward an end 81. After wound multiple times to surround the periphery of a central core 69, coil wire 82 is drawn from a gap between division core members 75D and 75E to the inside of a metal support member 65. After this, coil wire 82 is drawn out from the gap between division core members 75A and 75B.

Accordingly, a crossover wire is formed to extend in metal support member 65. The crossover wire is drawn out again from inside metal support member 65 at the rear side in the direction in which the wire is wound. Thus, the number of turns of a specific portion is made larger.

Then, coil wire 82 is wound again to surround the periphery of central core 69.

After this, coil wire 82 is drawn from the gap between division core member 75I and division core member 75J to the inside of metal support member 65. After this, coil wire 82 is drawn out from the gap between division core member 75G and division core member 75H to surround the periphery of central core 69 toward end 81.

Thus, a crossover wire extending in metal support member 65 is formed. The crossover wire is drawn out at the rear side in the direction in which coil wire 82 is wound, and thereafter wound in the winding direction to thereby form a high-turn-count portion 93B.

After this, coil wire 82 is wound around the periphery of central core 69 toward end 81. Again, coil wire 82 is drawn from the gap between division core member 75D and division core member 75E to the inside of metal support member 65. Then, coil wire 82 is drawn from the gap between division core member 75A and division core member 75B.

After this, coil wire 82 is wound to surround the periphery of central core 69 toward end 81.

In this way, coil wire 82 is wound to form a high-turn-count portion 93A as a part of lower coil 66, on the lower surface of division core members 75B to 75D, and high-turn-count portion 93B is also formed on the lower surface of division core member 75H and division core member 75I. On the lower surface of division core members 75E, 75F and the lower surface of division core members 75J, 75K, 75L, 75A, low-turn-count portions 92A, 92B are formed as a part of lower coil 66.

The number of turns of high-turn-count portions 93A, 93B is larger than that of portions 92A, 92B, and the number of turns of high-turn-count portion 93A is larger than the number of turns of high-turn-count portion 93B.

Here, a portion of lower coil 66 facing lower portion 72B of metal cover 71B is defined as a facing portion 90A, and a portion of lower coil 66 facing a metal cover 133 of installed device 130 is defined as a facing portion 90B. As shown in FIG. 35, high-turn-count portion 93A is located in facing portion 90A, and high-turn-count portion 93B is located in facing portion 90B.

Figure 36:
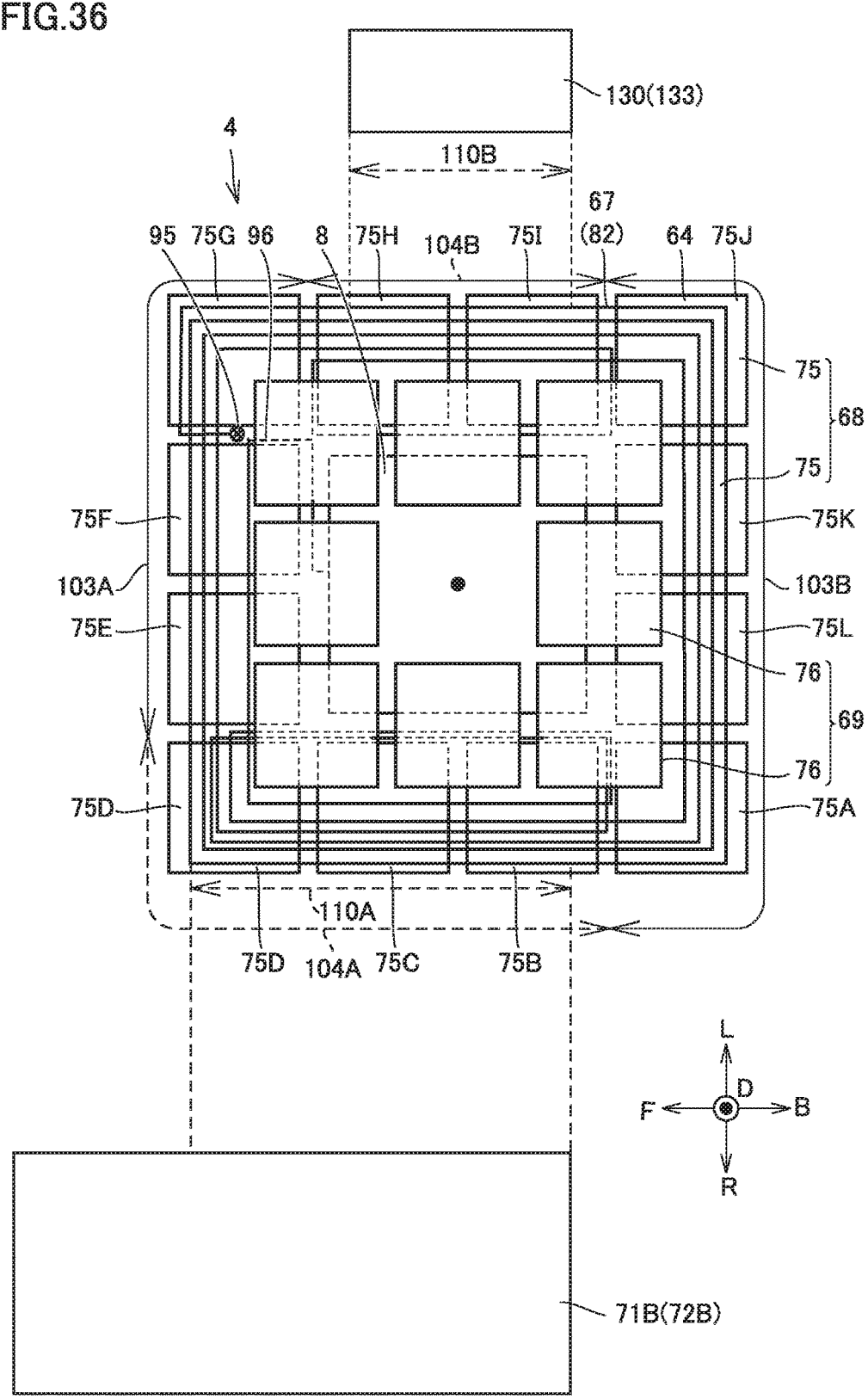
FIG. 36 is a plan view showing an upper coil 67 and its surrounding features.

FIG. 36 is a plan view showing upper coil 67 and its surrounding features. In FIG. 36, lower coil 66 is not shown. Upper coil 67 is also formed by winding coil wire 82 similarly to lower coil 66.

Thus, a high-turn-count portion 104A is formed in a portion of upper coil 67 located on the lower surface of division core members 75B, 75C, 75D. A high-turn-count portion 104B is formed in a portion of upper coil 67 located on the lower surface of division core members 75H, 75I.

Of upper coil 67, a portion located on the lower surface of division core members 75E, 75F and a portion located on the lower surface of division core members 75K, 75L are formed as low-turn-count portions 103A, 103B, respectively.

The number of turns of high-turn-count portions 104A, 104B is larger than the number of turns of low-turn-count portions 103A, 103B, and the number of turns of high-turn-count portion 104A is larger than the number of turns of high-turn-count portion 104B.

Here, a portion of upper coil 67 facing lower portion 72B is defined as a facing portion 110A, and a portion of upper coil 67 facing lower portion 132 of metal cover 133 is defined as a facing portion 110B. In facing portion 110A, high-turn-count portion 104A is located. In facing portion 110B, high-turn-count portion 104B is located.

Namely, in FIGS. 35 and 36, high-turn-count portions 93A, 104A are located in respective portions of power reception coil 7 facing lower portion 72B of metal cover 71B, and high-turn-count portions 93B, 104B are located in respective portions of power reception coil 7 facing lower portion 132 of metal cover 133.

A description is now given of the functions and effects of power reception apparatus 4 configured in the above-described manner. As shown in FIG. 34, in the state where power reception apparatus 4 and power transmission apparatus 9 are positionally aligned, electric power is transmitted from power transmission apparatus 9 to power reception apparatus 4.

Magnetic flux flows from power transmission apparatus 9 to power reception apparatus 4, and a part of the magnetic flux enters metal cover 71B and metal cover 133. Since metal cover 71B is located closer to the ground than metal cover 133, the amount of magnetic flux entering lower portion 72B is larger than the amount of magnetic flux entering metal cover 133.

Therefore, more eddy current is generated in lower portion 72B than eddy current formed in the surface of metal cover 133. As a result, the amount of magnetic flux flowing through a portion of power reception coil 7 located on the side of metal cover 71B is smaller than the amount of magnetic flux flowing through a portion of power reception coil 7 located on the side of metal cover 133.

Figure 37:
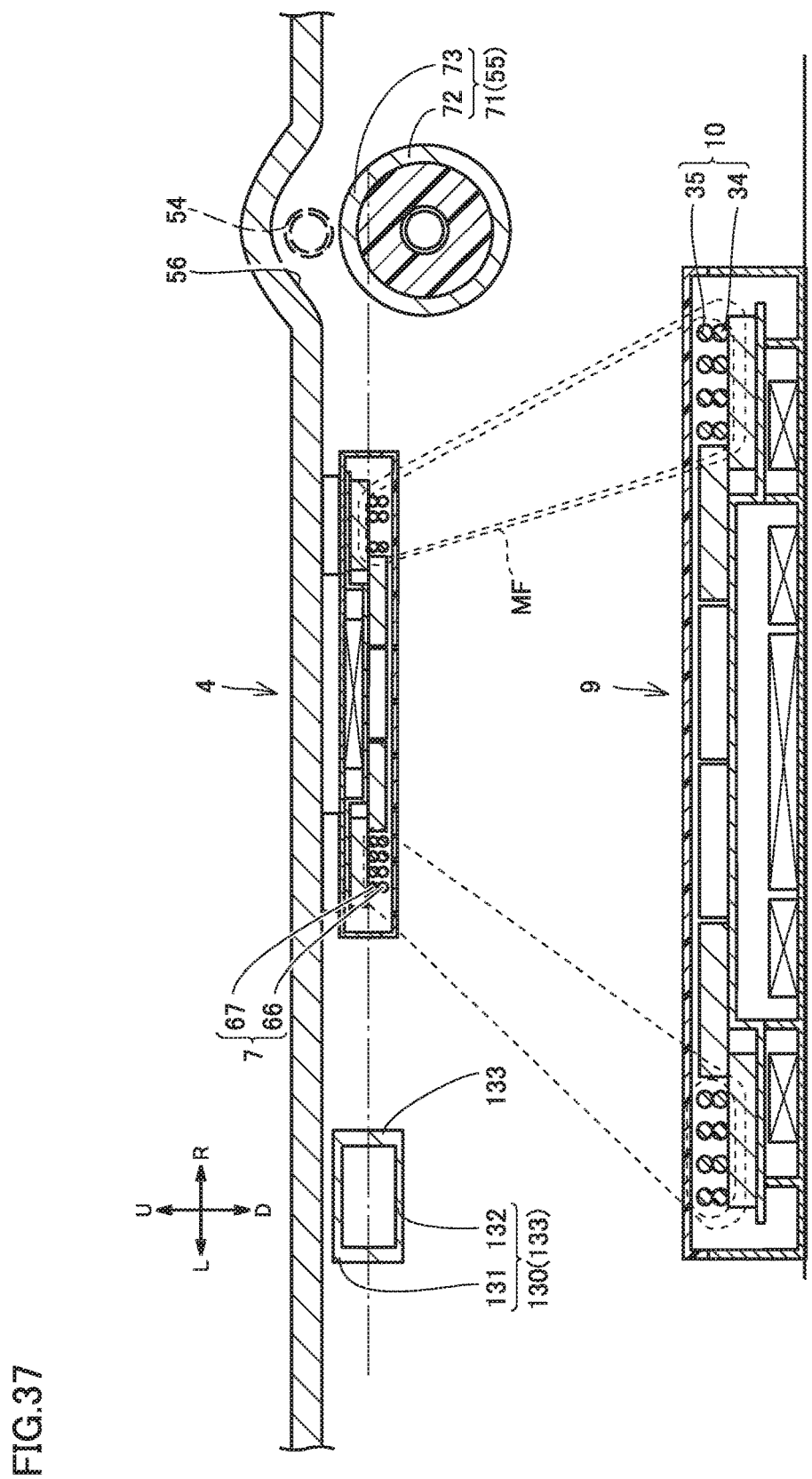
FIG. 37 is a cross-sectional view showing a state where power transmission apparatus 9 is positionally displaced in the left direction L from power reception apparatus 4.

FIG. 37 is a cross-sectional view showing a state where power transmission apparatus 9 is positionally displaced in the left direction L from power reception apparatus 4. As shown in FIG. 37, the distance between the left side portion of power reception coil 7 and the left side portion of power transmission coil 10 increases, and the amount of magnetic flux flowing between the left side portion of power reception coil 7 and the left side portion of power transmission coil 10 decreases. The amount of magnetic flux entering metal cover 133 also decreases and eddy current formed in the surface of metal cover 133 also decreases. Accordingly, the influence of the eddy current decreases.

Meanwhile, the distance between the right side portion of power reception coil 7 and the right side portion of power transmission coil 10 decreases. Therefore, the amount of magnetic flux flowing through the right side portion of power reception coil 7 and the right side portion of power transmission coil 10 is to increase. Accordingly, the amount of magnetic flux entering metal cover 71B increases and more eddy current is formed in the surface of metal cover 71B. The increased eddy current restricts the amount of magnetic flux flowing toward the right side portion of power reception coil 7. As a result, the amount of magnetic flux flowing from the right side portion of power transmission coil 10 toward power reception coil 7 merely slightly increases.

Specifically, in FIGS. 35 and 36, the portions of power reception coil 7 that are influenced greatly by the eddy current formed in metal cover 71B are facing portions 90A, 110A.

Meanwhile, the number of turns of the portions where facing portions 90A, 110A are located is larger than the number of turns of the remaining portion. Therefore, a slight increase of the magnetic flux passing through facing portions 90A, 110A causes an increase, to a certain extent, of a counter-electromotive force generated at the portions.

As a result, even when power transmission apparatus 9 is positionally displaced in the left direction L, a large difference of the coupling coefficient between power reception coil 7 and power transmission coil 10 is suppressed between the state where power transmission apparatus 9 is displaced in the left direction L and the state where these coils are positionally aligned.

Figure 38:
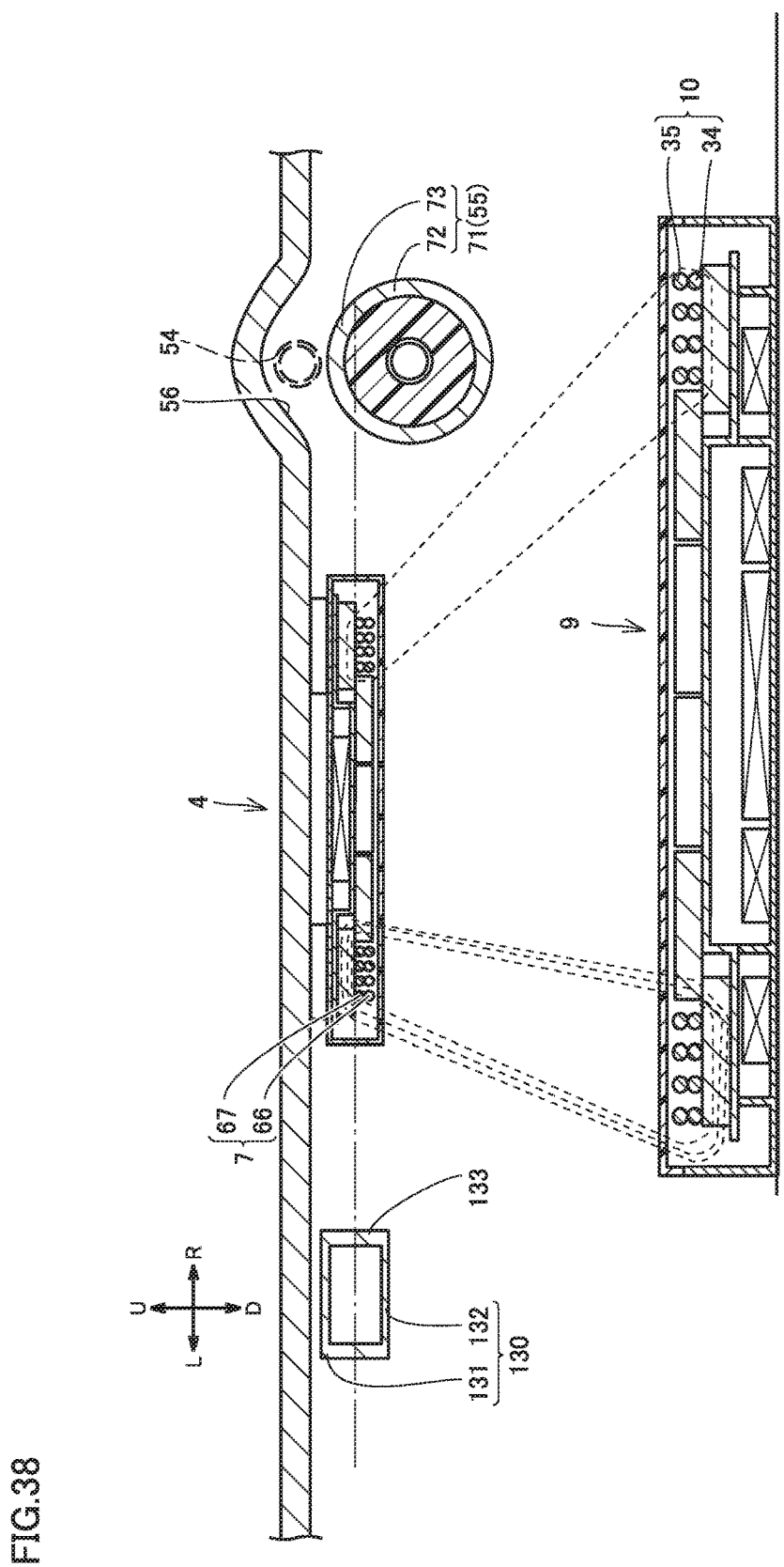
FIG. 38 is a cross-sectional view showing a state where power transmission apparatus 9 is positionally displaced in the right direction R.

FIG. 38 is a cross-sectional view showing a state where power transmission apparatus 9 is positionally displaced in the right direction R. As shown in FIG. 38, as power transmission apparatus 9 is positionally displaced in the right direction R, the distance between the right side portion of power reception coil 7 and the right side portion of power transmission coil 10 increases. Accordingly, the amount of magnetic flux flowing between the right side portion of power reception coil 7 and the right side portion of power transmission coil 10 decreases, the amount of magnetic flux entering metal cover 71B also decreases, and the influence of eddy current formed in the surface of metal cover 71 also decreases.

Meanwhile, the distance between the left side portion of power reception coil 7 and the left side portion of power transmission coil 10 decreases, and the amount of magnetic flux flowing through the left side portion of power reception coil 7 and the left side portion of power transmission coil 10 is to increase.

Therefore, the amount of magnetic flux entering metal cover 133 also increases and eddy current formed in the surface of metal cover 133 also increases. As the eddy current increases, the influence on the magnetic flux flowing from the left side portion of power transmission coil 10 toward the left side portion of power reception coil 7 increases.

Because of this, as compared with the case where on-board device 130 is absent, the amount of magnetic flux flowing through the left side portion of power reception coil 7 is smaller.

It is supposed here that the magnitude of positional displacement of power transmission apparatus 9 in the left direction L shown in FIG. 37 is equal to the magnitude of positional displacement of power transmission apparatus 9 in the right direction R shown in FIG. 38.

Since metal cover 133 is located higher than metal cover 71B, the amount of magnetic flux entering metal cover 133 in FIG. 38 is smaller than the amount of magnetic flux entering metal cover 71B in FIG. 37. Therefore, the amount of magnetic flux flowing through the left side portion of power reception coil 7 in FIG. 38 is larger than the amount of magnetic flux flowing through the right side portion of power reception coil 7 in FIG. 37.

Thus, when power transmission apparatus 9 is positionally displaced in the right direction R, the amount of magnetic flux entering the left side portion of power reception coil 7 is decreased relative to that in the case where on-board device 130 is absent. Meanwhile, this decrease of the amount of magnetic flux is smaller than the decrease of the amount of magnetic flux flowing through the right side portion of power reception coil 7 in FIG. 37.

Here, the number of turns of the portions of power reception coil 7 where facing portions 90B, 110B are located is larger than the number of turns of low-turn-count portions 92A, 92B, 103A, 103B. Therefore, the increase to some extent of the amount of magnetic flux entering the left side portion of power reception coil 7 can cause a large increase of an electromotive voltage induced at facing portions 90B, 110B. Since the amount of magnetic flux flowing through the left side portion of power reception coil 7 in FIG. 38 is larger than the amount of magnetic flux flowing through the right side portion of power reception coil 7 in FIG. 37, the number of turns of facing portions 90B, 110B is smaller than the number of turns of facing portions 90A, 110A.

Therefore, even when power transmission apparatus 9 is positionally displaced in the right direction R and the amount of magnetic flux passing through the right side portion of power reception coil 7 decreases, a large decrease of the coupling coefficient can be suppressed.

As a result, even when power transmission apparatus 9 is positionally displaced in the right direction R, a large difference of the coupling coefficient can be suppressed between the state where power transmission apparatus 9 and power reception apparatus 4 are positionally aligned and the state where power transmission apparatus 9 is positionally displaced as shown in FIG. 38.

As seen from the above, wireless charging system 1 in the fourth embodiment can reduce variation of the coupling coefficient between power reception coil 7 and power transmission coil 10 even when power transmission apparatus 9 is positionally displaced.

Fifth Embodiment

Regarding the foregoing embodiments, the description is given above of the case where a plurality of metal members are provided in the vicinity of power reception apparatus 4 and the metal members are the same type of metal members. The present disclosure, however, is also applicable to the case where the metal members are different types of metal members.

Figure 39:
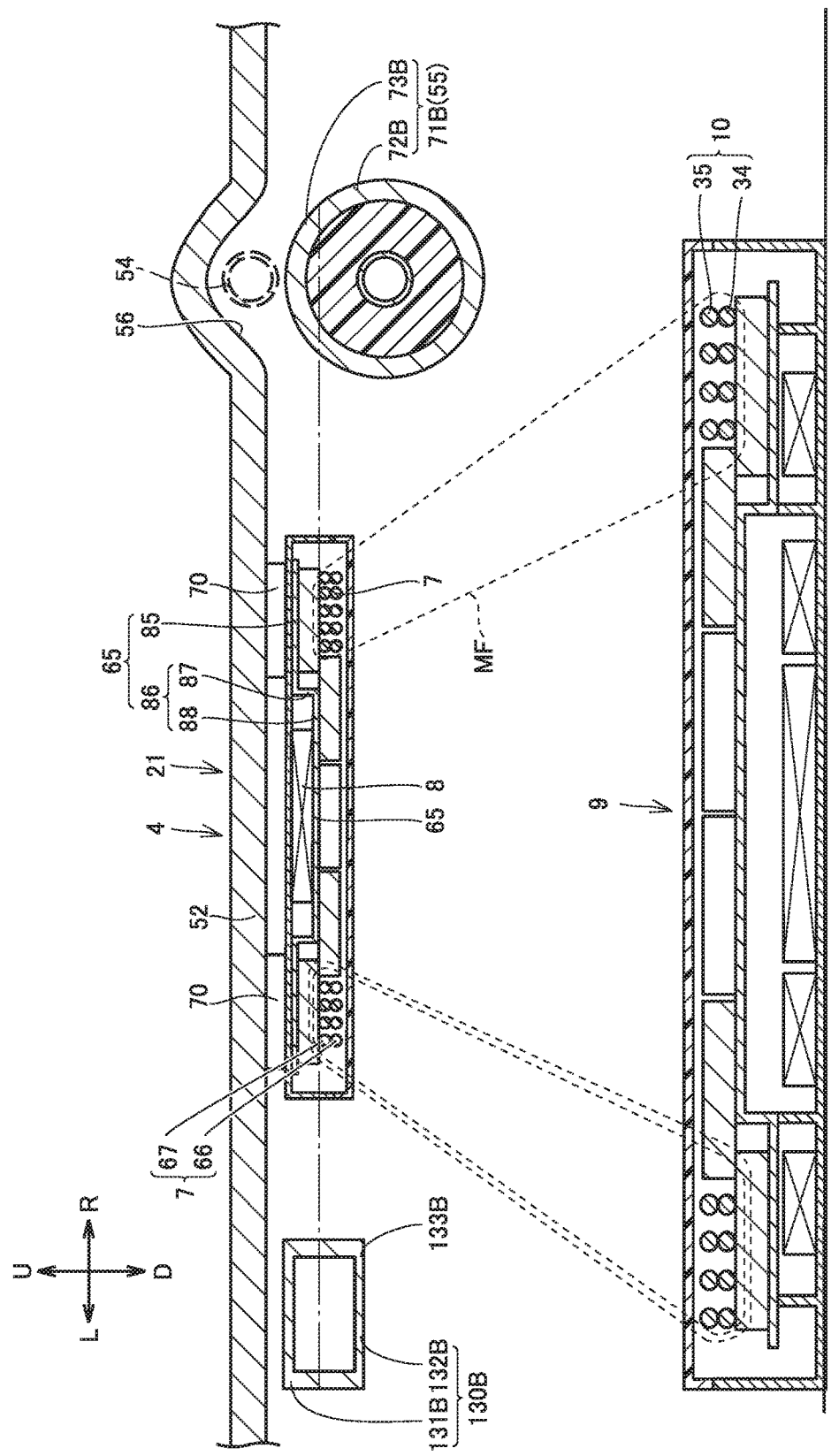
FIG. 39 is a cross-sectional view showing a wireless charging system 1 according to a fifth embodiment.

Any of the features shown in FIG. 39 for example that is identical or substantially identical to the corresponding one shown in FIGS. 1 to 38 is denoted by the same reference character, and the description thereof will not be repeated.

FIG. 39 is a cross-sectional view showing a wireless charging system 1 according to a fifth embodiment. In FIG. 39, a metal cover 71B of a muffler 55 is formed of a metal containing at least one of aluminum and copper as a main component.

An on-board device 130B includes a metal cover 133B, and metal cover 133B includes an upper portion 131B located higher than a power reception coil 7 and a lower portion 132B located closer to the ground than upper portion 131B. Lower portion 132B includes a portion horizontally located at the same position as power reception coil 7, and a portion located lower than power reception coil 7.

The magnetic permeability of a metal of metal cover 133B is higher than the magnetic permeability of aluminum. Specifically, metal cover 133B is formed of a metal containing at least one of stainless steel and iron as a main component, for example.

Namely, in metal cover 71B, eddy current is likely to be formed due to magnetic flux entering metal cover 71B. Magnetic flux entering metal cover 133B flows well in metal cover 133B.

Figure 40:
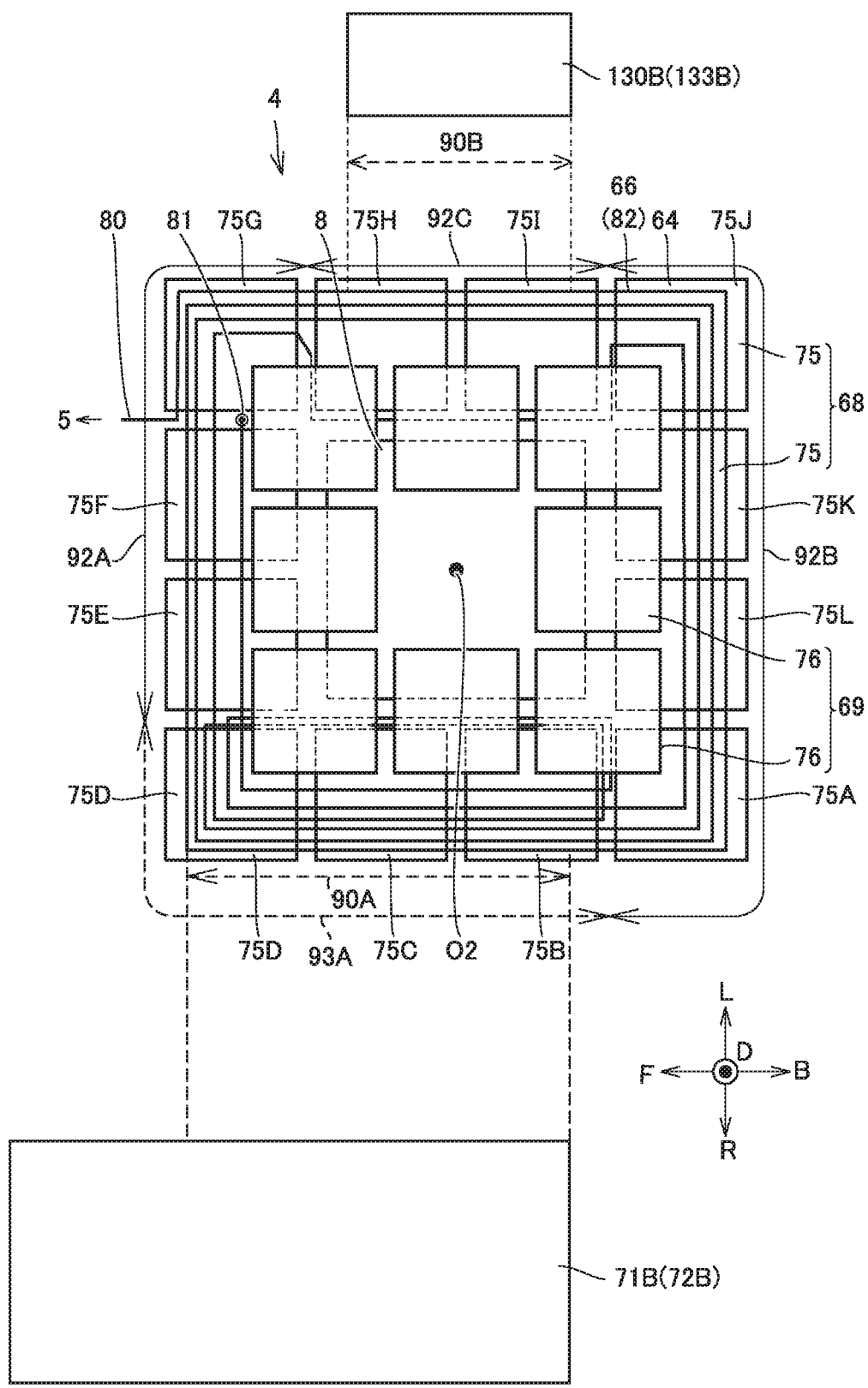
FIG. 40 is a plan view showing a lower coil 66 and a ferrite core 64.

FIG. 40 is a plan view showing a lower coil 66 and a ferrite core 64. As shown in FIG. 40, lower coil 66 is formed by winding a coil wire 82 from an end 80 toward an end 81 to surround winding axis O2. Specifically, coil wire 82 is wound to successively pass across division core members 75A, 75B, 75C, 75D, 75E, 75F, 75G, 75H, 75I, 75J, 75K, and 75L.

Coil wire 82 of lower coil 66 is drawn from the gap between division core member 75G and division core member 75H to the inside of a metal support member 65. Then, coil wire 82 is drawn out from the gap between division core member 75I and division core member 75J, and thereafter extends in the direction of winding across the division core members as described above. The gap between division core member 75I and division core member 75J is located downstream, in the winding direction of coil wire 82, of the gap between division core member 75G and division core member 75H.

The part of coil wire 82 located downstream, in the winding direction, of the gap between division core member 75D and division core member 75E, is drawn from the gap between division core member 75D and division core member 75E to the inside of metal support member 65. Then, coil wire 82 is drawn out from the gap between division core member 75A and division core member 75B. After this, coil wire 82 is wound in the aforementioned winding direction. The gap between division core member 75A and division core member 75B is located upstream, in the winding direction, of the gap between division core member 75D and division core member 75E.

Coil wire 82 is wound in this way. Accordingly, lower coil 66 includes a high-turn-count portion 93A which is located on the lower surface of division core members 75B, 75C, 75D, a low-turn-count portion 92A located on the lower surface of division core members 75E, 75F, 75G, a low-turn-count portion 92C located on the lower surface of division core members 75H, 75I, and a low-turn-count portion 92B which is located on the lower surface of division core members 75J, 75K, 75L, 75A.

Here, the number of turns of high-turn-count portion 93A is larger than the number of turns of low-turn-count portions 92A, 92B, 92C, and the number of turns of low-turn-count portions 92A, 92B is larger than the number of turns of low-turn-count portion 92C.

Low-turn-count portion 92C is located in a portion of lower coil 66 facing lower portion 132B of metal cover 133B. High-turn-count portion 93A is located in a portion of lower coil 66 facing lower portion 72B of metal cover 71B, namely a facing portion 90A.

Figure 41:
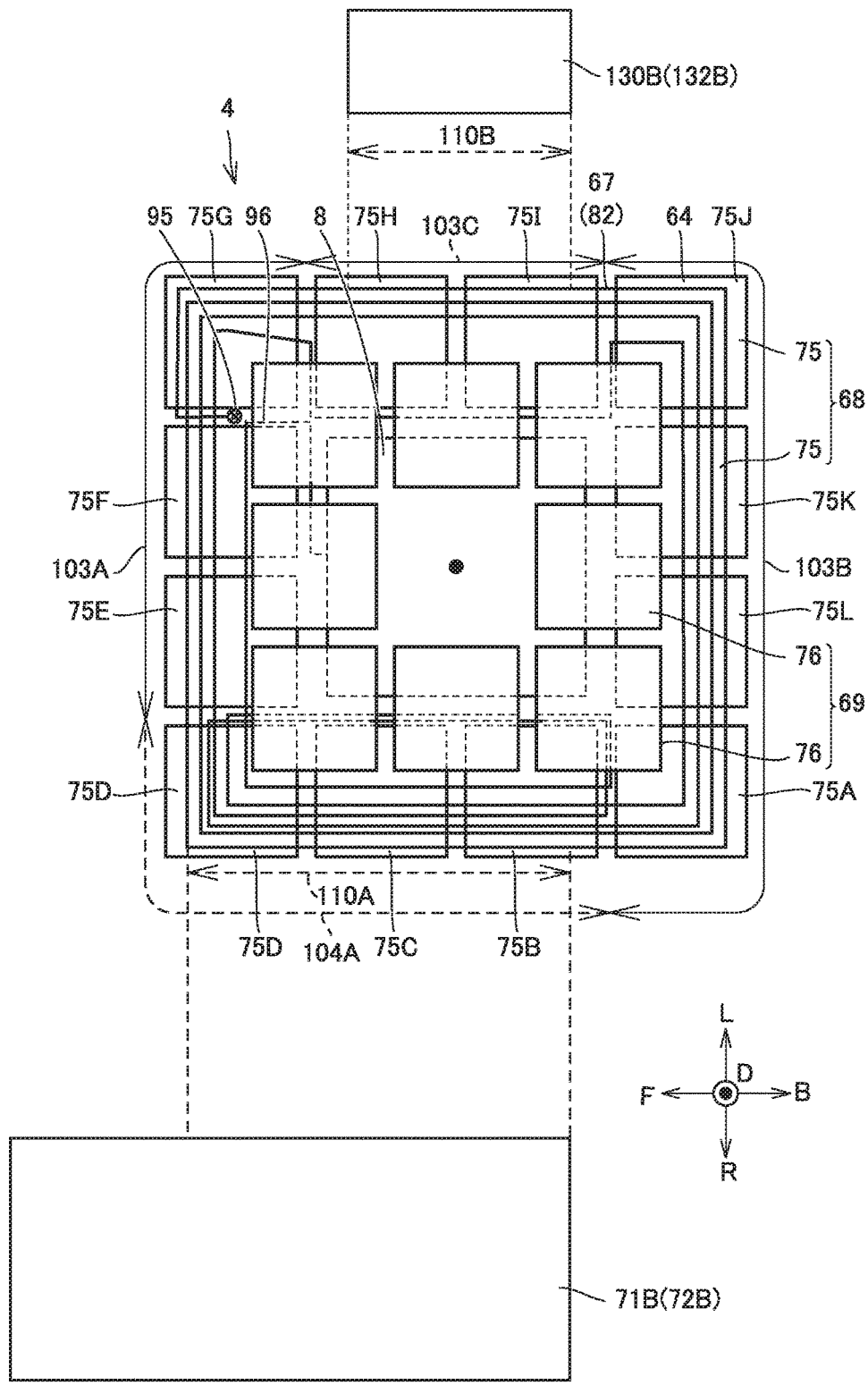
FIG. 41 is a plan view showing an upper coil 67.

FIG. 41 is a plan view showing an upper coil 67. Upper coil 67 is formed similarly to lower coil 66.

Upper coil 67 includes a high-turn-count portion 104A located on the lower surface of division core members 75B, 75C, 75D, a low-turn-count portion 103A located on the lower surface of division core members 75E, 75F, 75G, a low-turn-count portion 103C located on the lower surface of division core members 75H, 75I, and a low-turn-count portion 103B located in the lower surface of division core members 75J, 75K, 75L, 75A.

The number of turns of high-turn-count portion 104A is larger than the number of turns of low-turn-count portions 103A, 103B, 103C, and the number of turns of low-turn-count portions 103A, 103B is larger than the number of turns of low-turn-count portion 103C.

Low-turn-count portion 103C is located in a portion of upper coil 67, namely a facing portion 110B facing lower portion 132B of metal cover 133B. High-turn-count portion 104A is located in a portion of upper coil 67, namely a facing portion 110A facing lower portion 72B of metal cover 71B.

Thus, power reception coil 7 includes low-turn-count portions 92C, 103C formed in the portion facing lower portion 132B of metal cover 133B, and high-turn-count portions 93A, 104A formed in the portion facing lower portion 72B of metal cover 71B.

As shown in FIG. 39, when electric power is transmitted from power transmission apparatus 9 to power reception apparatus 4 with power reception apparatus 4 and power transmission apparatus 9 positionally aligned with each other, magnetic flux reaches lower portion 72B of metal cover 71B. Since metal cover 71B is formed of a metal containing at least one of aluminum and copper as a main component, the magnetic flux reaching metal cover 71B is reflected by metal cover 71B.

Due to the reflected magnetic flux, the amount of magnetic flux flowing from power transmission coil 10 toward the right side portion of power reception coil 7 decreases.

Meanwhile, magnetic flux enters metal cover 133B of on-board device 130B. Since metal cover 133B is formed of a metal containing at least one of iron and stainless steel as a main component, the magnetic flux entering metal cover 133B flows well in metal cover 133B. A part of the magnetic flux flowing in metal cover 133B enters the left side portion of power reception coil 7.

Figure 42:
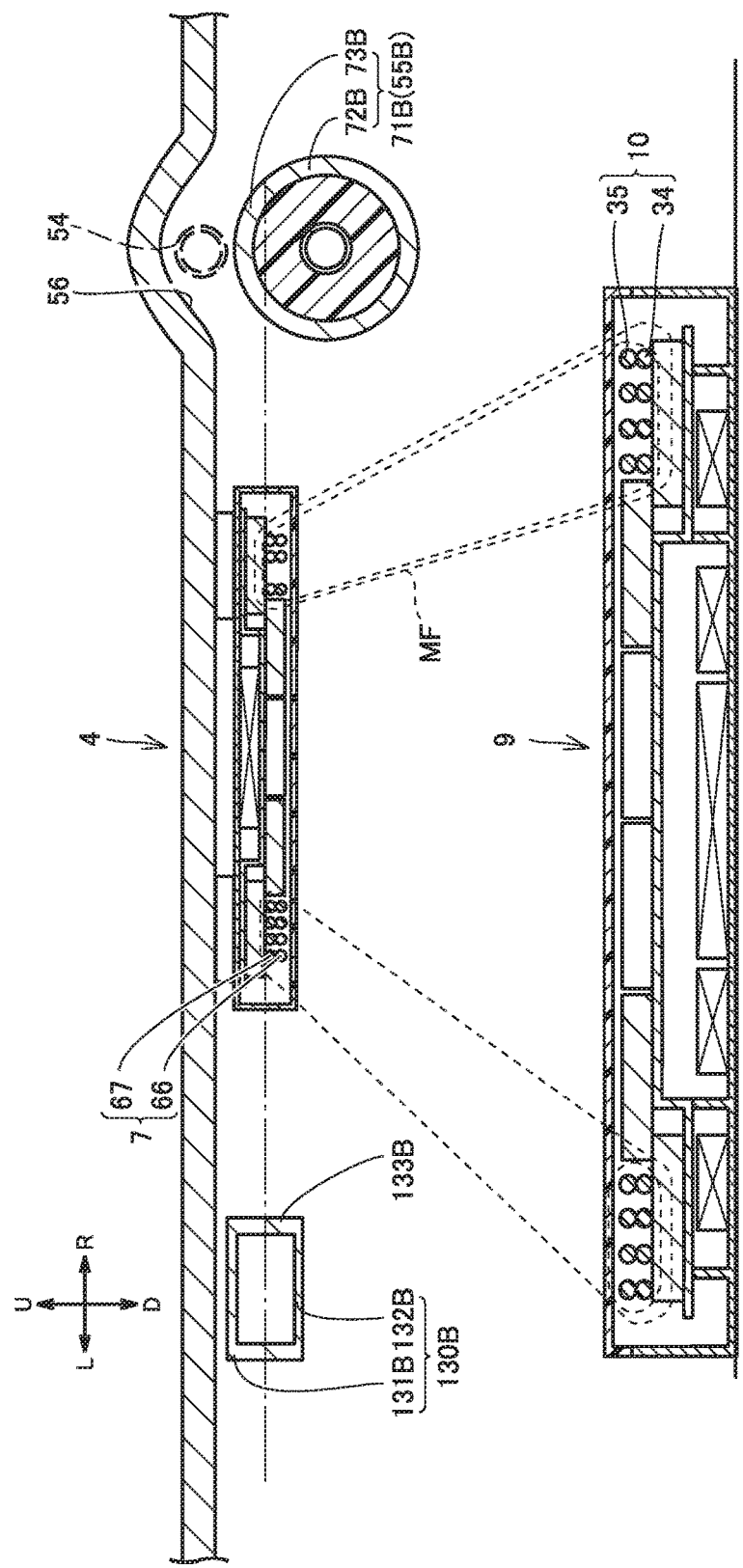
FIG. 42 is a cross-sectional view showing a state where a power transmission apparatus 9 is positionally displaced in the left direction L.

FIG. 42 is a cross-sectional view showing a state where power transmission apparatus 9 is positionally displaced in the left direction L. In FIG. 42, the distance between the left side portion of power reception coil 7 and the left side portion of power transmission coil 10 increases. Therefore, the amount of magnetic flux entering metal cover 133B decreases. The amount of magnetic flux flowing directly from the left side portion of power transmission coil 10 toward the left side portion of power reception coil 7 also decreases.

As a result, almost no magnetic flux flows in metal cover 133B toward power reception coil 7.

The distance between the right side portion of power reception coil 7 and the right side portion of power transmission coil 10 decreases. Therefore, the amount of magnetic flux reaching metal cover 71B increases and the amount of magnetic flux reflected by metal cover 71B also increases. Thus, the amount of magnetic flux which is hindered from flowing by the reflected magnetic flux increases.

As a result, even when the distance between the right side portion of power transmission coil 10 and the right side portion of power reception coil 7 decreases, the amount of magnetic flux flowing through the right side portion of power reception coil 7 merely slightly increases, relative to the amount of magnetic flux flowing through the right side portion of power reception coil 7 in the state where power reception apparatus 4 and power transmission apparatus 9 are positionally aligned.

Meanwhile, as shown in FIGS. 40 and 41, the number of turns of facing portions 90A, 110A of power reception coil 7 facing lower portion 72B of metal cover 71B is large, and therefore, even when magnetic flux slightly increases, a large electromotive force can be generated.

Therefore, even when power transmission apparatus 9 is positionally displaced in the left direction L, it can be suppressed that the coupling coefficient between power reception coil 7 and power transmission coil 10 largely varies from the coupling coefficient in the state where power reception apparatus 4 and power transmission apparatus 9 are positionally aligned.

Figure 43:
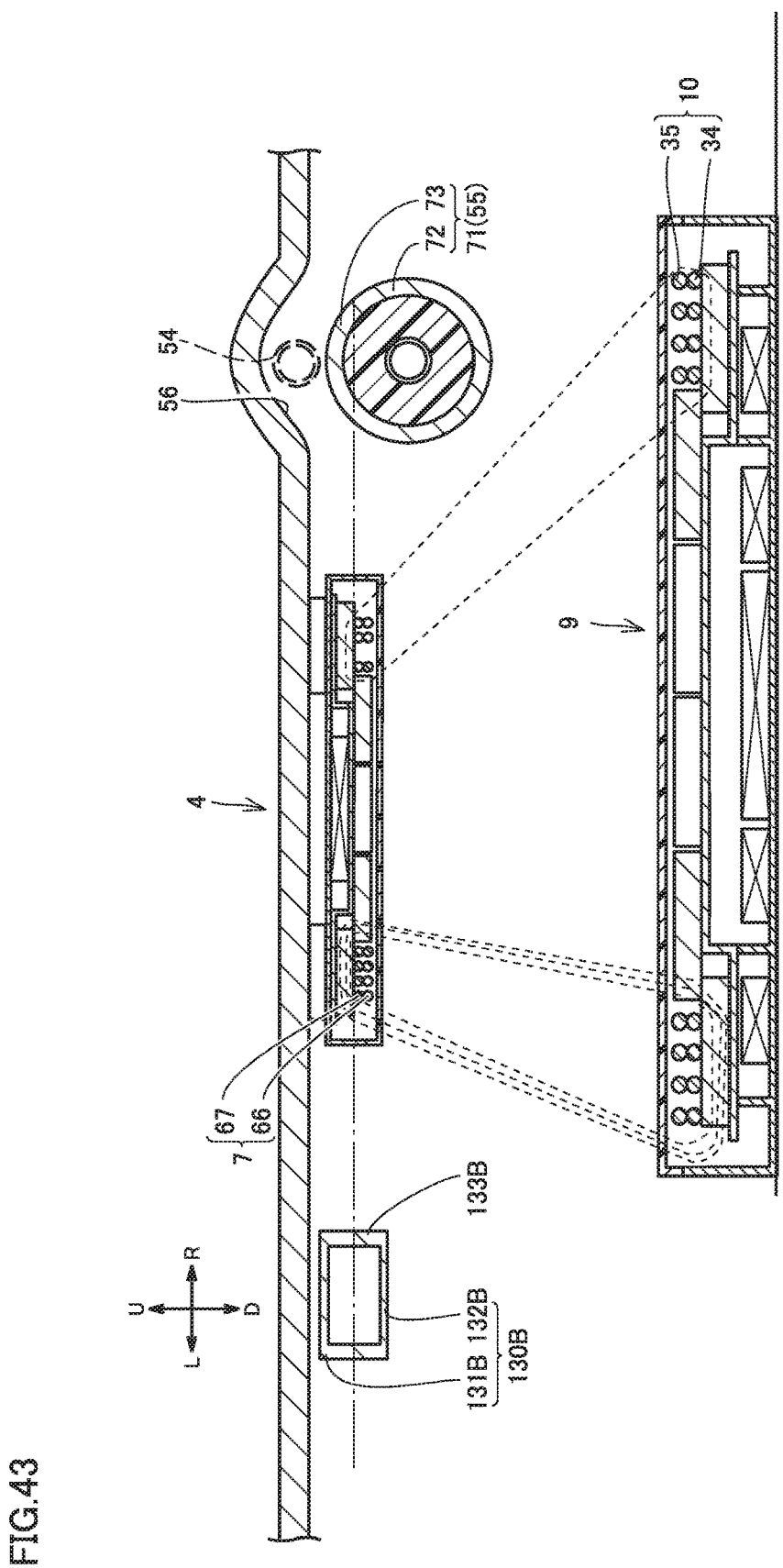
FIG. 43 is a cross-sectional view showing a state where power transmission apparatus 9 is positionally displaced in the right direction R.

FIG. 43 is a cross-sectional view showing a state where power transmission apparatus 9 is positionally displaced in the right direction R. As shown in FIG. 43, when power transmission apparatus 9 is positionally displaced in the right direction R, the distance between the left side portion of power reception coil 7 and the left side portion of power transmission coil 10 decreases. As a result, the amount of magnetic flux guided by metal cover 133B to power reception coil 7 increases.

Meanwhile, as shown in FIGS. 40 and 41, the number turns of facing portions 90B, 110B of power reception coil 7 is small, and therefore, even when the amount of magnetic flux guided by metal cover 133B increases, a large increase of the electromotive force generated at facing portions 90B, 110B can be suppressed.

As a result, it can be suppressed that the coupling coefficient in the case of positional displacement as shown in FIG. 43 largely varies from the coupling coefficient in the case where power reception apparatus 4 and power transmission apparatus 9 are positionally aligned.

Regarding the first to fifth embodiments, the description is given above of the system in which power reception coil 7 and power transmission coil 10 are formed so that power reception coil 7 is located within power transmission coil 10 in plan view of power transmission coil 10 and power reception coil 7 as seen from below power transmission coil 10 and power reception coil 7, in the state where power transmission coil 10 and power reception coil 7 are positionally aligned. The present disclosure, however, is not limited to the system as described above.

FIG. 44 is a plan view showing a modification of wireless charging system 1. In the example shown in FIG. 44, power transmission coil 10 and power reception coil 7 are positionally aligned with each other. In plan view of power transmission coil 10 and power reception coil 7 as seen from below power transmission coil 10 and power reception coil 7, power transmission coil 10 is formed to be located within power reception coil 7.

Metal cover 71 of muffler 55 is formed of a metal containing at least one of iron and stainless steel as a main component, similarly to the first embodiment.

Power reception coil 7 includes a facing portion 120 facing muffler 55, and the number of turns of coil wire in facing portion 120 is smaller than the number of turns in the remaining portion.

FIG. 45 is a plan view showing a state where power transmission coil 10 is positionally displaced to be closer to muffler 55. As shown in FIG. 45, as power transmission coil 10 is positionally displaced, the distance between power transmission coil 10 and an opposite portion 121 increases, opposite portion 121 being a portion of power reception coil 7 and located opposite to muffler 55. As a result, the amount of magnetic flux passing through opposite portion 121 of power reception coil 7 decreases.

Meanwhile, the distance between facing portion 120 of power reception coil 7 and a portion of power transmission coil 10 that is located on the side of muffler 55 decreases.

The amount of magnetic flux flowing through the portion of power transmission coil 10 that is located on the side of muffler 55 and facing portion 120 of power reception coil 7 increases, and the amount of magnetic flux entering metal cover 71 increases.

Further, the amount of magnetic flux guided by metal cover 71 to facing portion 120 of power reception coil 7 also increases.

Here, the number of turns of the coil wire in facing portion 120 is small. Therefore, even when the amount of magnetic flux passing through facing portion 120 is excessively large, increase of an electromotive voltage induced at facing portion 120 can be suppressed.

Therefore, even when power transmission coil 10 is positionally displaced toward muffler 55, variation of the coupling coefficient between power transmission coil 10 and power reception coil 7 is reduced.

If power transmission coil 10 is positionally displaced away from muffler 55, the distance between power transmission coil 10 and opposite portion 121 of power reception coil 7 decreases, and the amount of magnetic flux passing through opposite portion 121 increases. Meanwhile, the distance between facing portion 120 of power reception coil 7 and transmission coil 10 increases, and the amount of magnetic flux passing through facing portion 120 of power reception coil 7 decreases.

Therefore, even when power transmission coil 10 is positionally displaced away from muffler 55, decrease of the coupling coefficient between power transmission coil 10 and power reception coil 7 can be suppressed.

According to the description of the example shown in FIGS. 39 and 40, metal cover 71 is formed of a metal containing at least one of aluminum and copper as a main component.

In the case where metal cover 71 is formed of a metal such as iron and stainless steel having a magnetic permeability equal to or more than that of aluminum, the number of turns of facing portion 120 of power reception coil 7 is made smaller than that of the remaining portion.

Thus, the embodiments are applicable to systems in which various coil shapes are employed.

Although the embodiments have been described and illustrated in detail, it is clearly understood that the same is by way of illustration and example only and is not to be taken by way of limitation.

What is claimed is:

1. A vehicle comprising:
   a power reception apparatus including a power reception coil configured to wirelessly receive electric power from a power transmission coil, the power reception apparatus being provided at a bottom surface of the vehicle; and
   at least one metal member provided at a position horizontally adjacent to the power reception apparatus in plan view as seen from below the bottom surface of the vehicle,
   the at least one metal member being formed of a metal having a higher magnetic permeability than a magnetic permeability of aluminum,
   the power reception coil including
      a low-turn-count portion with a smaller number of turns, and
      a high-turn-count portion with a larger number of turns than the low-turn-count portion, and
   the low-turn-count portion being located in at least a part of a facing portion of the power reception coil, the facing portion facing the at least one metal member in plan view as seen from below the at least one metal member and the power reception coil.

2. The vehicle according to claim 1, wherein
   the at least one metal member includes a first metal member and a second metal member, the second metal member being provided at a position closer to a ground beneath the vehicle than a position where the first metal member is provided,
   in plan view of the first metal member, the second metal member, and the power reception coil as seen from below the first metal member, the second metal member, and the power reception coil, the low-turn-count portion of the power reception coil includes a first facing portion facing the first metal member and a second facing portion facing the second metal member, and
   the number of turns of the second facing portion is smaller than the number of turns of the first facing portion.

3. A vehicle comprising:
   a power reception apparatus including a power reception coil configured to wirelessly receive electric power from a power transmission coil, the power reception apparatus being provided at a bottom surface of the vehicle; and
   at least one metal member provided at a position horizontally adjacent to the power reception apparatus in plan view as seen from below the bottom surface,
   the at least one metal member having a magnetic permeability equal to or less than a magnetic permeability of aluminum,
   the power reception coil including
      a low-turn-count portion with a smaller number of turns, and
      a high-turn-count portion with a larger number of turns than the low-turn-count portion, and the high-turn-count portion being located in at least a part of a facing portion of the power reception coil, the facing portion facing the at least one metal member in plan view as seen from below the at least one metal member and the power reception coil.

4. The vehicle according to claim 3, wherein the at least one metal member includes a first metal member and a second metal member, the second metal member being provided at a position closer to a ground beneath the vehicle than a position where the first metal member is provided, in plan view of the first metal member, the second metal member, and the power reception coil as seen from below the first metal member, the second metal member, and the power reception coil, the high-turn-count portion of the power reception coil includes a first facing portion facing the first metal member and a second facing portion facing the second metal member, and the number of turns of the second facing portion is larger than the number of turns of the first facing portion.

5. The vehicle according to claim 3, wherein the at least one metal member is a first metal member, the vehicle further comprises a second metal member being formed of a metal having a higher magnetic permeability than aluminum, in plan view of the first metal member, the second metal member, and the power reception coil as seen from below the first metal member, the second metal member, and the power reception coil, the low-turn-count portion of the power reception coil includes a first facing portion facing the second metal member and a remaining second facing portion, and the number of turns of the second facing portion is larger than the number of turns of the first facing portion.

6. The vehicle according to claim 1, wherein the at least one metal member includes a metal member selected from a group consisting of a metal cover of a muffler, a protruding portion of a floor panel, and a metal cover of an on-board device.

7. A wireless charging system comprising:

the vehicle according to claim 1; and a power transmission apparatus including a power transmission coil configured to wirelessly transmit electric power to the power reception coil.

* * * * *